US012666352B2

(12) United States Patent
    Gordon et al.

(10) Patent No.: US 12,666,352 B2
(45) Date of Patent: Jun. 23, 2026

(54) WIRELESS SECURITY NETWORK AND COMMUNICATION METHODS

(71) Applicant: A9.Com, Inc., Seattle, WA (US)

(72) Inventors: Stephen E. Gordon, Lexington, MA (US); Peter D. Besen, Somerville, MA (US); Julian I. Gorfajn, Brookline, MA (US)

(73) Assignee: A9.com, Inc., Seattle, WA (US)

( * ) Notice: Subject to any disclaimer, the term of this patent is extended or adjusted under 35 U.S.C. 154(b) by 0 days.

(21) Appl. No.: 15/475,566

(22) Filed: Mar. 31, 2017

(65) Prior Publication Data

US 2018/0288694 A1     Oct. 4, 2018

(51) Int. Cl.
    *H04W 48/20*          (2009.01)
    *H04B 1/04*           (2006.01)
                          (Continued)
(52) U.S. Cl.
    CPC .......... *H04W 48/20* (2013.01); *H04B 1/0466* (2013.01); *H04B 10/03* (2013.01);
                          (Continued)
(58) Field of Classification Search
    CPC . H04L 9/0872; H04L 12/287; H04L 41/0246; H04L 29/0621; H04L 47/14; H04L 47/746; H04L 2012/5619; H04L 2012/6443; H04L 41/0668; H04L 69/40; H04N 21/2223; H04W 36/08;
                          (Continued)

(56) References Cited

U.S. PATENT DOCUMENTS

| | | |
|---|---|---|
| 4,888,767 A | 12/1989 | Furuya et al. |
| 5,809,431 A | 9/1998 | Bustamante et al. |

(Continued)

FOREIGN PATENT DOCUMENTS

| | | |
|---|---|---|
| DE | 202010009998 | 11/2010 |
| EP | 2811789 | 6/2013 |

(Continued)

OTHER PUBLICATIONS

Author unknown; International Search Report and Written Opinion of PCT/US2018/024598; Jun. 21, 2018; 10 pgs.

(Continued)

*Primary Examiner* — Salvador E Rivas
(74) *Attorney, Agent, or Firm* — K&L Gates LLP

(57)                ABSTRACT

A security network provides reduced power consumption and more robust communication of messages in comparison to conventional wireless systems. Reducing power consumption as discussed herein ensures that the security system is able to operate for a long duration of time, potentially with minimal or no power from an electrical grid. Additionally, redundant communication paths as discussed herein provide a more robust way of selectively forwarding security data to a remote server. The availability of multiple communication paths ensures that a respective remote target recipient such as a server resource or remote communication device operated by a user can be notified of a trigger event during power failure conditions, such as when certain communication functionality of a security system is disabled.

15 Claims, 38 Drawing Sheets

1700 ⟶

MONITOR A LOCATION FOR OCCURRENCE OF A TRIGGER EVENT, THE TRIGGER EVENT INDICATING SECURITY WITH RESPECT TO THE LOCATION — 1710

DETECT THE TRIGGER EVENT — 1720

PRODUCE A MESSAGE INDICATING THE TRIGGER EVENT — 1730

SELECT AMONGST A FIRST WIRELESS ACCESS POINT AND A SECOND WIRELESS ACCESS POINT TO COMMUNICATE THE MESSAGE INDICATING THE TRIGGER EVENT TO A REMOTE MANAGEMENT SERVER — 1740

(51) Int. Cl.

| | |
|---|---|
| *H04B 10/03* | (2013.01) |
| *H04L 12/28* | (2006.01) |
| *H04L 41/0668* | (2022.01) |
| *H04L 47/74* | (2022.01) |
| *H04L 69/40* | (2022.01) |
| *H04W 36/00* | (2009.01) |
| *H04W 36/08* | (2009.01) |
| *H04W 36/30* | (2009.01) |
| *H04W 52/02* | (2009.01) |
| *H04W 72/0446* | (2023.01) |
| *H04W 76/15* | (2018.01) |
| *H04W 76/18* | (2018.01) |
| *G08B 13/196* | (2006.01) |
| *H04L 41/0246* | (2022.01) |
| *H04M 3/42* | (2006.01) |
| *H04W 8/00* | (2009.01) |
| *H04W 72/04* | (2023.01) |
| *H04W 74/00* | (2009.01) |
| *H04W 84/12* | (2009.01) |
| *H04W 88/08* | (2009.01) |
| *H04W 88/16* | (2009.01) |

(52) U.S. Cl.
CPC ........ *H04L 12/287* (2013.01); *H04L 41/0668* (2013.01); *H04L 47/746* (2013.01); *H04L 69/40* (2013.01); *H04W 36/0077* (2013.01); *H04W 36/0079* (2018.08); *H04W 36/08* (2013.01); *H04W 36/305* (2018.08); *H04W 52/0206* (2013.01); *H04W 72/0446* (2013.01); *H04W 76/15* (2018.02); *H04W 76/18* (2018.02); *G08B 13/19656* (2013.01); *H04L 41/0246* (2013.01); *H04M 3/4234* (2013.01); *H04W 8/00* (2013.01); *H04W 36/0072* (2013.01); *H04W 52/0251* (2013.01); *H04W 72/04* (2013.01); *H04W 74/00* (2013.01); *H04W 84/12* (2013.01); *H04W 88/08* (2013.01); *H04W 88/16* (2013.01); *Y02D 30/70* (2020.08)

(58) Field of Classification Search
CPC ............. H04W 48/20; H04W 52/0212; H04W 88/085; H04W 40/20; H04W 4/02; H04W 4/029; H04W 28/0819; H04W 36/0072; H04W 36/0077; H04W 72/02; H04W 72/04; H04W 74/00; H04W 76/025; H04W 76/15; H04W 36/0079; H04W 76/027; H04W 52/0267; H04W 92/10; H04W 36/305; H04W 76/18; H04M 3/4234; H04M 1/6091; H04Q 3/54591; H04B 1/0466; H04B 10/03; Y04S 20/225
See application file for complete search history.

(56) References Cited

U.S. PATENT DOCUMENTS

| | | | |
|---|---|---|---|
| 6,476,858 | B1 | 11/2002 | Ramirez Diaz et al. |
| 2004/0257444 | A1 | 12/2004 | Maruya et al. |
| 2005/0073426 | A1 | 4/2005 | Hines |
| 2006/0064477 | A1 | 3/2006 | Renkis |
| 2006/0221933 | A1* | 10/2006 | Bauer .................... H04W 28/18 370/352 |
| 2007/0146127 | A1 | 6/2007 | Stilp et al. |
| 2008/0273087 | A1 | 11/2008 | Blom et al. |
| 2008/0303903 | A1 | 12/2008 | Bentley |
| 2010/0008222 | A1* | 1/2010 | Le Roux ................. H04L 45/50 370/228 |
| 2010/0029325 | A1 | 2/2010 | Wang |
| 2010/0142368 | A1* | 6/2010 | Gunukula ................. H04J 3/14 370/217 |
| 2010/0281161 | A1* | 11/2010 | Cohn .................. H04L 12/2827 709/224 |
| 2010/0314445 | A1 | 12/2010 | Kargl et al. |
| 2011/0065414 | A1 | 3/2011 | Frenette et al. |
| 2012/0229271 | A1 | 9/2012 | Davis |
| 2012/0327225 | A1 | 12/2012 | Barley |
| 2013/0017777 | A1* | 1/2013 | Haba ........................ H04L 67/06 455/11.1 |
| 2013/0033379 | A1 | 2/2013 | Jentoft |
| 2013/0329621 | A1 | 12/2013 | Kondo et al. |
| 2014/0140196 | A1* | 5/2014 | Layman .............. H04L 65/1069 370/216 |
| 2014/0258739 | A1 | 9/2014 | Gunasekara et al. |
| 2014/0369309 | A1* | 12/2014 | Yu ........................ H04W 72/542 370/329 |
| 2015/0049189 | A1 | 2/2015 | Yau et al. |
| 2015/0052578 | A1 | 2/2015 | Yau et al. |
| 2015/0139198 | A1 | 5/2015 | Hwang et al. |
| 2015/0172985 | A1 | 6/2015 | Gangadhar et al. |
| 2016/0036825 | A1 | 2/2016 | Manroa et al. |
| 2016/0173827 | A1* | 6/2016 | Dannan .................. H04N 7/181 348/143 |
| 2016/0302063 | A1* | 10/2016 | Ahmed ................. H04W 12/06 |
| 2016/0343241 | A1 | 11/2016 | Rossi et al. |
| 2017/0301201 | A1 | 10/2017 | Siann et al. |
| 2017/0359743 | A1* | 12/2017 | Szilagyi ................ H04W 24/08 |
| 2018/0062865 | A1* | 3/2018 | Sabharwal .......... H04L 12/1432 |
| 2018/0124702 | A1* | 5/2018 | Jung ..................... H04W 88/04 |
| 2018/0232031 | A1* | 8/2018 | Swierk .................... H04L 67/12 |
| 2018/0234318 | A1* | 8/2018 | Cox ........................ H04Q 9/00 |
| 2018/0270151 | A1* | 9/2018 | Fujii ...................... H04L 69/22 |
| 2020/0028700 | A1* | 1/2020 | Zaks ................. H04W 12/0471 |

FOREIGN PATENT DOCUMENTS

| | | |
|---|---|---|
| EP | 2779129 | 9/2014 |
| EP | 2838294 | 2/2015 |
| WO | 90/09714 | 8/1990 |
| WO | 2017173235 | 10/2017 |

OTHER PUBLICATIONS

Author unknown; International Search Report and Written Opinion of PCT/US2018/024583; Jun. 29, 2018; 10 pgs.
International Search Report, PCT/US2017/025318, Jun. 29, 2017, pp. 1-13.
Author unknown; International Search Report and Written Opinion of PCT/US2018/024609; Jun. 13, 2018; 13 pgs.
Computer-Generated Translation of DE20 2010 009 998 retrieved from Google Patents Jun. 20, 2018; 3 pgs.
Author unknown; International Search Report and Written Opinion of PCT/US2018/024622; Jun. 21, 2018; 15 pgs.
Author unknown; International Preliminary Report on Patentability of PCT/US2018/024622; Oct. 10, 2019; 10 pgs.

* cited by examiner

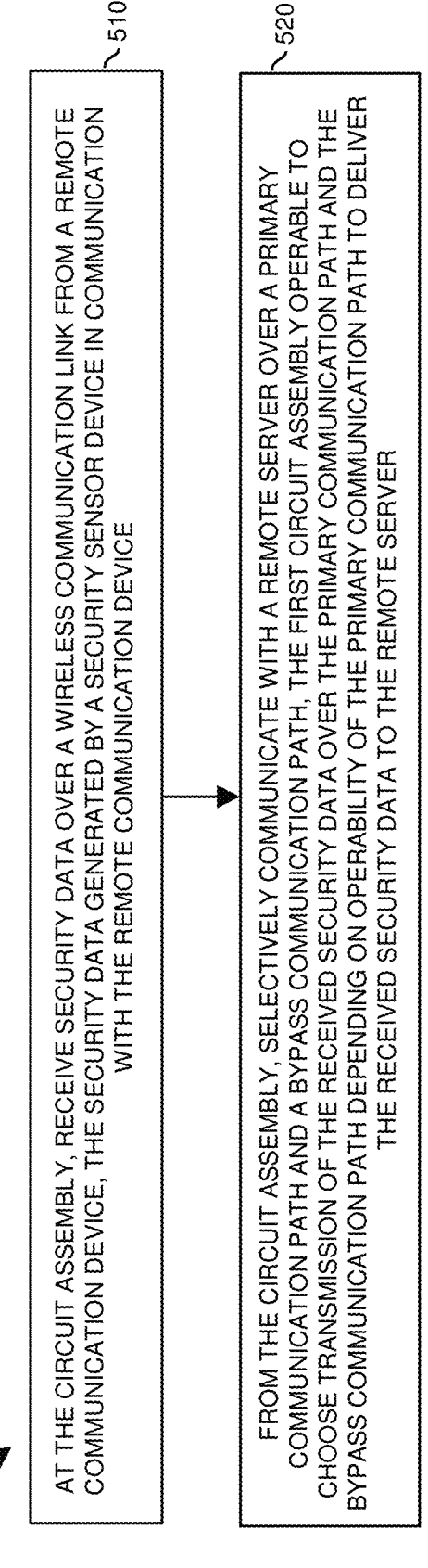

500

510

AT THE CIRCUIT ASSEMBLY, RECEIVE SECURITY DATA OVER A WIRELESS COMMUNICATION LINK FROM A REMOTE COMMUNICATION DEVICE, THE SECURITY DATA GENERATED BY A SECURITY SENSOR DEVICE IN COMMUNICATION WITH THE REMOTE COMMUNICATION DEVICE

520

FROM THE CIRCUIT ASSEMBLY, SELECTIVELY COMMUNICATE WITH A REMOTE SERVER OVER A PRIMARY COMMUNICATION PATH AND A BYPASS COMMUNICATION PATH, THE FIRST CIRCUIT ASSEMBLY OPERABLE TO CHOOSE TRANSMISSION OF THE RECEIVED SECURITY DATA OVER THE PRIMARY COMMUNICATION PATH AND THE BYPASS COMMUNICATION PATH DEPENDING ON OPERABILITY OF THE PRIMARY COMMUNICATION PATH TO DELIVER THE RECEIVED SECURITY DATA TO THE REMOTE SERVER

FIG. 5

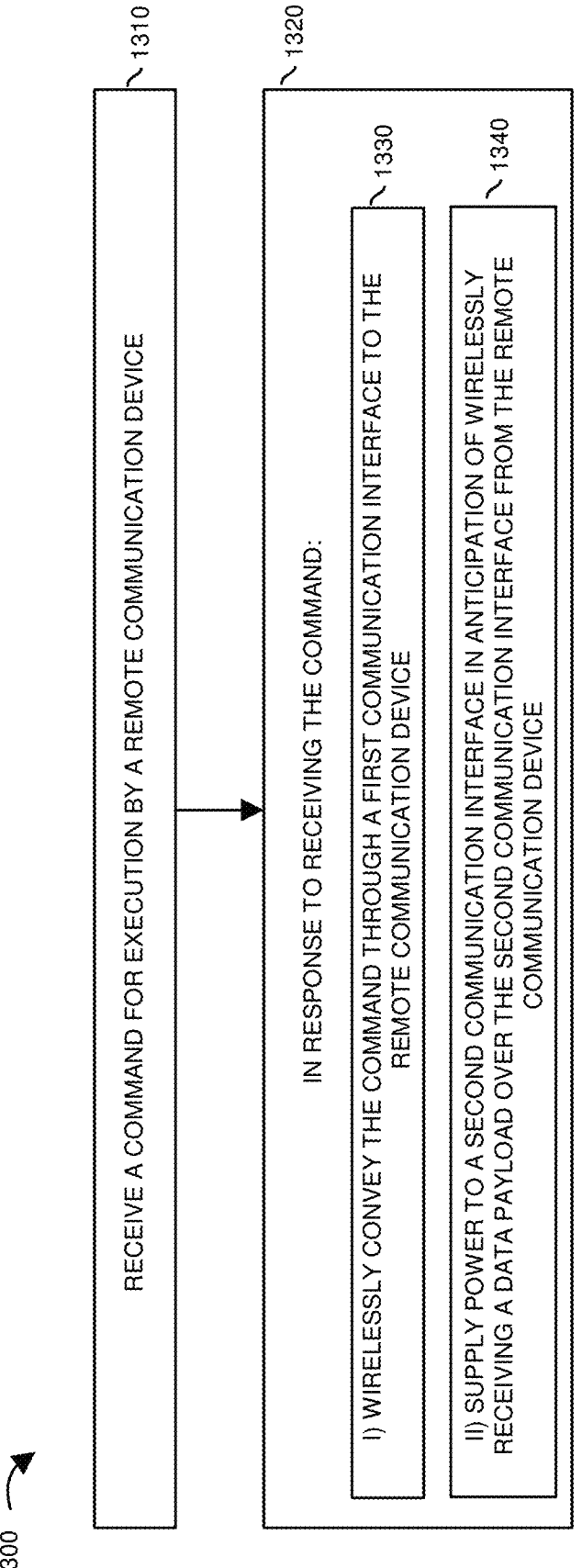

1300

1310

RECEIVE A COMMAND FOR EXECUTION BY A REMOTE COMMUNICATION DEVICE

1320

IN RESPONSE TO RECEIVING THE COMMAND:

1330

I) WIRELESSLY CONVEY THE COMMAND THROUGH A FIRST COMMUNICATION INTERFACE TO THE REMOTE COMMUNICATION DEVICE

1340

II) SUPPLY POWER TO A SECOND COMMUNICATION INTERFACE IN ANTICIPATION OF WIRELESSLY RECEIVING A DATA PAYLOAD OVER THE SECOND COMMUNICATION INTERFACE FROM THE REMOTE COMMUNICATION DEVICE

FIG. 13

CLAIM SET E
(MULTI PATH OPTIONS
TO FWD DATA TO A RECIPIENT)

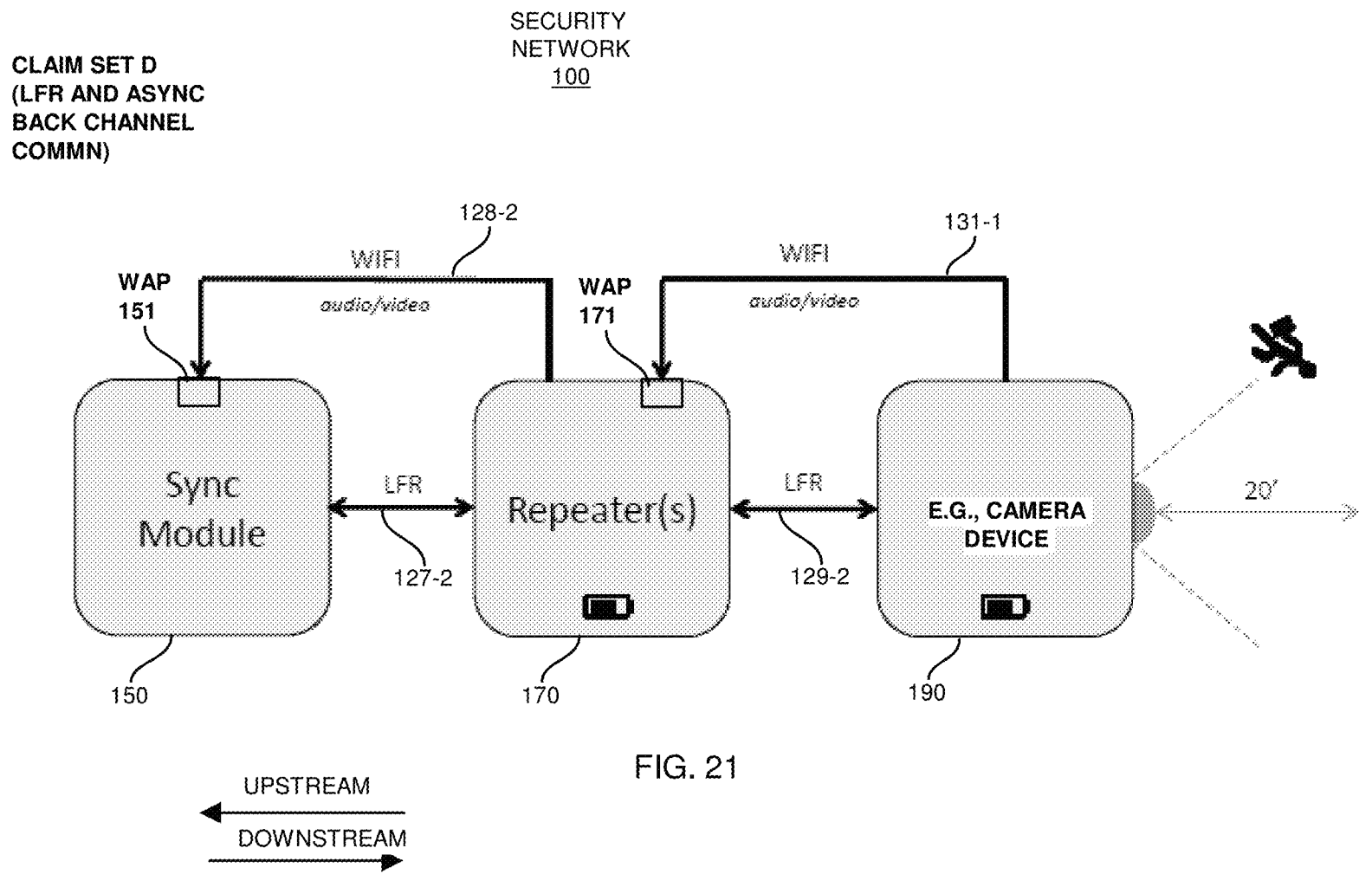

SECURITY
NETWORK
100

CLAIM SET D
(LFR AND ASYNC
BACK CHANNEL
COMMN)

20'

131-1

WIFI
audio/video

E.G., CAMERA
DEVICE

190

WAP
171

LFR 129-2

Repeater(s)

170

128-2

WIFI
audio/video

LFR 127-2

WAP
151

Sync
Module

150

UPSTREAM

DOWNSTREAM

FIG. 21

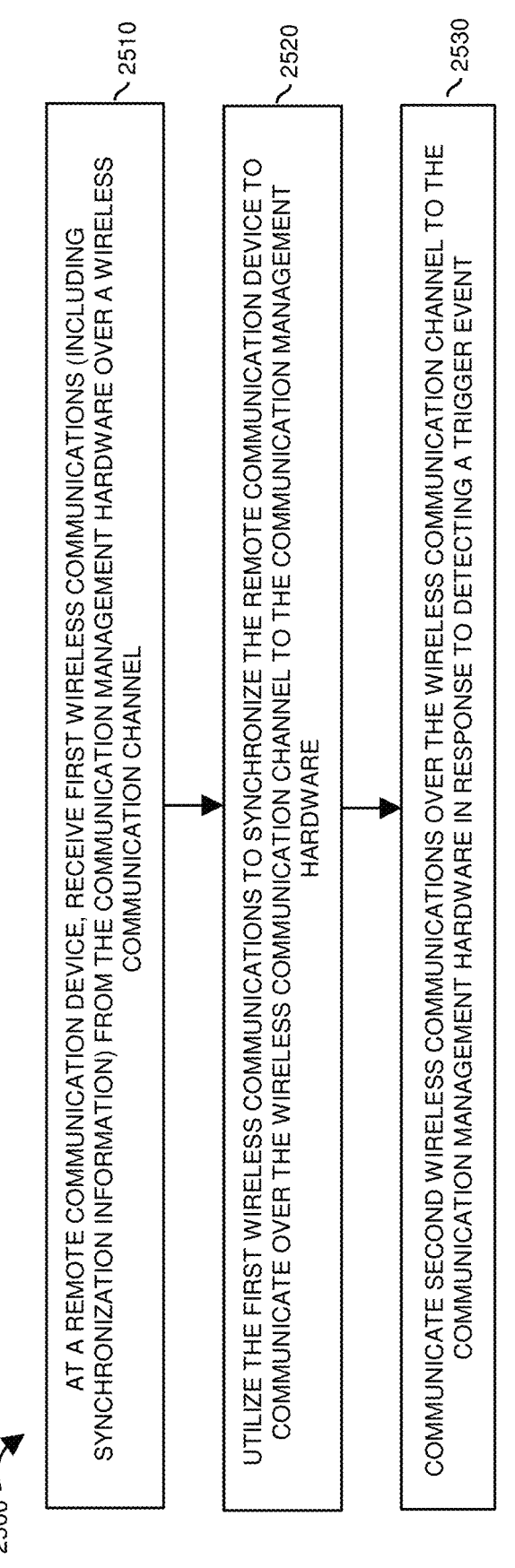

2500

2510

AT A REMOTE COMMUNICATION DEVICE, RECEIVE FIRST WIRELESS COMMUNICATIONS (INCLUDING SYNCHRONIZATION INFORMATION) FROM THE COMMUNICATION MANAGEMENT HARDWARE OVER A WIRELESS COMMUNICATION CHANNEL

2520

UTILIZE THE FIRST WIRELESS COMMUNICATIONS TO SYNCHRONIZE THE REMOTE COMMUNICATION DEVICE TO COMMUNICATE OVER THE WIRELESS COMMUNICATION CHANNEL TO THE COMMUNICATION MANAGEMENT HARDWARE

2530

COMMUNICATE SECOND WIRELESS COMMUNICATIONS OVER THE WIRELESS COMMUNICATION CHANNEL TO THE COMMUNICATION MANAGEMENT HARDWARE IN RESPONSE TO DETECTING A TRIGGER EVENT

FIG. 25

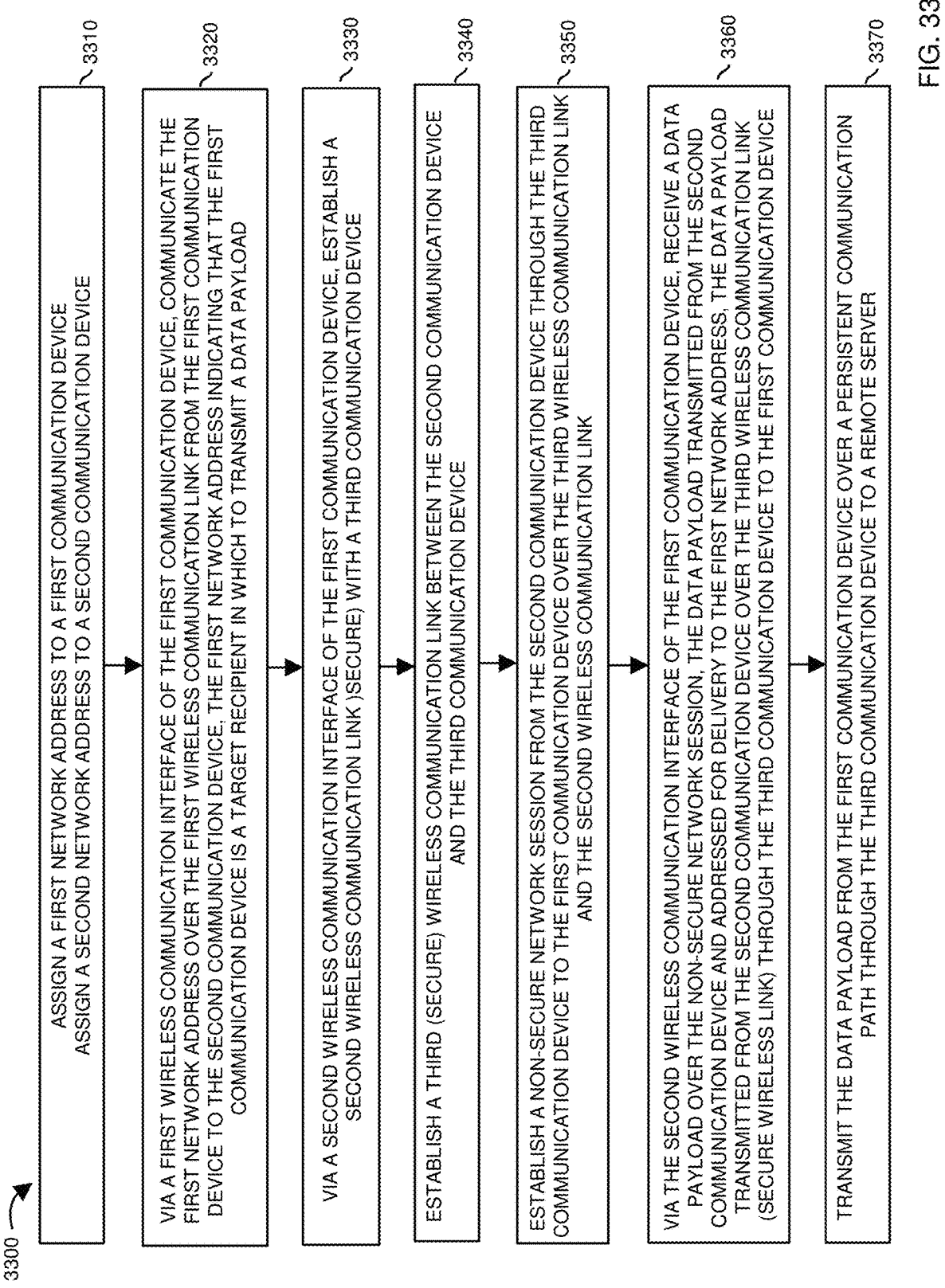

3300

ASSIGN A FIRST NETWORK ADDRESS TO A FIRST COMMUNICATION DEVICE
ASSIGN A SECOND NETWORK ADDRESS TO A SECOND COMMUNICATION DEVICE — 3310

VIA A FIRST WIRELESS COMMUNICATION INTERFACE OF THE FIRST COMMUNICATION DEVICE, COMMUNICATE THE FIRST NETWORK ADDRESS OVER THE FIRST WIRELESS COMMUNICATION LINK FROM THE FIRST COMMUNICATION DEVICE TO THE SECOND COMMUNICATION DEVICE, THE FIRST NETWORK ADDRESS INDICATING THAT THE FIRST COMMUNICATION DEVICE IS A TARGET RECIPIENT IN WHICH TO TRANSMIT A DATA PAYLOAD — 3320

VIA A SECOND WIRELESS COMMUNICATION INTERFACE OF THE FIRST COMMUNICATION DEVICE, ESTABLISH A SECOND WIRELESS COMMUNICATION LINK )SECURE) WITH A THIRD COMMUNICATION DEVICE — 3330

ESTABLISH A THIRD (SECURE) WIRELESS COMMUNICATION LINK BETWEEN THE SECOND COMMUNICATION DEVICE AND THE THIRD COMMUNICATION DEVICE — 3340

ESTABLISH A NON-SECURE NETWORK SESSION FROM THE SECOND COMMUNICATION DEVICE THROUGH THE THIRD COMMUNICATION DEVICE TO THE FIRST COMMUNICATION DEVICE OVER THE THIRD WIRELESS COMMUNICATION LINK AND THE SECOND WIRELESS COMMUNICATION LINK — 3350

VIA THE SECOND WIRELESS COMMUNICATION INTERFACE OF THE FIRST COMMUNICATION DEVICE, RECEIVE A DATA PAYLOAD OVER THE NON-SECURE NETWORK SESSION, THE DATA PAYLOAD TRANSMITTED FROM THE SECOND COMMUNICATION DEVICE AND ADDRESSED FOR DELIVERY TO THE FIRST NETWORK ADDRESS, THE DATA PAYLOAD TRANSMITTED FROM THE SECOND COMMUNICATION DEVICE OVER THE THIRD WIRELESS COMMUNICATION LINK (SECURE WIRELESS LINK) THROUGH THE THIRD COMMUNICATION DEVICE TO THE FIRST COMMUNICATION DEVICE — 3360

TRANSMIT THE DATA PAYLOAD FROM THE FIRST COMMUNICATION DEVICE OVER A PERSISTENT COMMUNICATION PATH THROUGH THE THIRD COMMUNICATION DEVICE TO A REMOTE SERVER — 3370

FIG. 33

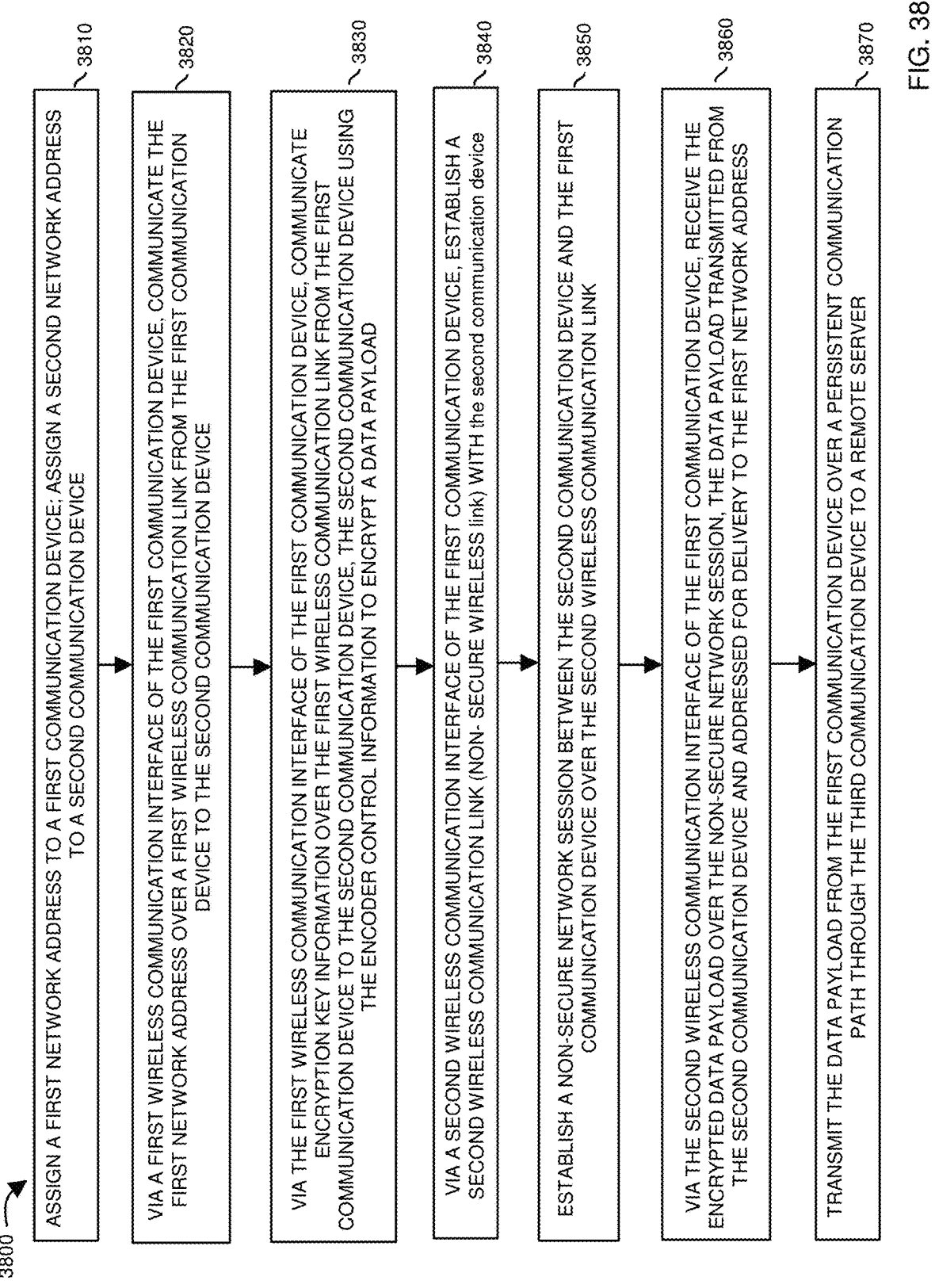

3800

ASSIGN A FIRST NETWORK ADDRESS TO A FIRST COMMUNICATION DEVICE; ASSIGN A SECOND NETWORK ADDRESS TO A SECOND COMMUNICATION DEVICE — 3810

VIA A FIRST WIRELESS COMMUNICATION INTERFACE OF THE FIRST COMMUNICATION DEVICE, COMMUNICATE THE FIRST NETWORK ADDRESS OVER A FIRST WIRELESS COMMUNICATION LINK FROM THE FIRST COMMUNICATION DEVICE TO THE SECOND COMMUNICATION DEVICE — 3820

VIA THE FIRST WIRELESS COMMUNICATION INTERFACE OF THE FIRST COMMUNICATION DEVICE, COMMUNICATE ENCRYPTION KEY INFORMATION OVER THE FIRST WIRELESS COMMUNICATION LINK FROM THE FIRST COMMUNICATION DEVICE TO THE SECOND COMMUNICATION DEVICE, THE SECOND COMMUNICATION DEVICE USING THE ENCODER CONTROL INFORMATION TO ENCRYPT A DATA PAYLOAD — 3830

VIA A SECOND WIRELESS COMMUNICATION INTERFACE OF THE FIRST COMMUNICATION DEVICE, ESTABLISH A SECOND WIRELESS COMMUNICATION LINK (NON- SECURE WIRELESS link) WITH the second communication device — 3840

ESTABLISH A NON-SECURE NETWORK SESSION BETWEEN THE SECOND COMMUNICATION DEVICE AND THE FIRST COMMUNICATION DEVICE OVER THE SECOND WIRELESS COMMUNICATION LINK — 3850

VIA THE SECOND WIRELESS COMMUNICATION INTERFACE OF THE FIRST COMMUNICATION DEVICE, RECEIVE THE ENCRYPTED DATA PAYLOAD OVER THE NON-SECURE NETWORK SESSION, THE DATA PAYLOAD TRANSMITTED FROM THE SECOND COMMUNICATION DEVICE AND ADDRESSED FOR DELIVERY TO THE FIRST NETWORK ADDRESS — 3860

TRANSMIT THE DATA PAYLOAD FROM THE FIRST COMMUNICATION DEVICE OVER A PERSISTENT COMMUNICATION PATH THROUGH THE THIRD COMMUNICATION DEVICE TO A REMOTE SERVER — 3870

FIG. 38

WIRELESS SECURITY NETWORK AND COMMUNICATION METHODS

RELATED APPLICATIONS

This application is related to U.S. Provisional Patent Application Ser. No. 62/317,034, filed on Apr. 1, 2016, the entire teachings of which are incorporated herein by this reference.

This application is related to U.S. Provisional Patent Application Ser. No. 62/316,823 entitled "Low Power WiFi Methods and System for Battery Powered Connected Devices," filed on Apr. 1, 2016, the entire teachings of which are incorporated herein by this reference.

This application is related to U.S. Provisional Patent Application Ser. No. 62/380,155, filed on Aug. 26, 2016, the entire teachings of which are incorporated herein by this reference.

This application is related to U.S. Provisional Patent Application Ser. No. 62/380,164, filed on Aug. 26, 2016, the entire teachings of which are incorporated herein by this reference.

This application is related to U.S. Provisional Patent Application Ser. No. 62/380,512, filed on Aug. 29, 2016, the entire teachings of which are incorporated herein by this reference.

BACKGROUND

Conventional home security systems can be used to monitor a respective home. For example, many homes today include a WiFi™ router device connected to the Internet. In certain instances, a remote communication device operated by a user is able to communicate with a security system controller through the home WiFi™ router. The controller, in turn, controls a respective camera in the home to collect images of a monitored location in the home. The camera communicates the collected images through the home WiFi™ router to the remote communication device operated by the user.

Accordingly, the user is able to remotely control a respective camera and receive images and/or audio of the monitored location as if the user was in the home.

BRIEF DESCRIPTION OF EMBODIMENTS

This disclosure includes the observation that many conventional security systems suffer from the drawback that many respective security system components (such as sensor devices, controllers, etc.) must be physically tethered with a power cable to a respective grid powered outlet (such as 120 VAC) to operate for long durations of time. In addition to the hurdle of needing to provide continuous power, and providing physical connectivity via respective cables, security system components must also be able to communicate with each other at times when no primary grid power (120 VAC) is available. To address this issue, a respective security system component may be backed up by battery. Unfortunately, even if a battery backup is available, conventional security system components typically deplete battery backup power rather quickly, rendering the security system useless for long power outages when no electrical grid power (such as 120 VAC) is available.

In contrast to conventional techniques, embodiments herein include novel ways of providing reduced power consumption and more robust (communication) connectivity in a wireless security system. Reducing power consumption as discussed herein ensures that the security system is able to operate for a long duration of time, potentially with minimal or no power from an electrical grid. Additionally, further embodiments herein provide redundant communication paths in which to selectively forward security data to a remote server. The availability of multiple communication paths ensures that a respective remote target recipient such as a server resource or remote communication device operated by a user can be notified of a trigger event during power failure conditions, such as when certain communication functionality of a security system is disabled.

Embodiments A

More specifically, in one embodiment, a manager resource (such as a circuit assembly, security management hardware, sync module, controller, etc.) receives security data over a wireless communication link from a remote communication device. A security sensor device of the remote communication device generates the security data. In response to receiving the security data, the manager resource selectively communicates with a remote server over a primary communication path (such as an in-home router) and a bypass communication path (such as a wireless 4G/LTE path). The manager resource can be configured to transmit the received security data over the primary communication path or the bypass communication path depending on operability of the primary communication path to deliver the received security data to the remote server.

As an example, if the primary communication path is disabled for any reason such as because of the power outage, link failure, communication service provider failure, etc., the manager resource transmits the received security data over the bypass communication path to the remote server. Accordingly, the manager resource is able to convey data to the remote server even though the primary communication path experiences a respective failure.

The security data generated by a respective security device and communicated to the remote communication device can be any suitable type of data. For example, the security data can be video data capturing images at a remote location monitored by the security sensor device; the security can be audio data captured by a microphone in the remote communication device, etc.

In accordance with further embodiments, the manager resource receiving the security data can be configured to convey a first portion of the received security data to the remote server over the primary communication path. In response to detecting that the primary communication path becomes inoperable to convey a second portion of received security data to the remote server, the security management device switches over to transmitting the second portion of the received security data over the bypass communication path.

In yet another embodiment, a battery powers a combination of hardware such as the remote communication device and the corresponding security sensor device (such as a video security camera). As previously discussed, the security data can be video data of images or audio data of sound captured by the security sensor device monitoring a location. A failure condition such as loss of power may render it impossible for the manager resource (such as powered by a battery during a power failure condition) to communicate over the primary communication path. In such an instance, the security sensor device communicates the security data over the bypass communication path to the remote server instead of the primary communication path. Under normal circumstances, when the primary communication path is operable, the manager resource would otherwise communicate the received security data over the primary communication path to the remote server.

In certain instances, the remote communication device may detect occurrence of the trigger event in which the remote communication device stores the security data for subsequent transmission to the manager resource. Initially, there may be no wireless communication link established to transmit the collective security data from the remote communication device to the security management hardware. In such an instance, the remote communication device can be configured to communicate a message indicating availability of the security data (a.k.a., data payload) to the security management device over a low-power wireless channel to the security management hardware.

In one embodiment, via receipt of the message, the security management device detects availability of the security data while a respective wireless access point interface for communicating with the remote communication device is depowered. Note that the depowering of the wireless access point when it is not used (such as prior to receiving the message) reduces power consumption of the security management hardware. In response to receiving the message indicating the trigger event and/or availability of the security data, the security management device activates (such as powers up) a respective wireless access point in the security management hardware so that client devices are able to communicate with the manager resource via the newly activated wireless access point.

In one embodiment, the remote communication device communicates with the respective wireless access point of the manager resource in order to establish a respective wireless communication link prior to communicating the available data to the manager resource. Subsequent to establishing the respective wireless communication link with the newly powered wireless access point of the manager resource, the remote communication device then communicates the security data generated by the security sensor device over the established wireless communication link to the manager resource. In a manner as previously discussed, the manager resource then selectively transmits the received security data over the primary communication path and/or the bypass communication path to the remote server in a manner as previously discussed.

These and other more specific embodiments are disclosed in more detail below.

Note that any of the resources as discussed herein can include one or more computerized devices, medical devices, mobile devices, servers, base stations, wireless playback equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium or hardware storage media disparately or co-located) on which software instructions are encoded for subsequent execution. The instructions, when executed in a computerized device (hardware) having a processor, program and/or cause the processor (hardware) to perform any of the operations disclosed herein. Such arrangements are typically provided as software, code, instructions, and/or other data (e.g., data structures) arranged or encoded on a non-transitory computer readable storage media such as an optical medium (e.g., CD-ROM), floppy disk, hard disk, memory stick, memory device, etc., or another medium, such as firmware in one or more ROM, RAM, PROM, etc., and/or as an Application Specific Integrated Circuit (ASIC), etc. The software or firmware or other such configurations can be installed onto a computerized device to cause the computerized device to perform any operations explained herein.

Accordingly, embodiments herein are directed to methods, apparatus, computer program products, computer-readable media, etc., that support operations as discussed herein.

One embodiment includes a computer readable storage media and/or apparatus having instructions stored thereon to enhance functionality of a security system. For example, in one embodiment, the instructions, when executed by computer processor hardware, cause the computer processor hardware (such as one or more processor devices) to: receive security data over a wireless communication link from a remote communication device, the security data generated by a security sensor device in communication with the remote communication device; and, via communication hardware, selectively communicate with a remote server over a primary communication path and a bypass communication path, the communication hardware operable to choose transmission of the received security data over the primary communication path and the bypass communication path depending on operability of the primary communication path to deliver the received security data to the remote server.

The ordering of the steps above has been added for clarity's sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the apparatus, method, system, instructions on computer readable storage media, etc., as discussed herein also can be embodied strictly as a software program, firmware, as a hybrid of software, hardware and/or firmware, or as hardware alone such as within a processor (hardware or software), or within an operating apparatus or a within a software application.

As discussed herein, techniques herein are well suited for use in the field of security monitoring applications. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Embodiments B

More specifically, in one embodiment, a manager resource (such as a circuit assembly, security management hardware, sync module, controller, etc.) includes and controls operation of a first radio communication interface and a second radio communication interface. During operation, the manager resource monitors presence of first wireless communications from a remote communication device over the first radio communication interface. The manager resource controls operation of the second radio communication interface based on the first wireless communications.

For example, in response to receiving the first wireless communications (such as a notification of a trigger event such as that a data payload is available at the remote communication device for delivery to the manager resource) from the communication device over the first radio communication interface, the manager resource transitions the second radio communication interface from a reduced power state (such as an OFF state) to an active state (such as an ON state) to receive (subsequent) second wireless communications from the remote communication device. In one embodiment, the second wireless communications include data captured by a respective security sensor device of the remote communication device.

In one embodiment, the manager resource transmits or broadcasts synchronization information from its first radio communication interface to the remote communication device to establish a channel on which to receive the first wireless communications. The remote communication device uses the received synchronization information to synchronize itself with respect to a time-slotted communication channel between the manager resource and the remote communication device. The manager resource is assigned one or more time slots of the time slotted communication channel in which to communicate messages to the remote communication device. The remote communication device is assigned one or more time slots of the time slotted communication channel in which to communicate from the remote communication device to the first radio communication interface of the manager resource.

Accordingly, the manager resource operates the first radio communication interface to generate and maintain a time-slotted wireless channel supporting communications between the first radio communication interface and the remote communication device.

Subsequent to the manager resource activating the wireless access point in response to receiving notification from the remote communication device that a data payload is available, the remote communication device communicates with the first radio communication interface of the manager resource to establish a respective wireless communication link with the manager resource.

In one embodiment, the first radio communication interface operates at substantially one or more lower carrier frequencies than respective one or more carrier frequency of the second radio communication interface. For example, the second radio communication interface can be a wireless access point in which, subsequent to the transitioning to an active state by the manager resource, the remote communication device establishes a wireless communication link from a wireless communication interface of the remote communication device to the second radio communication interface. The second radio communication interface (such as newly powered wireless access point or base station) receives the request from the remote communication device over the second radio communication interface to establish the wireless communication link with the second radio communication interface. After establishing the wireless communication link between the remote communication device and the wireless access point of the manager resource, the remote communication device then transmits the data payload over the established wireless communication link to the manager resource.

In yet further embodiments, the manager resource operates the first radio communication interface at a different set of carrier frequencies than used by the second radio communication interface to receive the second wireless communications.

Note that the manager resource (circuit assembly including the first radio communication interface and the second radio communication interface) can be powered by any suitable resource.

In one embodiment, the circuit assembly and/or the second radio communication interface is powered only via power received from a battery. The manager resource deactivates the second radio communication interface at different times to reduce power consumption such as during times when no data is available for receipt from the remote communication device. Thus, during conditions such as when no data is available for receipt, or generally when the second radio communication interface is not being used, the manager resource discontinues supplying power to the second radio communication interface to save battery power, increasing the respective battery's useful life.

In accordance with still further embodiments, as previously discussed, the first wireless communications received over the first radio communication interface from the remote communication device notifies a controller (manager resource) to activate the second radio communication interface of the manager resource. The second wireless communications received from the remote communication device over the second radio communication interface includes security data generated by a security sensor device associated with the remote communication device. In one embodiment, the security sensor device is a security camera that is activated in response to detecting movement of an object in a monitored region. The security sensor device produces the security data in response to detecting the movement of the object. The remote communication device produces and transmits the first wireless communications to notify the controller to activate the second radio communication interface to receive the security data from the remote communication device.

These and other more specific embodiments are disclosed in more detail below.

Note that any of the resources as discussed herein can include one or more computerized devices, medical devices, mobile devices, servers, base stations, wireless playback equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium or hardware storage media (disparately or co-located) on which software instructions are encoded for subsequent execution. The instructions, when executed in a computerized device (hardware) having a processor, program and/or cause the processor (hardware) to perform any of the operations disclosed herein. Such arrangements are typically provided as software, code, instructions, and/or other data (e.g., data structures) arranged or encoded on a non-transitory computer readable storage media such as an optical medium (e.g., CD-ROM), floppy disk, hard disk, memory stick, memory device, etc., or another medium, such as firmware in one or more ROM, RAM, PROM, etc., and/or as an Application Specific Integrated Circuit (ASIC), etc. The software or firmware or other such configurations can be installed onto a computerized device to cause the computerized device to perform any operations explained herein.

Accordingly, embodiments herein are directed to methods, apparatus, computer program products, computer-readable media, etc., that support operations as discussed herein.

One embodiment includes a computer readable storage media and/or apparatus having instructions stored thereon to enhance functionality of a security system. For example, in one embodiment, the instructions, when executed by computer processor hardware, cause the computer processor hardware (such as one or more processor devices) to: monitor presence of first wireless communications from a remote communication device over a first radio communication interface; control operation of a second radio communication interface based on the first wireless communications; and in response to receiving the first wireless communications from the communication device over the first radio communication interface, transition the second radio communication interface from a reduced power state to an active state to receive second wireless communications from the remote communication device.

The ordering of the steps above has been added for clarity's sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the apparatus, method, system, instructions on computer readable storage media, etc., as discussed herein also can be embodied strictly as a software program, firmware, as a hybrid of software, hardware and/or firmware, or as hardware alone such as within a processor (hardware or software), or within an operating apparatus or a within a software application.

As discussed herein, techniques herein are well suited for use in the field of security monitoring applications. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Embodiments C

More specifically, in one embodiment, a manager resource (such as a circuit assembly, security management hardware, sync module, controller, etc.) includes and controls operation of a first radio communication interface and a second radio communication interface. Assume that the manager resource receives a command generated by a source to control operation of a remote communication device. In response to receiving the command: the manager resource wirelessly conveys the command through a first communication interface to the remote communication device to which the command pertains. The manager resource then supplies power to the second communication interface in anticipation of wirelessly receiving a data payload over the second communication interface from the remote communication device.

In one embodiment, the command conveyed from the manager resource through the first communication interface to the remote communication device notifies the remote communication device to communicate a data payload (such as data collected by a respective sensor device of the remote communication device) to the second communication interface. To send the data payload, and in response to receiving the command from the manager resource, the remote communication device initiates establishing a wireless communication link between the remote communication device and the second communication interface.

In accordance with further embodiments, the remote communication device is operable to: i) capture images in a monitored region in response to receiving the command, and ii) convey the captured images as the data payload over the second communication interface, when activated, to the manager resource. Thus, the manager resource receives the data payload from the remote communication device over the second communication interface.

In yet further embodiments, the command received by the manager resource can indicate to activate a corresponding wireless communication interface of the remote communication device to convey a respective data payload to the manager resource. In such an instance, the wireless communication interface of the remote communication device initially can be maintained in a deactivated state to save energy prior to receiving the command. Receipt of the command at the remote communication device causes the remote communication device to increase power consumption by powering the wireless interface to communicate the data payload to the manager resource.

In one embodiment, the manager resource transmits or broadcasts synchronization information from the first radio communication interface to the remote communication device. The remote communication device uses the received synchronization information to synchronize itself with respect to a time-slotted communication channel between the manager resource and the remote communication device. The manager resource is assigned one or more time slots in which to communicate messages from the first radio communication interface to the remote communication device. The remote communication device is assigned one or more time slots in which to communicate from the remote communication device to the first radio communication interface of the manager resource. Accordingly, the manager resource can be configured to operate the first radio communication interface to generate a time-slotted wireless channel supporting communications between the first radio communication interface and the remote communication device.

Note that the manager resource can include a third wireless interface as well. In accordance with further embodiments, the manager resource supplies power to the third wireless communication interface in response to receiving the command in order to convey data payload to a target recipient. Via the third wireless communication interface, the manager resource communicates the data payload received from the remote communication device over the third wireless communication interface to the target recipient.

In accordance with yet further embodiments, the first radio communication interface operates at substantially one or more lower carrier frequencies than respective one or more carrier frequency of the second radio communication interface. The second radio communication interface can be a wireless access point in which, subsequent to the transitioning to be active state, the remote communication device establishes a wireless communication link from a wireless communication interface of the remote communication device to the second radio communication interface. The newly powered second radio communication interface (such as wireless access point, base station, etc.) receives the request from the remote communication device over the second radio communication interface to establish the wireless communication link with the second radio communication interface. The remote communication device then transmits the data payload over the established wireless communication link.

The manager resource (circuit assembly including the first radio communication interface and the second radio communication interface) can be powered by any suitable resource.

In one embodiment, the circuit assembly and/or the second radio communication interface is powered only via power received from a battery. As discussed herein, the manager resource can be configured to activate the second radio communication interface at different times to reduce power consumption such as during times when no data is available for receipt from the remote communication device. Thus, during conditions such as when no data is available for receipt, or generally when the second radio communication interface is not being used, the manager resource discontinues supplying power to the second radio communication interface to save battery power, increasing the battery's useful life.

These and other more specific embodiments are disclosed in more detail below.

Note that any of the resources as discussed herein can include one or more computerized devices, medical devices, mobile devices, servers, base stations, wireless playback equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium or hardware storage media disparately or co-located) on which software instructions are encoded for subsequent execution. The instructions, when executed in a computerized device (hardware) having a processor, program and/or cause the processor (hardware) to perform any of the operations disclosed herein. Such arrangements are typically provided as software, code, instructions, and/or other data (e.g., data structures) arranged or encoded on a non-transitory computer readable storage media such as an optical medium (e.g., CD-ROM), floppy disk, hard disk, memory stick, memory device, etc., or another medium, such as firmware in one or more ROM, RAM, PROM, etc., and/or as an Application Specific Integrated Circuit (ASIC), etc. The software or firmware or other such configurations can be installed onto a computerized device to cause the computerized device to perform any operations explained herein.

Accordingly, embodiments herein are directed to methods, apparatus, computer program products, computer-readable media, etc., that support operations as discussed herein.

One embodiment herein includes a computer readable storage media and/or apparatus having instructions stored thereon to enhance functionality of a security system. For example, in one embodiment, the instructions, when executed by computer processor hardware, cause the computer processor hardware (such as one or more processor devices) to: receive a command for execution by a remote communication device; and in response to receiving the command: i) wirelessly convey the command through a first communication interface to the remote communication device, and ii) supply power to a second communication interface in anticipation of wirelessly receiving a data payload over the second communication interface from the remote communication device.

The ordering of the steps above has been added for clarity's sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the apparatus, method, system, instructions on computer readable storage media, etc., as discussed herein also can be embodied strictly as a software program, firmware, as a hybrid of software, hardware and/or firmware, or as hardware alone such as within a processor (hardware or software), or within an operating apparatus or a within a software application.

As discussed herein, techniques herein are well suited for use in the field of security monitoring applications. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Embodiments D

More specifically, in one embodiment, a communication system includes communication management hardware (such as a manager resource, circuit assembly, security management hardware, sync module, controller, etc.) and a remote communication device. The remote communication device receives first wireless communications from the communication management hardware over a time-slotted wireless communication channel. The first wireless communications are used to synchronize the remote communication device to communicate in a reverse direction in appropriate one or more assigned timeslots over the wireless communication channel to the communication management hardware. In other words, the remote communication device uses the first wireless communications (as received in one or more cycles of the time slotted wireless channel) as a basis to synchronize itself to communicate in the time-slotted channel.

Additionally, subsequent to the synchronizing, the remote communication device communicates second wireless communications over the wireless communication channel to the communication management hardware in response to the remote communication device detecting a trigger event.

Accordingly, embodiments herein include establishing and maintaining a respective time slotted communication channel in which communication management hardware communicates with a remote communication device; and in a reverse direction, the remote communication device communicates with the communication management hardware.

In accordance with further embodiments, unlike the temporary wireless communication link between the manager resource and the remote communication device, the wireless communication channel is a persistent time-slotted channel in which the communication management hardware is assigned a first time slot in each cycle of the time-slotted channel to selectively transmit the first wireless communications in a forward direction from the communication management hardware to the remote communication device. The remote communication device is assigned a second time slot in each cycle of the time slotted channel to selectively transmit the second wireless communications in the reverse direction from the remote communication device to the communication management hardware.

Note that the remote communication device can communicate over the time slotted channel even during a respective cycle in which the communication management hardware does not communicate to the remote communication device. As a specific example, in one embodiment, the remote communication device communicates the second wireless communications in the second time slot of a given cycle of the time-slotted channel in which the communication management hardware does not transmit the first wireless communications or any communications to the remote communication device. The at least occasional synchronization of the remote communication device to the time-slotted communication channel ensures that the remote communication device can communicate to the communication management hardware in its assigned one or more time slot in any cycle, reducing delays.

Accordingly, embodiments herein include a communication system in which the communication management hardware is assigned a first time slot to transmit the first wireless communications in a forward direction from the communication management hardware to the remote communication device; the remote communication device synchronizes itself to the time-slotted channel based on a time of receiving the first wireless communications in the first time slot. The remote communication device communicates the second wireless communications to the communication management hardware in a second time slot of the time-slotted channel.

In accordance with still further embodiments, the communication system includes multiple remote communication devices, each respective remote communication device of the remote communication devices operable to receive the first wireless communications in the first time slot to synchronize the respective remote communication device with respect to the time-slotted channel to communicate in the reverse direction from the respective remote communication device to the communication management hardware.

In accordance with yet further embodiments, the second wireless communications from the remote communication device over the time slotted communication channel notifies the communication management hardware to apply power to a wireless communication interface of the communication management hardware to receive a subsequently transmitted data payload from the remote communication device. In this manner, the remote communication device transmits the second wireless communications to notify the communication management hardware of a trigger event such as that the remote communication device will communicate a data payload to the communication management hardware.

In one embodiment, the remote communication device monitors events occurring in a region on behalf of a respective user. The communication system further includes a network gateway resource. Subsequent to receiving a wireless data payload from the remote communication device, the communication management hardware wirelessly communicates the data payload received from the remote communication device to the network gateway resource; the network gateway resource communicating the data payload to a server resource that is operable to provide the respective user access to the data payload.

In accordance with yet further embodiments, the time slotted communication channel is a frequency hopped time-slotted channel over which the communication management hardware and the remote communication device communicate.

Note that any suitable one or more power resources can power the communication management hardware. For example, in one embodiment, the communication management hardware and/or remote communication device is powered only by battery.

These and other more specific embodiments are disclosed in more detail below.

Note that any of the resources as discussed herein can include one or more computerized devices, medical devices, mobile devices, servers, base stations, wireless playback equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium or hardware storage media disparately or co-located) on which software instructions are encoded for subsequent execution. The instructions, when executed in a computerized device (hardware) having a processor, program and/or cause the processor (hardware) to perform any of the operations disclosed herein. Such arrangements are typically provided as software, code, instructions, and/or other data (e.g., data structures) arranged or encoded on a non-transitory computer readable storage media such as an optical medium (e.g., CD-ROM), floppy disk, hard disk, memory stick, memory device, etc., or another medium, such as firmware in one or more ROM, RAM, PROM, etc., and/or as an Application Specific Integrated Circuit (ASIC), etc. The software or firmware or other such configurations can be installed onto a computerized device to cause the computerized device to perform any operations explained herein.

Accordingly, embodiments herein are directed to methods, apparatus, computer program products, computer-readable media, etc., that support operations as discussed herein.

One embodiment herein includes a computer readable storage media and/or apparatus having instructions stored thereon to enhance functionality of a security system. For example, in one embodiment, the instructions, when executed by computer processor hardware, cause the computer processor hardware (such as one or more processor devices) to: at a remote communication device, receive first wireless communications (including synchronization information) from the communication management hardware over a wireless communication channel; utilize the first wireless communications to synchronize the remote communication device to communicate over the wireless communication channel to the communication management hardware; and communicate second wireless communications over the wireless communication channel to the communication management hardware in response to detecting a trigger event.

The ordering of the steps above has been added for clarity's sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the apparatus, method, system, instructions on computer readable storage media, etc., as discussed herein also can be embodied strictly as a software program, firmware, as a hybrid of software, hardware and/or firmware, or as hardware alone such as within a processor (hardware or software), or within an operating apparatus or a within a software application.

As discussed herein, techniques herein are well suited for use in the field of security monitoring applications. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Embodiments E

More specifically, in one embodiment, a remote communication device of a wireless secondary system monitors a location for occurrence of a trigger event such as motion detection of an object, opening of a door, etc. The trigger event indicates security with respect to the location being monitored. Assume that the remote communication device detects the trigger event occurring at the monitor location. In response to detecting the trigger event, the communication device produces a message indicating the trigger event. The remote communication device then selects amongst a first wireless access point and a second wireless access point to communicate the message indicating the trigger event to a remote management server.

In accordance with other embodiments, the second wireless access point is operable to communicate or attempt to communicate the message indicating the trigger event through the first wireless access point (such as an in-home router) to the remote management server. For example, the remote communication device can be configured to initially attempt to communicate the message to the first wireless access point for subsequent delivery of the message by the first wireless access point to the remote management server.

In one embodiment, the remote communication device may not be able to establish a respective wireless communication link with the first wireless access point. The inability to establish the wireless communication link to the first wireless access point can occur for any reason such as due to failure of power delivery (e.g., failure of grid power, failure of a battery, etc.) to the first wireless access point. In response to detecting the inability to communicate the message to the first wireless access point, the remote communication device communicates the message to the second wireless access point instead of the first wireless access point.

In accordance with further embodiments, the first wireless access point is part of a gateway resource (such as an in-home router) communicatively coupled to a hard-wired network to communicate with the remote management server. The second wireless access point is part of communication management hardware communicatively coupled to the remote management server via: i) a primary wireless communication link to the first wireless access point, and ii) a bypass wireless communication link to the remote server.

In one embodiment, the bypass wireless communication link is a wireless mobile phone link providing access to a public switched telephone network in communication with the server resource.

As previously discussed, the remote communication device can be configured to communicate the message (any data payload) to the second wireless access point in response to detecting an inability to communicate the message to the first wireless access point. The second wireless access point may be unpowered (not usable) when the remote communication device comes to communicate the message to the second wireless access point. In such an instance, in order to transmit the message, prior to communicating the message to the second wireless access point, the remote communication device wirelessly communicates a command (such as a power control command) to switch the second wireless access point from a power saving mode to a powered mode in which the respective wireless access point is now available for use.

In one embodiment, the second wireless access point is powered solely by battery. Selective activation via communications from the remote communication device ensures that the second wireless access point is powered only when needed as opposed to being on time, which would deplete energy stored in a respective battery used to power the second wireless access point.

Upon receiving notification to activate the second wireless access point, appropriate control circuitry powers the second wireless access point to receive subsequent communications from the remote communication device. The remote communication device then establishes a wireless communication link with the second wireless access point subsequent to the second wireless access point being switched to the powered mode. Accordingly, the remote communication device wirelessly controls activation of powering the second wireless access point to communicate one or more messages from the remote communication device to the second wireless access point.

As further described herein, the remote communication device can be configured to communicate the command over a time slotted communication channel (such as a low power channel) in which a time slot is assigned to the remote communication device to communicate with communication hardware in control of the second wireless access point.

These and other more specific embodiments are disclosed in more detail below.

Note that any of the resources as discussed herein can include one or more computerized devices, medical devices, mobile devices, servers, base stations, wireless playback equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium or hardware storage media disparately or co-located) on which software instructions are encoded for subsequent execution. The instructions, when executed in a computerized device (hardware) having a processor, program and/or cause the processor (hardware) to perform any of the operations disclosed herein. Such arrangements are typically provided as software, code, instructions, and/or other data (e.g., data structures) arranged or encoded on a non-transitory computer readable storage media such as an optical medium (e.g., CD-ROM), floppy disk, hard disk, memory stick, memory device, etc., or another medium, such as firmware in one or more ROM, RAM, PROM, etc., and/or as an Application Specific Integrated Circuit (ASIC), etc. The software or firmware or other such configurations can be installed onto a computerized device to cause the computerized device to perform any operations explained herein.

Accordingly, embodiments herein are directed to methods, apparatus, computer program products, computer-readable media, etc., that support operations as discussed herein.

One embodiment herein includes a computer readable storage media and/or apparatus having instructions stored thereon to enhance functionality of a security system. For example, in one embodiment, the instructions, when executed by computer processor hardware, cause the computer processor hardware (such as one or more processor devices) to: monitor a location for occurrence of a trigger event, the trigger event indicating security with respect to the location; detect the trigger event; produce a message indicating the trigger event; and select amongst a first wireless access point and a second wireless access point to communicate the message indicating the trigger event to a remote management server.

The ordering of the steps above has been added for clarity's sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the apparatus, method, system, instructions on computer readable storage media, etc., as discussed herein also can be embodied strictly as a software program, firmware, as a hybrid of software, hardware and/or firmware, or as hardware alone such as within a processor (hardware or software), or within an operating apparatus or a within a software application.

As discussed herein, techniques herein are well suited for use in the field of security monitoring applications. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Embodiments F

More specifically, in a first embodiment, a network address manager resource (such as a DHCP server) assigns a first network address to a first communication device and a second network address to a second communication device in a security-monitoring network. The second communication device is in wireless communication with the first communication device.

The first communication device communicates the first network address over a first wireless communication link of the first communication device to the second communication device. The first network address indicates that the first communication device is a target recipient in which to transmit a data payload. Via a second wireless communication interface of the first communication device, the first communication device establishes a second wireless communication link (such as a secure wireless link) with a third communication device.

The second communication device establishes a third (secure) wireless communication link between the second communication device and the third communication device. The second communication device further establishes a non-secure network session from the second communication device over a combination of the third communication device to the first communication device over the third wireless communication link and the second wireless communication link.

Via the second wireless communication interface of the first communication device, the first communication device receives a data payload over the non-secure network session. In one embodiment, the data payload is transmitted from the second communication device and addressed for delivery to the first network address. The second communication device transmits the data payload transmitted from the second communication device over the third wireless communication link (secure wireless link) to the third communication device. The third communication device transmits the data payload to the first communication device over the second wireless communication link. The first communication device transmits the data payload over a persistent communication path through the third communication device to a remote server.

In a second embodiment, a network address manager resource (such as a DHCP server) assigns a first network address to a first communication device; the network address manager resource assigns a second network address to a second communication device in a security-monitoring network.

Via a first wireless communication interface of the first communication device, the first communication device communicates the first network address over a first wireless communication link from the first communication device to the second communication device.

Additionally, the first communication device communicates encryption key information over the first wireless communication interface of the first communication device over the first wireless communication link to the second communication device. The second communication device uses the encryption key information to encrypt a data payload.

Via a second wireless communication interface of the first communication device, the first communication device establishes a second wireless communication link (non-secure wireless link) with the second communication device. The second communication device and/or the first communication device establish a non-secure network session between the second communication device and the first communication device over the second wireless communication link.

Via the second wireless communication interface of the first communication device, the first communication device receives the encrypted data payload over the non-secure network session. The second communication device transmits the encrypted data payload in a message addressed to the first network address.

Subsequent to receiving the encrypted data payload, the first communication device transmits the data payload over a persistent communication path through the third communication device to a remote server.

These and other more specific embodiments are disclosed in more detail below.

Note that any of the resources as discussed herein can include one or more computerized devices, medical devices, mobile devices, servers, base stations, wireless playback equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium or hardware storage media disparately or co-located) on which software instructions are encoded for subsequent execution. The instructions, when executed in a computerized device (hardware) having a processor, program and/or cause the processor (hardware) to perform any of the operations disclosed herein. Such arrangements are typically provided as software, code, instructions, and/or other data (e.g., data structures) arranged or encoded on a non-transitory computer readable storage media such as an optical medium (e.g., CD-ROM), floppy disk, hard disk, memory stick, memory device, etc., or another medium, such as firmware in one or more ROM, RAM, PROM, etc., and/or as an Application Specific Integrated Circuit (ASIC), etc. The software or firmware or other such configurations can be installed onto a computerized device to cause the computerized device to perform any operations explained herein.

Accordingly, embodiments herein are directed to methods, apparatus, computer program products, computer-readable media, etc., that support operations as discussed herein.

One embodiment herein includes a computer readable storage media and/or apparatus having instructions stored thereon to enhance functionality of a security system. For example, in one embodiment, the instructions, when executed by computer processor hardware, cause the computer processor hardware (such as one or more processor devices) to: assign a first network address to a first communication device; assign a second network address to a second communication device; via a first wireless communication interface of the first communication device, communicate the first network address over the first wireless communication link from the first communication device to the second communication device, the first network address indicating that the first communication device is a target recipient in which to transmit a data payload; via a second wireless communication interface of the first communication device, establish a second wireless communication link)secure) with a third communication device; establish a third (secure) wireless communication link between the second communication device and the third communication device; establish a non-secure network session from the second communication device through the third communication device to the first communication device over the third wireless communication link and the second wireless communication link; via the second wireless communication interface of the first communication device, receive a data payload over the non-secure network session, the data payload transmitted from the second communication device and addressed for delivery to the first network address, the data payload transmitted from the second communication device over the third wireless communication link (secure wireless link) to the third communication device; and transmit the data payload from the first communication device over a persistent communication path through the third communication device to a remote server.

Another embodiment herein includes a computer readable storage media and/or apparatus having instructions stored thereon to enhance functionality of a security system. For example, in such an embodiment, the instructions, when executed by computer processor hardware, cause the computer processor hardware (such as one or more processor devices) to: assign a first network address to a first communication device; assign a second network address to a second communication device; via a first wireless communication interface of the first communication device, communicate the first network address over a first wireless communication link from the first communication device to the second communication device; via the first wireless communication interface of the first communication device, communicate encryption key information over the first wireless communication link from the first communication device to the second communication device, the second communication device using the encoder control information to encrypt a data payload; via a second wireless communication interface of the first communication device, establish a second wireless communication link (non-secure wireless link) with the second communication device; establish a non-secure network session between the second communication device and the first communication device over the second wireless communication link; via the second wireless communication interface of the first communication device, receive the encrypted data payload over the non-secure network session, the data payload transmitted from the second communication device and addressed for delivery to the first network address; and transmit the data payload from the first communication device over a persistent communication path through the third communication device to a remote server.

The ordering of the steps above has been added for clarity's sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the apparatus, method, system, instructions on computer readable storage media, etc., as discussed herein also can be embodied strictly as a software program, firmware, as a hybrid of software, hardware and/or firmware, or as hardware alone such as within a processor (hardware or software), or within an operating apparatus or a within a software application.

As discussed herein, techniques herein are well suited for use in the field of security monitoring applications. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 5 is an example diagram illustrating a method of receiving security data and selectively communicating the security data to a remote server over one or more communication paths according to embodiments herein.

FIG. 13 is an example diagram illustrating a method of selectively powering one or more wireless communication interfaces in a network to support conveyance of data according to embodiments herein.

FIG. 21 is an example diagram illustrating use of one or more repeater devices to provide a chain of communication links between a first communication device and a downstream terminal communication device according to embodiments herein.

FIG. 25 is an example diagram of a method of communicating messages over a persistent wireless communication channel according to embodiments herein.

FIG. 33 is an example diagram of a method of communicating messages according to embodiments herein.

FIG. 38 is an example diagram of a method of communicating messages according to embodiments herein.

Figure 1:
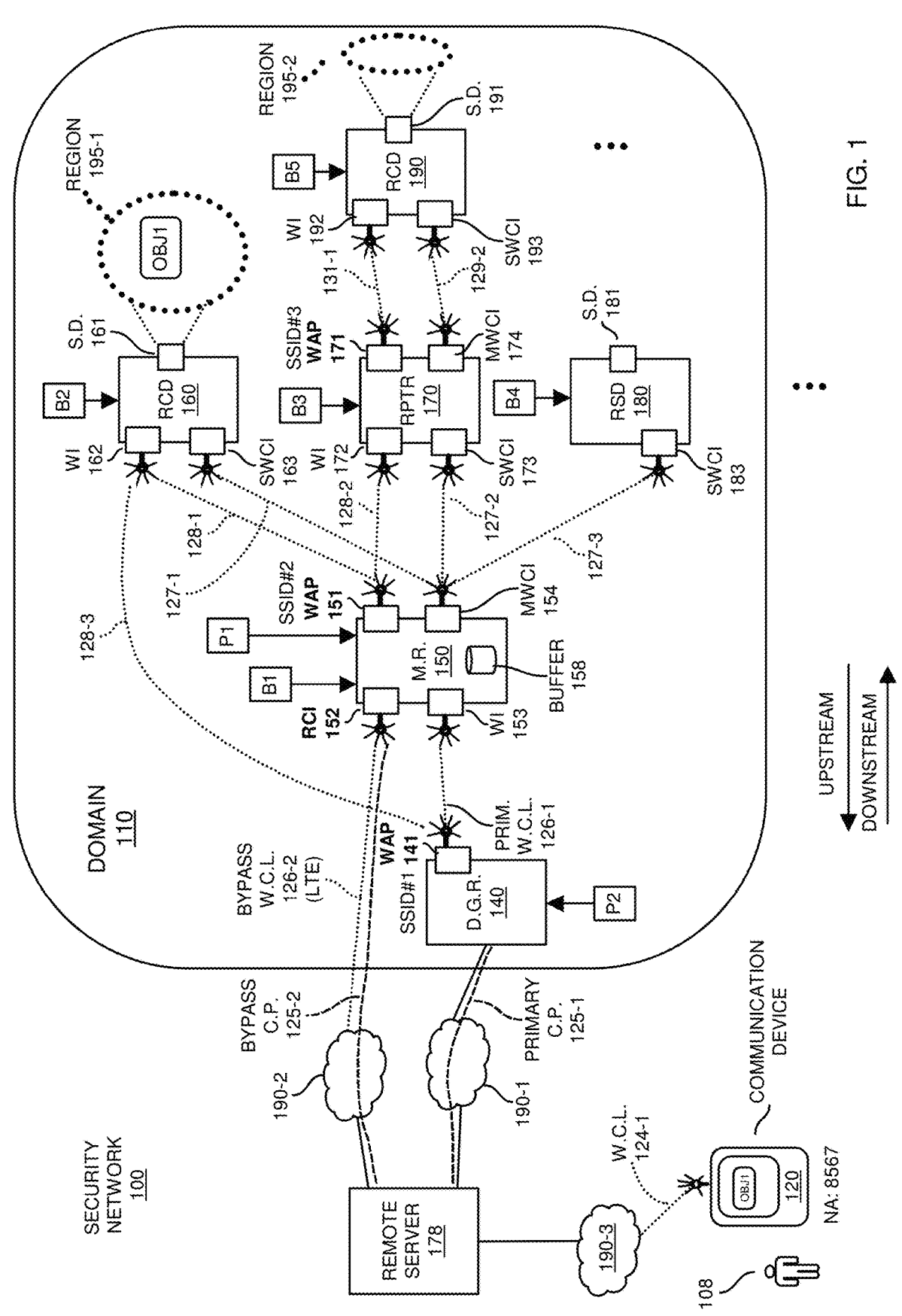
FIG. 1 is an example diagram illustrating a wireless security network supporting connectivity and security functions according to embodiments herein.

The foregoing and other objects, features, and advantages of the invention will be apparent from the following more particular description of preferred embodiments herein, as illustrated in the accompanying drawings (described above and in further detail below) in which like reference characters refer to the same parts throughout the different views. The drawings are not necessarily to scale, with emphasis instead being placed upon illustrating the embodiments, principles, concepts, etc.

DETAILED DESCRIPTION

As previously discussed, embodiments herein include implementing novel and useful improvements in a wireless and/or wired security system.

More specifically, and with reference to the figures, FIG. 1 is an example diagram illustrating a wireless security network or wireless security system according to embodiments herein.

As shown, security network 100 includes communication device 120 (operated by a respective user 108), one or more networks such as network 190-1, network 190-2, network 190-3, remote server 178, and domain 110.

In this example embodiment, interconnected devices in domain 110 include communication devices such as domain gateway resource 140 (such as an in-the-home router), manager resource 150, remote communication device 160, repeater 170, remote sensor device 180, and remote communication device 190.

Collectively, the interconnected communication devices in domain 110 operate to monitor different regions and/or security parameters in domain 110. If desired, the remote sensor device 180 can be an output device such as an alarm, a light, etc.

Note that the configuration of devices and the domain 110 are shown by way of non-limiting example only; the domain 110 can be configured to include any number of different types of communication devices (such as remote communication devices, repeaters, remote sensor devices, remotely controlled devices, etc.) to monitor different regions or security parameters. Communication devices can be mobile or stationary.

In this example embodiment, user 108 operates communication device 120 to communicate with the remote server 178 and execute functions with respect to the one or more devices in domain 110. For example, the domain 110 represents a region (such as a house, property, etc.) in which the user 108 domiciles or watches over. Via use of the mobile communication device 120, the user 108 is able to control the security network 100 and corresponding security system in domain 110 (such as a combination of manager resource 150, remote communication device 160, repeater 170, remote communication device 190, remote sensor device 180, remote controlled devices, etc.), retrieve information from security devices in domain 110, control output devices in the domain 110, etc.

Further in this example embodiment, the remote communication device 160 includes sensor device 161 such as a camera, microphone, etc., that monitors region 195-1 in domain 110.

Remote communication device 190 includes sensor device 191 such as a camera, microphone, etc., to monitor region 195-2.

Remote sensor device 180 includes sensor device 181 to monitor for occurrence of a trigger event such as opening of a door in domain 110, opening up a window in domain 110, pressing of panic button, etc.

As further shown, each of the end security monitoring devices (such as remote communication device 160, remote communication device 190, remote sensor device 180, etc.) is communicatively coupled to remote server 178 via one or more possible wireless and/or wired communication paths through intermediate devices such as repeater 170, manager resource 150, domain gateway resource 140, etc.

Note that the wireless paths connecting security devices in the domain 110 simplify respective installation. That is, in one embodiment, each of devices in domain 110 including remote communication device 160, repeater (device or hardware) 170, remote communication device 190, and remote sensor device 180, etc., support wireless communications with respect to manager resource 150.

If desired, each of the devices in domain 110 such as manager resource 150, remote communication device 160, repeater 170, remote sensor device 180, remote communication device 190, etc., can operate off only battery power. In such an instance, because the power available from a respective battery is typically limited, embodiments herein include providing unique power saving techniques as further discussed herein.

As further shown, battery B1 powers manager resource 150, battery B2 in this example powers remote communication device 160; battery B3 powers repeater 170; battery B4 powers remote sensor device 180; battery B5 powers remote communication device 190; so on.

Where possible, and if desired, each of the devices in domain 110 can be powered via electricity received from a public electrical grid. For example, it may be possible to power the domain gateway resource 140 (such as an in-home router) via power P2 received from 120 VAC wall socket. Manager resource 150 is powered by battery B1 (which may be a available for backup power purposes when there is a power outage) while power input P1 such as electricity received from a public grid powers the manager resource 150 during normal operation when there is no power outage. Alternatively, as mentioned, note that manager resource 150 (device) can be configured to operate only off of battery B1. In such an instance, the techniques as discussed herein reduce power consumption so that the battery B1 lasts longer without being replaced.

More specifically, in one embodiment, as further described herein, communication devices including manager resource 150, repeater 170, etc., activate respective wireless access point 151, wireless access point 171, etc., only when it is known that a respective data payload is to be received from a respective remote device for conveyance to remote server 178 and/or communication device 120. Selective powering and use of wireless access points and corresponding wireless communication links in the devices of domain 110 saves a substantial amount of power because the manager resource 150, repeater 170, etc., do not needlessly power a respective wireless access point when they are not being used.

Figure 2:
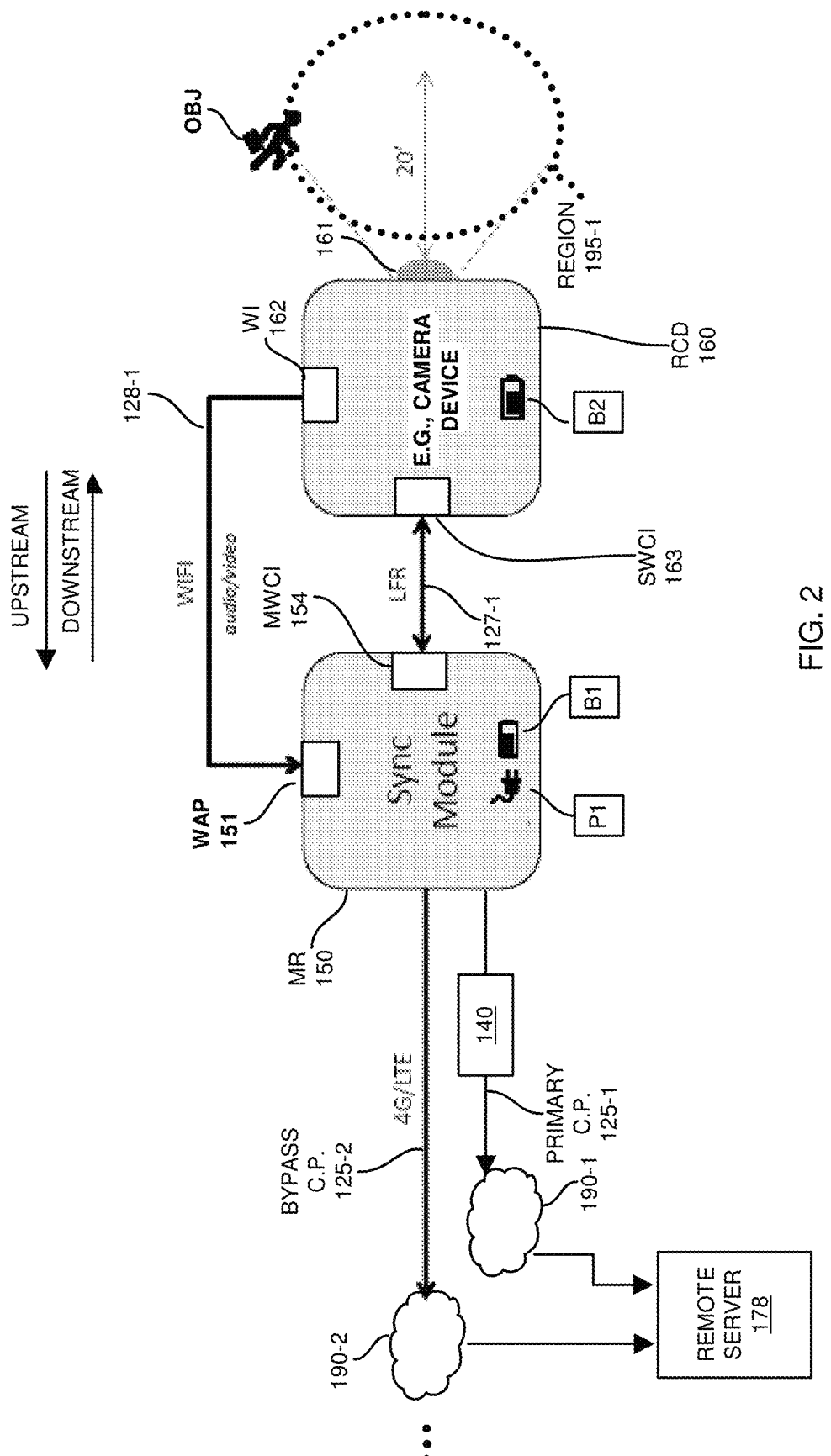
FIG. 2 is an example diagram illustrating connectivity of security devices and multi-path communication options according to embodiments herein.

FIG. 2 is an example diagram illustrating connectivity of security devices and a multi-path communication capability according to embodiments herein.

As shown in this example embodiment, the manager resource 150 (such as a sync/control/communication device, circuit assembly, etc.) is in wireless communication with the remote communication device 160 (such as a camera) via one or more communication links including wireless communication link 127-1 and wireless communication link 128-1.

In one embodiment, the wireless communication link 127-1 is a low-power, low bandwidth communication link in which the manager resource 150 is able to selectively initiate communications with the remote communication device 160 in a downstream direction to end devices such as remote communication device 160. In an upstream direction, the remote communication device 160 is able to initiate wireless communications over wireless communication link 127-1 to the manager resource 150.

To save on battery power, or power in general, the manager resource 150 selectively activates the wireless access point 151 depending upon whether a data payload is available or anticipated to be available from the remote communication device 160. For example, in certain instances, the manager resource 150 may activate (power) the wireless access point 151 to wirelessly communicate a data payload from the manager resource 150 to the remote communication device 160. Conversely, the manager resource 150 may activate (power) the wireless access point 151 to receive a data payload from one or more remote communication devices.

When the wireless access point 151 is activated (such as being powered and allowing remote communication devices to establish a respective wireless communication link with the manager resource 150), after establishing a respective wireless communication link, the manager resource 150 can receive communications from the remote communication device 160 over the wireless communication link 128-1. In one embodiment, the remote communication device 160 includes a dedicated wireless interface 162 to establish wireless communication link 128-1 with the wireless access point 151 of the manager resource 150 when it is powered and available.

Additionally or alternatively, recall that the manager resource 150 is in communication with the remote communication device 160 over wireless communication link 127-1 (such as a persistent link). In one embodiment, wireless communication link 127-1 is a continuously available time-slotted radio channel in which the remote communication device 160 is assigned a respective time slot in which to, on an as needed basis, communicate messages to manager resource 150. Details of the time-slotted communication channel are discussed in FIGS. 18-20.

Referring again to FIG. 1, in one embodiment, each of the wireless access points such as wireless access point 151, wireless access point 141, wireless access point 171, wireless interface 162, wireless interface 172, wireless interface 192, etc., supports (open or secured) WiFi™ (such as any suitable IEEE 802.11 wireless communication protocol).

Referring again to FIG. 2, by further way of example embodiments, the manager resource 150 includes a master wireless communication interface 154. Remote communication device 160 includes slave wireless communication interface 163.

During operation, the master wireless communication interface 154 is assigned a time slot in each communication cycle in which to send synchronization information to the remote communication device 160. The remote communication device 160 uses the synchronization information received over the wireless communication link 127-1 through the slave wireless communication interface 163 to synchronize the remote communication device 160 with respect to the wireless communication link 127-1 (time-slotted communication channel) between the manager resource 150 and the remote communication device 160.

In accordance with further embodiments, the manager resource 150 conveys any received communications (such as communications received over the wireless communication link 127-1 and/or wireless communication link 128-1) destined for the remote server 178 over the primary communication path 125-1 (such as through domain gateway resource 140) or the bypass communication path 125-2 (such as a cellular phone link, LTE link, 4G link, etc.) to the remote server 178.

In one embodiment, as further described herein, assuming that the primary communication path 125-1 is available and operable (non-failing), this is a preferred way of forwarding data received from the remote communication device 160 to the remote server 178. However, in the event of a failure condition in which the primary communication path 125-1 is unavailable for any reason, the manager resource 150 communicates a data payload (such as one or more messages) received from the remote communication device 160 over the bypass communication path 125-2 to the remote server 178.

Figure 3:
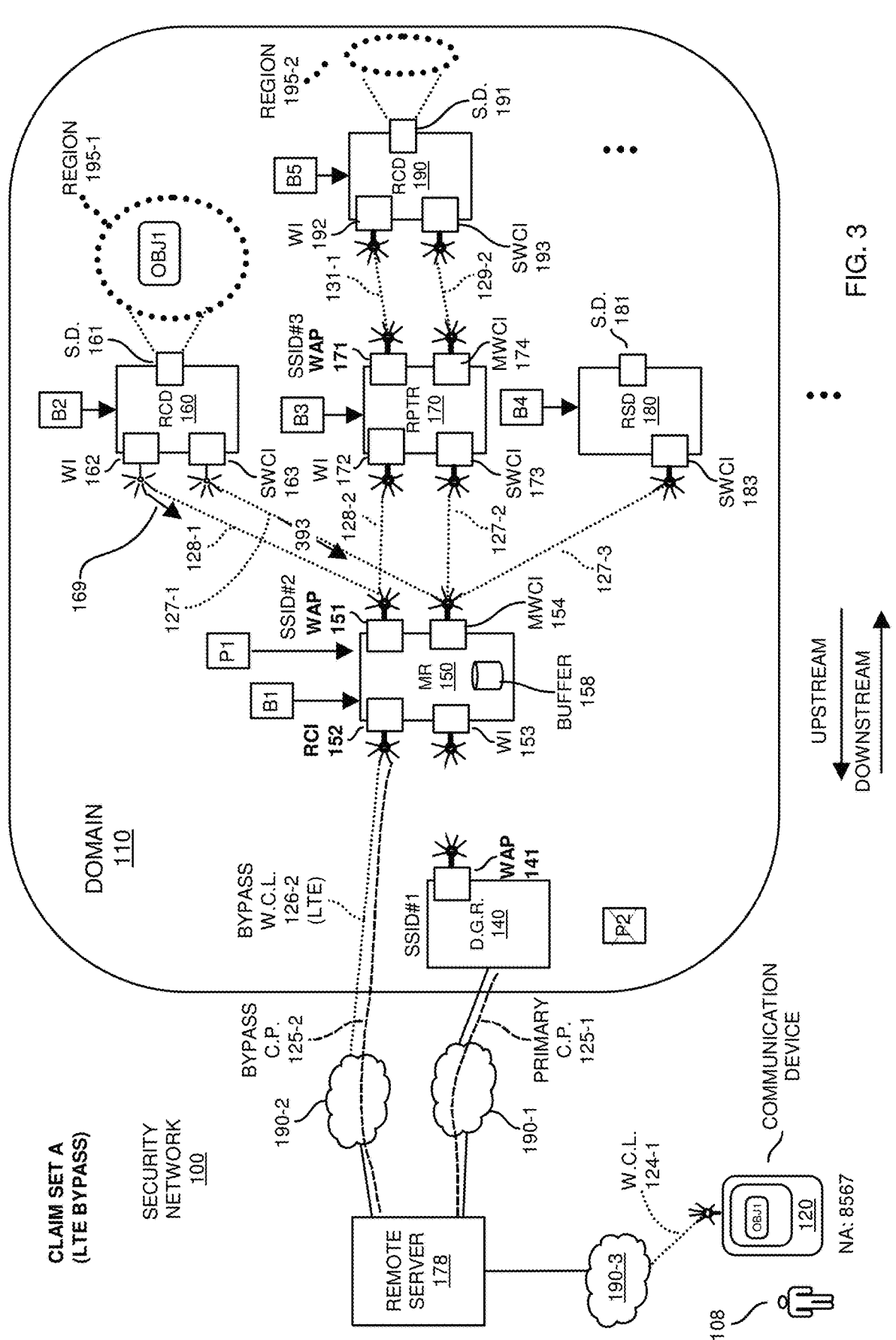
FIG. 3 is an example diagram illustrating selective use of a primary communication path and a bypass communication path to communicate with a remote server according to embodiments herein.

FIG. 3 is an example diagram illustrating selective use of a primary communication path and a bypass communication path to communicate with the remote server according to embodiments herein.

In this example embodiment, assume that the remote communication device 160 monitors the region 195-1 for a trigger event such as movement or presence of an object. In response to a trigger event such as detecting motion and/or presence of OBJ1 in region 195-1, the remote communication device 160 communicates a message over the slave wireless communication interface 163 to the master wireless communication interface 154 of the manager resource 150 to provide notification of the trigger event.

As previously discussed, the remote communication device 160 can be assigned a particular timeslot in which to communicate from the slave wireless communication interface 163 of the remote communication device 160 to the master wireless communication interface 154 of the manager resource 150. In this example embodiment, assume that the message 393 communicated over the wireless communication link 127-1 in the assigned time slot to the manager resource 150 indicates that the remote communication device 160 has data available for delivery to the manager resource 150.

In response to receiving the message 393, the manager resource 150 powers the wireless access point 151 after being in a depowered state. While in the depowered state (or sleep mode), is not possible for the wireless access point 151 to receive wireless communications from the remote devices. However, if desired, the depowered wireless access point 151 can save prior state information (settings) such that the wireless access point 151 is immediately available to support wireless communications subsequent to being powered again.

Subsequent to activation of the wireless access point 151 (such as by applying power to the wireless access point 151), the remote communication device 160 then communicates through the wireless interface 162 to the wireless access point 151 to establish the wireless communication link 128-1.

In one embodiment, note that the remote communication device 160 is made aware of attributes or an identity of the wireless access point 151 and a socket of the manager resource 150 via communications over the wireless communication link 127-1 prior to the wireless access point 151 being powered. Accordingly, the remote communication device 160 is informed of which wireless access point and socket to forward any data payloads via further communications. Additionally, the remote communication device is able to immediately transmit a wireless communication to the wireless access point 151 requesting to establish a wireless communication link 128-1. Subsequent to establishing the wireless communication link 128-1, the remote communication device 160 communicates the security data (such as video capturing movement of object OBJ1, audio signal, etc.) over the wireless communication link 128-1 to the wireless access point 151.

The manager resource 150 initiates transmission of the received security data 169 in an upstream direction to the remote server 178.

Assume in this example that the primary communication path 125-1 and/or primary wireless communication link 126-1 (as previously discussed in FIG. 1) is unavailable for use. For example, assume that there is a power outage with respect to power P2. In such an instance, the domain gateway resource 140 is unable to power the wireless access point 141 to receive communications from the manager resource 150. This causes the manager resource 150 to communicate the previously received security data 169 over the bypass wireless communication link 126-2 to the remote server 178.

Thus, in the event of a respective failure in which the manager resource 150 is unable to communicate over the primary communication path 125-1 or primary wireless communication link 126-1 (as in FIG. 1) through the domain gateway resource 140, the manager resource 150 uses the alternate path (bypass wireless communication link 126-2 and corresponding bypass communication path 125-2) to communicate the security data 169 to the remote server 178.

This embodiment ensures that the manager resource 150 apprises the respective user 108 operating communication device 120 and/or the remote server 178 of events occurring in the domain 110, even though the there is a failure of a respective communication device (such as the domain gateway resource 140) in the domain 110. In other words, as previously discussed, if the primary communication path 125-1 is disabled or unavailable for any reason such as because of a power outage, link failure, service provider failure, etc., the manager resource 150 transmits the received security data 169 over the bypass communication path 125-2 to the remote server 178.

The security data 169 received from the remote communication device 160 can be any suitable type of data. For example, the security data 169 can be a video data stream capturing still or moving images at a remote location (region 195-1) monitored by the sensor device 161 (such as a camera device) of the remote communication device 160; the security data 169 can be or include audio data captured by the sensor device 161 (a microphone) in the remote communication device 160, etc.

Note further that the remote server 178 can be configured to distribute the security data 169 over network 190-3 (a cellular phone network, Internet, etc.) to the communication device 120.

Accordingly, as mentioned, the remote server 178 apprises the user 108 operating communication device 120 of events occurring in the domain 110 even though the primary communication path 125-1 experiences a respective failure.

Via receipt of the security data 169 at the communication device, the user 108 views events that take place in domain 110. That is, the user 108 is able to operate the communication device 120 to playback security data 169 to view images captured by the sensor device 161 monitoring the region 195-1 to determine whether or not appropriate personnel (such as police, fire department, etc.) should be dispatched to the site if the user 108 is unable to personally visit the domain 110.

In accordance with further embodiments, it is possible that the security data 169 is a continuous stream of data (such as a real-time capture of images/audio at monitored region 195-1) transmitted from the remote communication device 160. In such an instance, the manager resource 150 can be configured to convey a first portion of the received security data 169 (such as a first portion of a data stream) to the remote server 178 over the primary communication path 125-1 prior to the primary wireless communication link 126-1 (FIG. 1) experiencing a failure. In response to detecting that the primary communication path 125-1 and/or primary wireless communication link 126 1 (FIG. 1) is no longer operable to convey a second portion of received security data 169 to the remote server 178, the manager resource 150 switches over to transmitting the second portion of the received security data 169 over the bypass communication path 125-2 to the remote server 178. Accordingly, this switchover ensures a transmission of respective security data 169 to the remote server 178 and respective communication device 120 even if a failure occurs.

In yet another embodiment, note that remote communication device 160 and corresponding sensor device 161 (such as a video security camera) is potentially powered by only battery B2. As previously discussed, the security data 169 as generated by the sensor device 161 can be video data of images and/or audio data of sound captured by the security sensor device 161. A failure condition such as loss of power may render it impossible for the manager resource 150 (such as powered by a battery B1 during a power failure condition) to communicate over the primary communication path 125-1. In such an instance, the manager resource 150 communicates the security data 169 over the bypass communication path 125-2 to the remote server 178. Accordingly, even during a power outage or device failure, the manager resource 150 is able to communicate with a target recipient.

In one embodiment, as mentioned, the network 190-2 is a cellular phone network (such as including a public switched telephone network to route communications) over which the remote server 178 and manager resource 150 communicate with each other. Each of the devices remote server 178 and the manager resource 150 is assigned a unique address value in which to initiate communications with the other device. Accordingly, the remote server 178 is able to communicate with the manager resource 150 using a unique address value assigned to the manager resource 150. In the opposite direction, the manager resource 150 is able to communicate with the remote server 178 using a unique address value assigned to the remote server 178.

Note that under normal circumstances, when the primary communication path 125-1 is operable and available for use by manager resource 150, the manager resource 150 would otherwise communicate the received security data 169 over the primary communication path 125-1 (such as a preferred path) to the remote server 178.

As further shown, if desired, the manager resource 150 can be configured to include a respective buffer 158 to store security data such as data payloads, messages, communications, etc., as received from any of the devices including remote communication device 160, repeater 170, remote sensor device 180, remote communication device 190, etc.

In one embodiment, the manager resource 150 stores the received security data 169 in buffer 158 in response to detecting an inability to communicate the received security data 169 over the primary communication path 125-1 and/or the bypass communication path 125-2 to the remote server 178. When the primary communication path 125-1 and/or the bypass communication path 125-2 become available, the manager resource 150 communicates the data stored in buffer 158 to the remote server 178.

Accordingly, the manager resource 150 communicates the security data stored in the buffer 158 over the primary communication path 125-1 in response to detecting an ability to communicate over the primary communication path 125-1. As a backup, the manager resource 150 communicates the security data in the buffer 158 over the bypass communication path 125-2 in response to detecting an inability to communicate over the primary communication path 125-1.

As further shown, each of the terminal devices (end devices) such as remote communication device 160, remote communication device 190, remote sensor device 180, etc., can produce a respective data payload for delivery to the remote server 178 and/or the communication device 120.

Remote communication device 190 includes security device 191 to monitor region 195-2. Remote communication device 190 communicates a data payload (such as audio and/or video data derived from monitoring region 195-2) over wireless communication link 131-1 to the repeater 170. Subsequent to establishing a wireless communication link 128-2 with the manager resource 150, the repeater 170, in turn, forwards the data payload over wireless communication link 128-2 to the manager resource 150. Manager resource 150 communicates the data payload received from remote communication device 190 over the primary communication path 125-1 and/or bypass communication path 125-2 to the remote server 170 as desired. In this manner, the manager resource 150 is configured to selectively connect a wireless network including remote communication device 160 and remote communication device 190 to the remote server 178 via the primary communication path 125-1 and/or the bypass communication path 125-2.

As previously discussed, by way of non-limiting example embodiment, the domain gateway resource 140 can be an in-home router disposed in domain 110. The domain gateway resource 140 is operable to communicate received messages such as security data 169 over a respective Internet communication link over network 190-1 (such as a packet-switched network) to the remote server 178. In accordance with further embodiments, as previously discussed, the bypass wireless communication link 126-2 can be or include is a cellular phone link supporting wireless data communications from the manager resource 150 over network 190-1 to the remote server 178.

In accordance with further embodiments, the manager resource 150 can be configured to communicate any type of status information to the remote server 178.

For example, in one embodiment, the manager resource 150 can be configured to monitor the health of respective power sources such as power P1, battery B1, etc. Based on detecting which of multiple sources powers the manager resource 150, the manager resource 150 communicates respective status information (indicating which of multiple power sources powers the manager resource 150) to the remote server 178 over the primary communication path 125-1 and/or the bypass communication path 125-2.

More specifically, if the manager resource 150 detects that it is powered only by battery B1, the manager resource 150 communicates this condition over primary communication path 125-1 and/or bypass communication path 125-2 to the remote server 178.

If the manager resource 150 detects that this powered by grid power P1, the manager resource 150 communicates this latter condition over primary communication path 125-1 and/or bypass communication path 125-2 to the remote server 178. Accordingly, the remote server 178 has knowledge of the health of the wireless security network and corresponding components in domain 110.

If desired, the manager resource 150 can be configured to repeatedly or occasionally transmit heartbeat type communications to the remote server 178 over the primary communication path 125-1 or the bypass communication path 125-2 to indicate that the manager resource 150 is operating properly. The remote server 178 monitors the heartbeat communications received from the manager resource 150 to monitor and/or determine a health of the manager resource 150. Accordingly, if the remote server 178 receives no heartbeat communications from the manager resource 150, the remote server 178 assumes that there is a failure associated with the security system present in domain 110 and/or network 190-1, network 190-2, etc.

In a similar manner, note that each of the components such as remote communication device 160, repeater device 170, remote sensor device 180, remote communication device 190, etc., can be configured to repeatedly transmit heartbeat signals through manager resource 150 to the remote server 178 to indicate they are working properly.

As previously discussed, any respective downstream communication device such as remote communication device 160, remote communication device 190, etc., is able to detect a trigger event in which a data payload needs to be transmitted upstream to the manager resource 150. In accordance with further embodiments, any suitable resource such as communication device 120, remote server 178, etc., can generate a respective command to activate terminal devices such as remote communication device 160, remote communication device 190, etc., for retrieval of corresponding data payload information.

For example, the remote server 178 may attempt to communicate with the manager resource 150 over the primary communication path 125-1. In response to detecting an inability to communicate over the primary communication path 125-1, the remote server 178 communicates a respective activation command over the bypass communication path 125-2 to the manager resource 150. Accordingly, the remote server 178 is also able to select between use of the primary communication path 125-1 and the bypass communication path 125-2 to communicate in a downstream direction with the manager resource 150.

Assume in this example that the received activation command from the remote server 178 indicates to activate remote communication device 160. In such an instance, in response to receiving the activation command, the manager resource 150 communicates the activation command over the master wireless communication interface 154 to slave wireless communication interface 163 of the remote communication device 160. The manager resource 150 also powers the wireless access point 151 in response to receiving the activation command.

The remote communication device 160 monitors the wireless communication link 127-1 using the slave wireless communication interface 163. In response to receiving the activation command from the manager resource 150 over the wireless communication link 127-1, the remote communication device 160 activates the sensor device 161 to collect audio and/or video image data associated with the region 195-1. The remote communication device 160 uses wireless interface 162 to establish a respective wireless communication link 128-1 with the wireless access point 151.

After establishing a respective wireless communication link 128-1, the remote communication device 160 then communicates the data payload (generated from receiving the activation command) derived from monitoring the region 195-1 over the wireless communication link 128-1 to the manager resource 150.

In a manner as previously discussed, the manager resource 150 potentially stores the received data payload in buffer 158. Manager resource 150 selectively transmits the data payload stored in buffer 158 over primary communication path 125-1 and/or bypass communication path 125-2 to the remote server 178 as the respective paths are available.

Accordingly, the multi-path solution including primary communication path 125-1 and bypass communication path 125-2 provides unique communication redundancy with respect to the wireless security network in domain 110.

Figure 4:
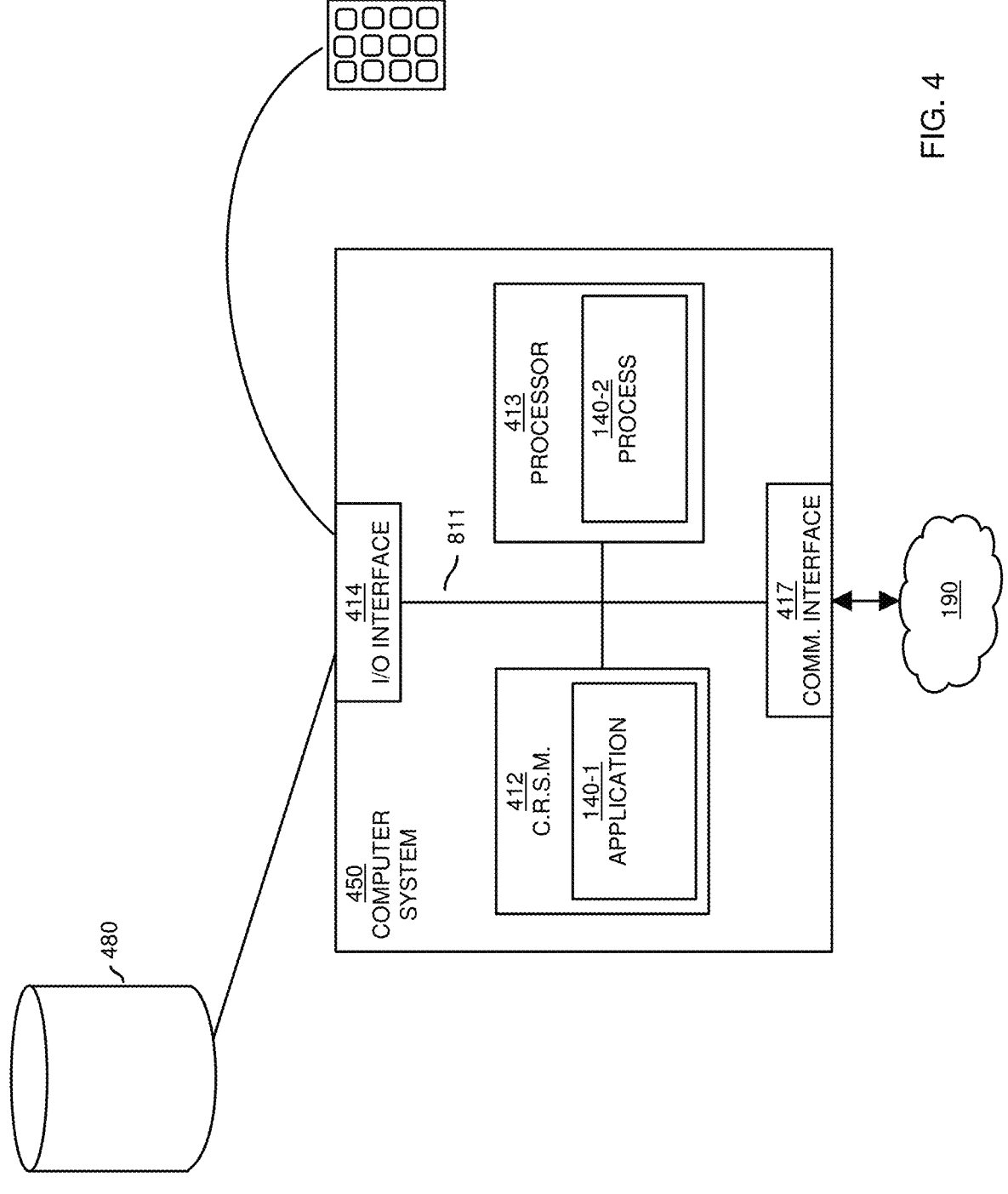
FIG. 4 is an example diagram illustrating a computer architecture in which to execute one or more applications according to embodiments herein.

FIG. 4 is an example block diagram of a computer apparatus for implementing any of the operations as discussed in this disclosure.

For example, any of the resources (e.g., communication device 120, remote server 178, domain gateway resource 140, manager resource 150, remote communication device 160, repeater 170, remote communication device 190, remote sensor device 180, etc.) can be configured to include computer processor hardware that executes one or more software instructions (of stored instructions) to carry out any of the different operations as discussed herein.

As shown, computer system 450 of the present example includes an interconnect 411 that couples computer readable storage media 412 such as a non-transitory type of media (i.e., any type of hardware storage medium) in which digital information can be stored and retrieved, a processor 413 (computer processor hardware), I/O interface 414, etc.

Computer readable storage medium 412 can be or include any hardware storage device such as memory, optical storage, hard drive, floppy disk, etc. In one embodiment, the computer readable storage medium 412 stores instructions and/or data.

As shown, computer readable storage media 412 can be encoded with application 140-1 (e.g., including instructions) to carry out any of the operations as discussed herein associated with communication device 120, remote server 178, domain gateway resource 140, manager resource 150, remote communication device 160, repeater 170, remote communication device 190, remote sensor device 180, etc.

During operation of one embodiment, processor 413 (computer processor hardware) accesses computer readable storage media 412 via the use of interconnect 411 in order to launch, run, execute, interpret or otherwise perform the instructions in application 140-1 stored on computer readable storage medium 412. Execution of the application 140-1 produces process 140-2 to carry out any of the operations and/or processes as discussed herein.

Those skilled in the art will understand that the computer system 450 can include other processes and/or software and hardware components, such as an operating apparatus that controls allocation and use of hardware resources to application 140-1.

In accordance with different embodiments, note that computer apparatus may be or included in any of various types of devices, including, but not limited to, a mobile computer, a personal computer apparatus, a wireless device, base station, phone device, desktop computer, laptop, notebook, netbook computer, mainframe computer apparatus, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc.

The computer system 450 may reside at any location or can be included in any suitable one or more resources in a network environment to implement functionality as discussed herein.

Functionality supported by the different resources will now be discussed via flowcharts in FIG. 5. Note that the steps in any of the flowcharts of the present disclosure can be executed in any suitable order.

FIG. 5 is a flowchart 500 illustrating an example method according to embodiments herein. Note that there will be some overlap with respect to concepts as discussed above.

In processing operation 510, the manager resource 150 (a circuit assembly such as a mobile communication device) receives security data 169 over the wireless communication link 128-1 from the remote communication device 160. As previously discussed, the remote communication device 160 produces the security data 169 in response to a trigger event such as detecting motion of object OBJ1 in region 195-1.

In processing operation 520, the manager resource 150 selectively communicates with the remote server 178 over a primary communication path 125-1 and a bypass communication path 125-2. In one embodiment, the manager resource 150 selectively chooses transmission of the received security data 169 over the primary communication path 125 1 and the bypass communication path 125-2 depending on operability of the primary communication path 125-1 to deliver the received security data 169 to the remote server 178. As previously discussed, if the domain gateway resource 140 loses power, primary communication path 125-1 fails, etc., the manager resource 150 communicates the security data 169 over the bypass wireless communication link 126-2 instead of over the primary wireless communication link 126-1.

Figure 6:
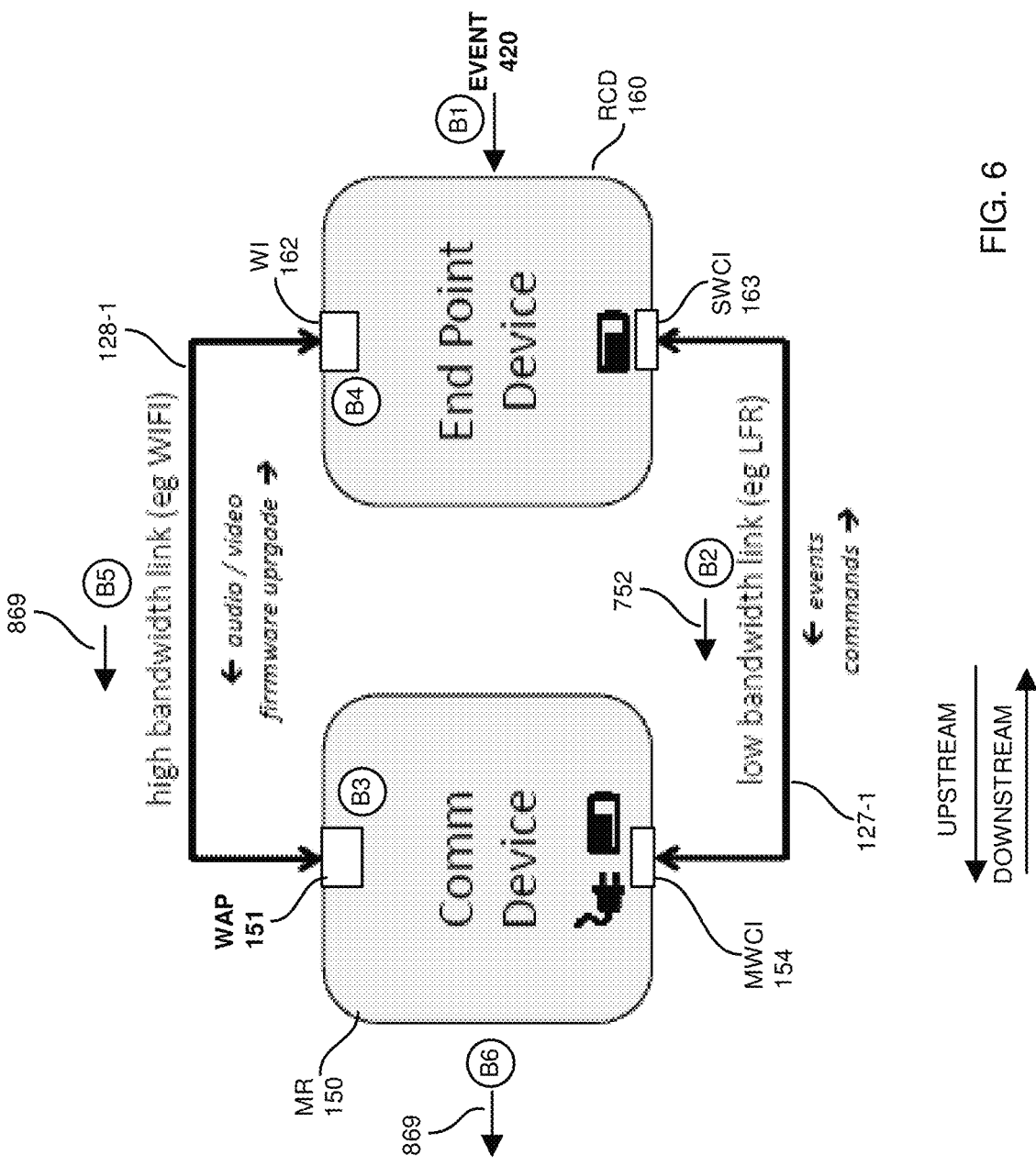
FIG. 6 is an example diagram illustrating connectivity of communication devices and signaling (such as via wired or wireless communications) according to embodiments herein.

FIG. 6 is an example diagram illustrating connectivity of communication devices and signaling (such as via wired or wireless communications) according to embodiments herein.

As shown, in processing operation B1, the remote communication device 160 receives notification of a trigger event 420. As previously discussed, the remote communication device 160 (a.k.a., endpoint device) monitors a respective region 195-1 (FIG. 1) for trigger event 420 such as movement of an object, opening of the window, pressing of a button, etc.

In processing operation B2, in response to detecting the trigger event 420, the remote communication device 160 transmits the message 752 to the manager resource 150 over wireless communication link 127-1. The message 752 indicates occurrence of the trigger event 420.

In processing operation B3, in response to receiving notification of the trigger event 420 via receipt of message 752, the manager resource 150 (a.k.a., communication device) powers up the wireless access point 151 for subsequent receipt of a data payload from the remote communication device 160. Prior to being powered, the wireless access point 151 is in a low power consumption load and is unable to wirelessly communicate (receive or transmit) messages.

In processing operation B4, via the wireless interface 162, the remote communication device 160 communicates (negotiates) with the wireless access point 151 to establish a respective wireless communication link 128-1.

In processing operation B5, subsequent to establishing the wireless communication link 128-1 with the wireless access point 151, the wireless interface 162 further negotiates with the wireless access point 151 for bandwidth to transmit a respective data payload to the manager resource 150 over the wireless communication link 128-1. In response to being granted bandwidth from the wireless access point 151, the wireless interface 162 communicates the security data 869 over the wireless communication link 128-1 to the wireless access point 151.

In processing operation B6, the manager resource 150 transmits the received security data 869 (such as audio and/or video of monitored location) in an upstream direction to a target recipient such as a remote server 178, communication device 120, etc., in a manner as previously discussed.

Figure 7:
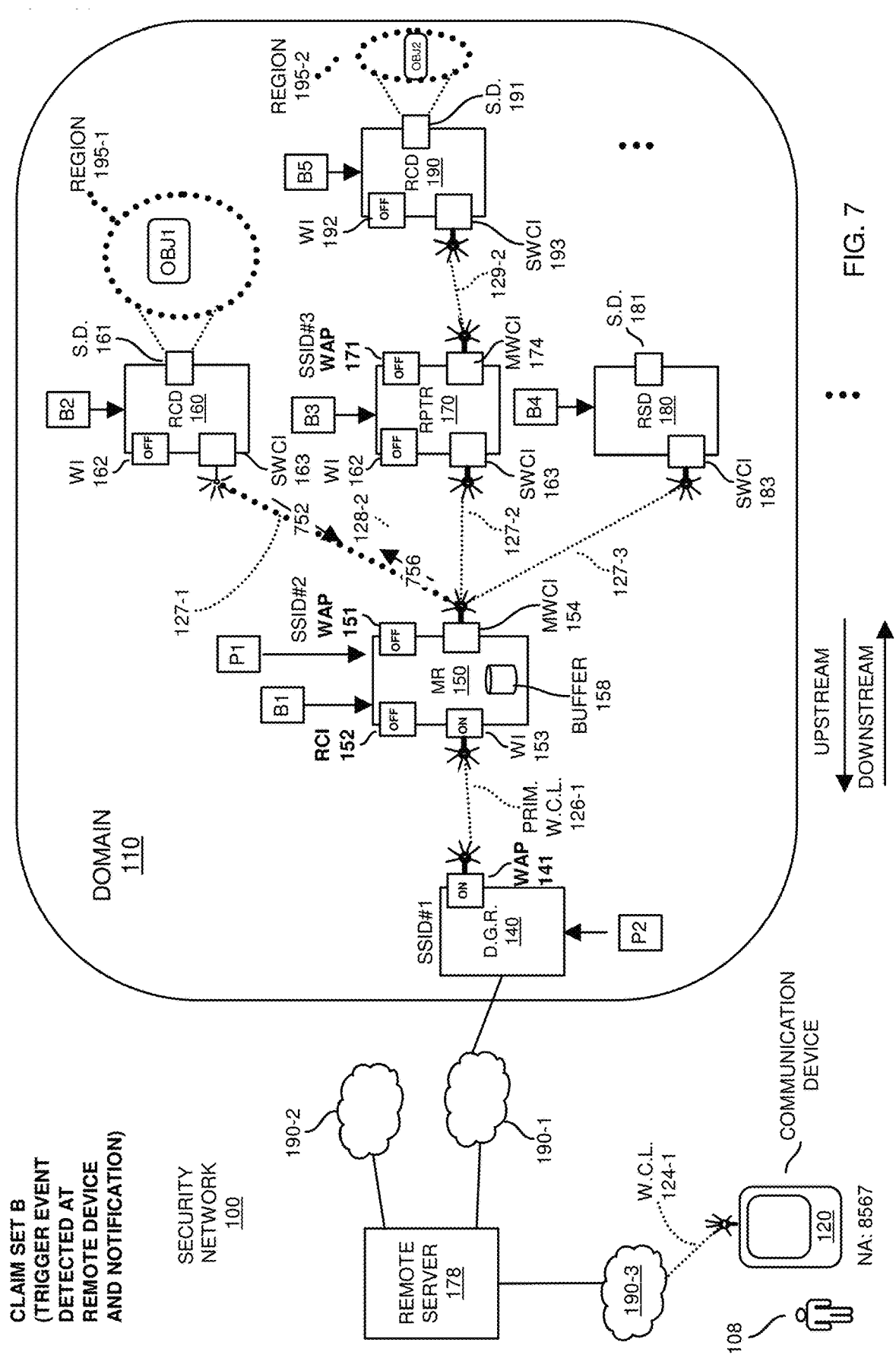
FIG. 7 is an example diagram illustrating detection of the trigger event and notification of the trigger event to a manager resource according to embodiments herein.

FIG. 7 is a more detailed example diagram illustrating detection of the trigger event and notification of the trigger event to a manager resource (or circuit assembly) according to embodiments herein.

In this example embodiment, remote communication device 160 controls operation of sensor device 161, which monitors region 195-1 in domain 110. Initially, assuming that the remote communication device 160 has no data to transmit to the manager resource 150, the wireless interface 162 is in an OFF state.

At regular intervals or occasionally, during a synchronization process, slave wireless communication interface 163 receives wireless communications from manager resource 150 as transmitted over the master wireless communication interface 154.

During one or more timeslots, the manager resource 150 transmits synchronization information over the master wireless communication interface 154 to the remote communication device, repeater 170, remote sensor device 180, etc.

Figure 18:
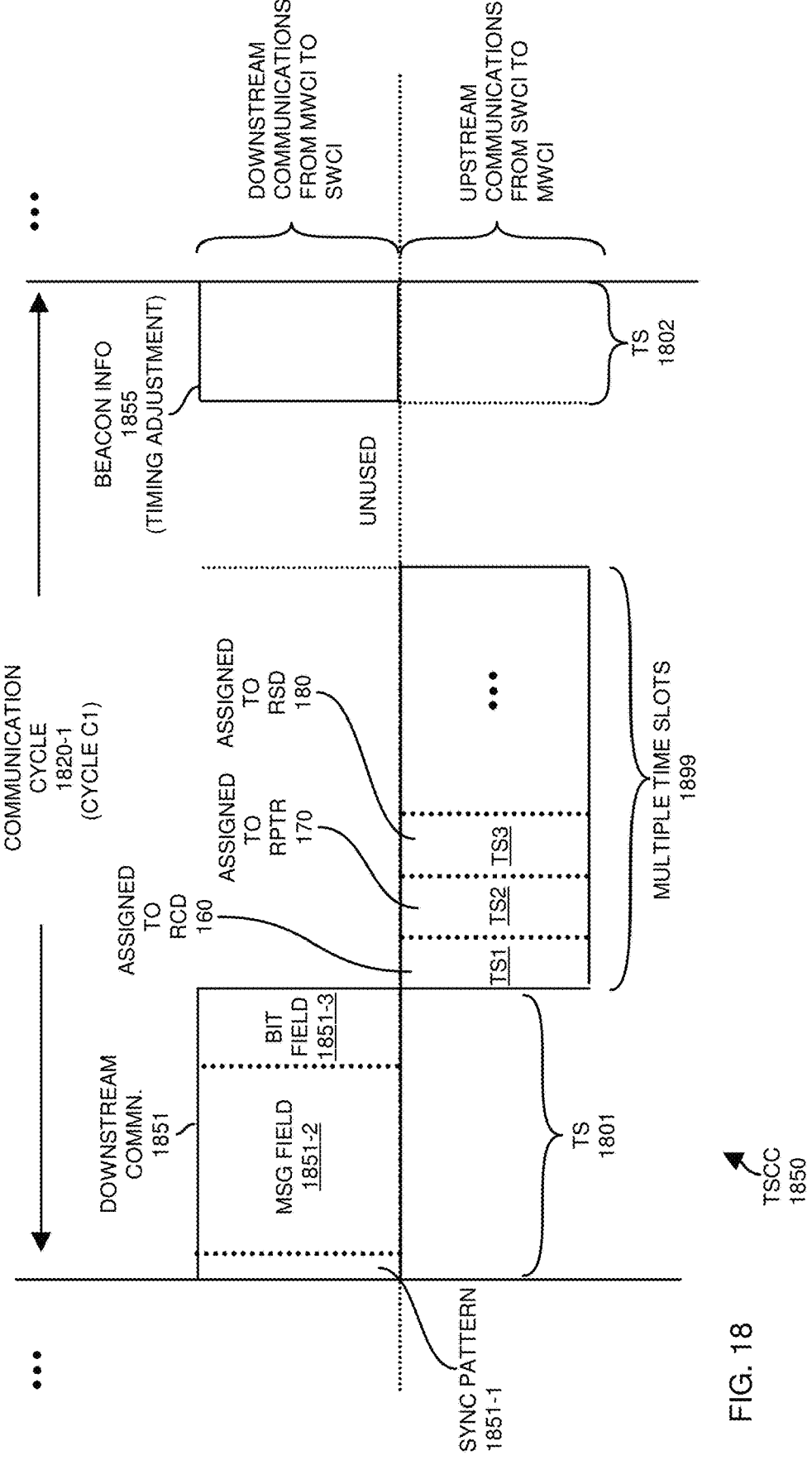
FIG. 18 is an example timing diagram illustrating use of a first time-slotted communication channel to communicate between a first communication device and multiple downstream communication devices according to embodiments herein.
Figure 19:
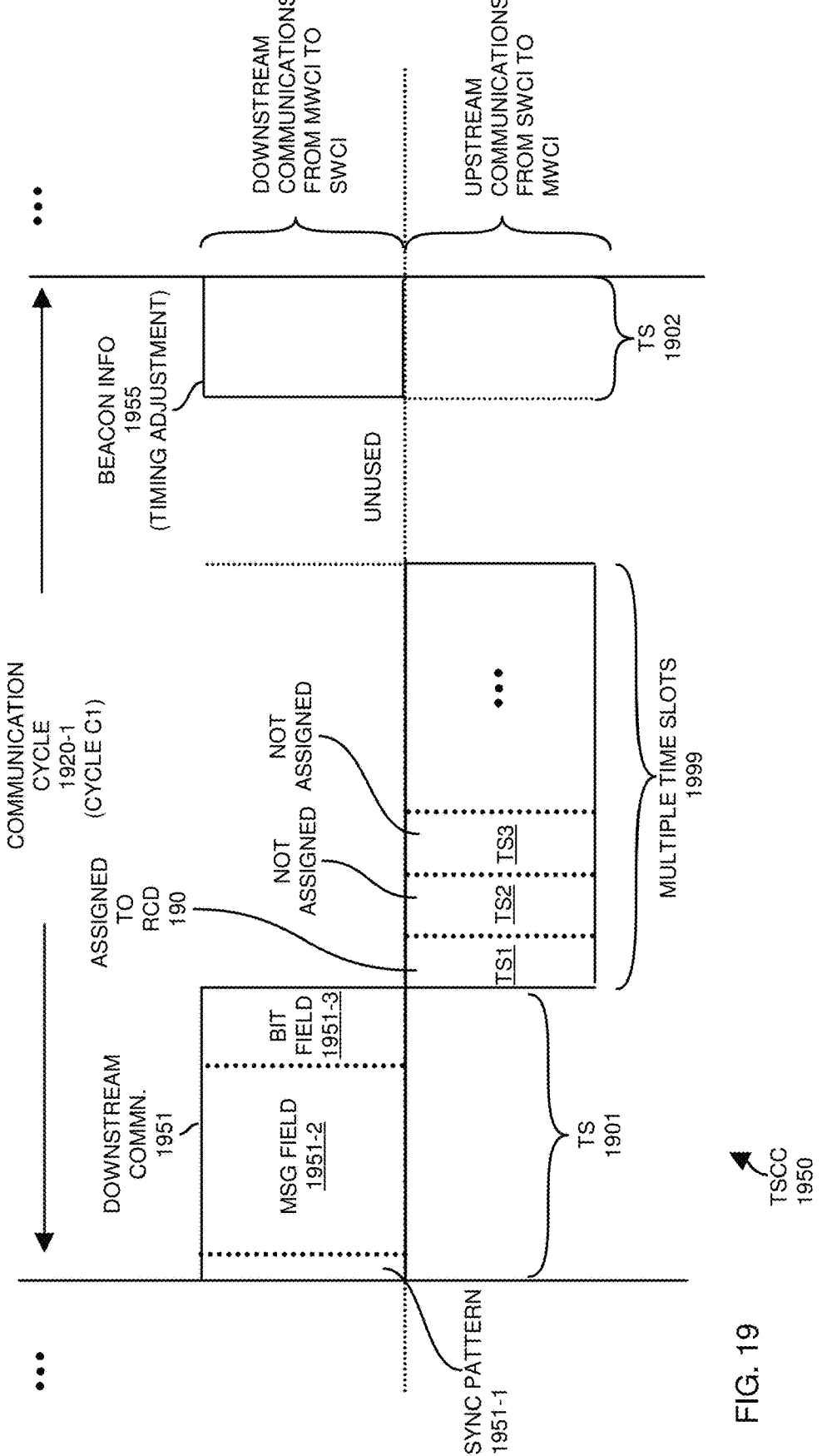
FIG. 19 is an example timing diagram illustrating use of a second time-slotted communication channel to communicate between a communication device and multiple downstream devices according to embodiments herein.
Figure 20:
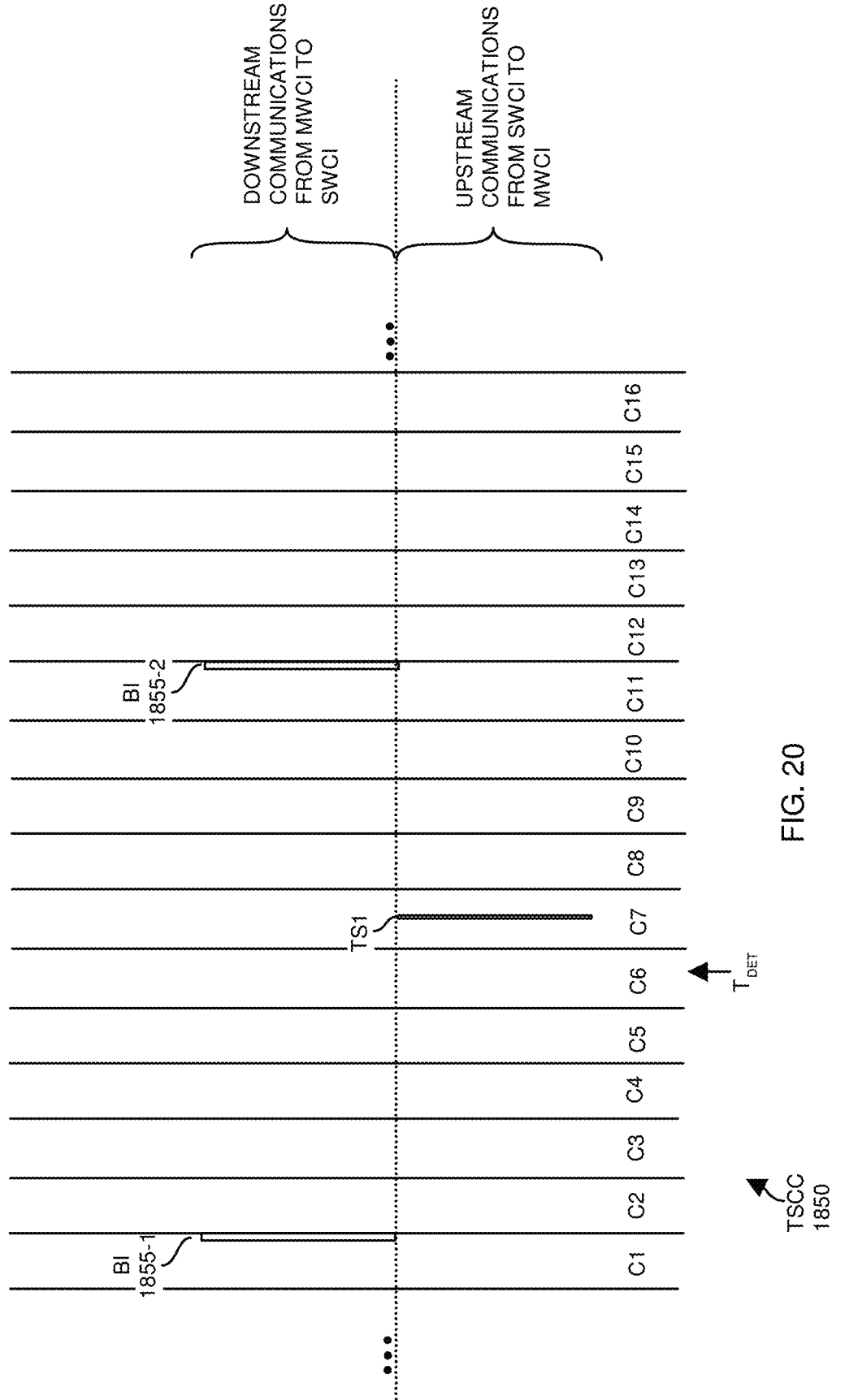
FIG. 20 is an example timing diagram illustrating use of a time-slotted communication channel to asynchronously communicate messages according to embodiments herein.

Note that the wireless communications received over the wireless communication link 127-1 (such as a persistent link) can regularly or occasionally include synchronization information generated by the manager resource 150 to keep the remote communication device 160, repeater 170, remote sensor device 180, etc., synchronized with the manager resource 150 over a respective time-slotted communication channel (see FIGS. 18-20).

Referring again to FIG. 7, the remote communication device 160 (as well as each of repeater 170 and remote sensor device 180) uses the synchronization information to synchronize itself with respect to a communication channel over which the remote communication device 160 communicates in the reverse direction back to the manager resource 150. In accordance with further embodiments, each device is assigned a different timeslot which to communicate in a first direction back to the manager resource 150.

Assume that the remote communication device 160 is assigned a particular timeslot in which to communicate to the manager resource 150. In one embodiment, the manager resource 150 knows that the communication is from the remote communication device 160 because it is present in the particular timeslot assigned to the remote communication device 160.

Alternatively, instead of transmitting communications in assigned time slots, note that the communications transmitted over the wireless communication link 127-1 can include a respective identifier value indicating which of the multiple communication devices transmitted a respective communication.

Further in this example embodiment, assume that the remote communication device 160 detects a trigger event such as motion with respect to object OBJ1 in region 195-1. If desired, the remote communication device 160 can attempt to communicate directly from the wireless interface 162 to the wireless access point 141 of domain gateway resource 140. This can include sending a wireless communication including a request to the wireless access point 141 to establish a respective communication link. If possible, the remote communication device 160 forwards a respective message (such as security data 869 in FIG. 6) to the wireless access point 141.

However, assume in this example, that the remote communication device 160 is out of range with respect to the wireless access point 141 and is therefore unable to establish a respective wireless communication link with it. In such an instance, in response to detecting the trigger event of motion associated with OBJ1, the remote communication device 160 transmits message 752 in its assigned timeslot from the slave wireless communication interface 163 over the wireless communication link 127-1 to the master wireless communication interface 154 of the manager resource 150.

Manager resource 150 operates the master wireless communication interface 154 to monitor the different time slots for communications from the downstream devices.

As previously discussed, manager resource 150 controls operation of master wireless communication interface 154 and wireless access point 151. During operation, the manager resource 150 monitors presence of communications (such as message 752) from the remote communication device 160.

In response to receiving the message 752 over the wireless communication link 127-1, the manager resource 150 controls operation of the wireless access point 151 to an ON state, enabling it to receive wireless communications from devices in the domain 110. More specifically, in response to receiving the message 752 such as a notification of a trigger event such as that a data payload is available or will be available from the remote communication device 160 for delivery to the manager resource 150, the manager resource 150 transitions the wireless access point 151 from a reduced power state (such as an OFF state) to an active state (such as an ON state) to receive security data from the remote communication device. In one embodiment, the security data to be forwarded to the manager resource 150 includes data captured by a respective security sensor device 161 of the remote communication device 160.

Although the wireless access point 151 can be configured to transmit beacons to devices in the domain 110 to indicate its availability, embodiments herein include communicating one or more availability notifications of the wireless access point 151 over the wireless communication link 127-1 to the remote communication device 160.

For example, in accordance with further embodiments, the master wireless communication interface 154 communicates message 756 in a respective time slot assigned to the manager resource 150 over the wireless communication link 128-2. The message 756 indicates an identity of the wireless access point 151 and socket of the manager resource 150 that should be used to communicate a subsequent data payload to the manager resource 150. Accordingly, the message 756 apprises the remote communication device 160 of an identity of the wireless access point 151 and socket to be used to forward a data payload as opposed to the remote communication device 160 otherwise receiving a beacon from the wireless access point 151 indicating its availability.

Figure 8:
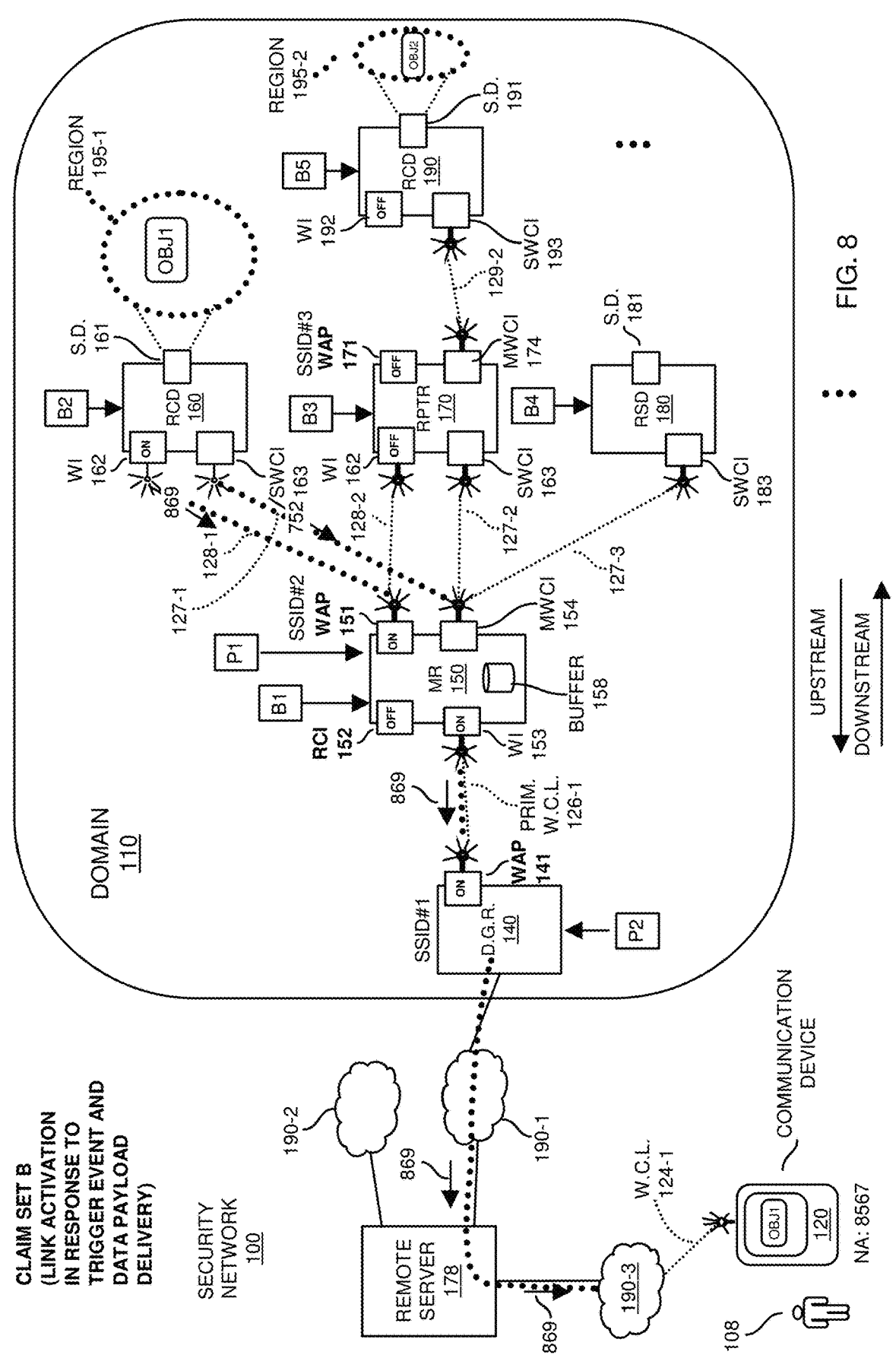
FIG. 8 is an example diagram illustrating establishment of a wireless communication path to convey a respective data payload to a target recipient according to embodiments herein.

As further shown in FIG. 8, subsequent to the manager resource 150 activating the wireless access point 151 to the ON state in response to receiving notification (message 752) from the remote communication device 160 that a trigger event such as that a data payload is available or will be available, the remote communication device 160 communicates a request to establish a respective communication link 128-1 from the wireless interface 162 to the wireless access point 151.

After appropriate handshaking (link negotiations) between the remote communication device 160 and the manager resource 150 to establish the respective wireless communication link 128-1 between the wireless interface 162 and the newly activated wireless access point 151, the remote communication device 160 negotiates with the wireless access point 151 for bandwidth to communicate the security data 869 over the established wireless communication link 128-1 to the wireless access point 151.

As needed, the manager resource 150 stores the received security data 869 in buffer 158. The manager resource 150 then selects which of multiple communication paths (such as the primary communication path 125-1 or bypass communication path 125-2) in which to transmit the received security data 869 upstream to the remote server 178 and/or communication device 120.

In this example embodiment, because the primary wireless communication link 126-1 is available, the manager resource 150 communicates the security data 869 (such as captured video data) over the primary wireless communication link 126-1 to the wireless access point 141. The domain gateway resource 140, in turn, forwards the security data 869 over network 190-1 to the remote server 178.

As previously discussed, note again that if it was not possible for the manager resource 150 to transmit the security data 869 upstream through the domain gateway resource 140 to the remote server 178, the manager resource 150 would communicate the security data 869 over the bypass wireless communication link 126-2 to the remote server 178.

As previously discussed, further note that the wireless communication link 127 (such as a time slotted radio channel) operates at one or more lower carrier frequencies than respective one or more carrier frequency of the wireless access point 151.

In accordance with further embodiments, the manager resource 150 (circuit assembly including the wireless access point 151 and the master wireless communication interface 154) can be powered by any suitable resource. In one embodiment, the circuit assembly and/or the manager resource 150 is powered only via power received from a battery B1. Alternatively, the battery B1 can be backup power with respect to power P1 provided to the manager resource 150.

As discussed herein, the manager resource 150 controls activation of the wireless access point 151 at different times to reduce power consumption such as during times when no data is available for receipt from the remote communication device 160. That is, during conditions such as when no data is available for receipt from remote communication device 160, repeater 170, remote sensor device 180, etc., or generally when the wireless access point 151 is not being used, the manager resource 150 discontinues powering the wireless access point 151 (or places it in a low power consumption sleep mode) to save battery power associated with battery B1, increasing the battery B1's useful life to power the manager resource 150. Further note that selective activation of the wireless interface 162 of remote communication device 160 also saves battery power with respect to battery B2, which, in one embodiment, is the sole source powering the remote communication device 160.

Figure 9:
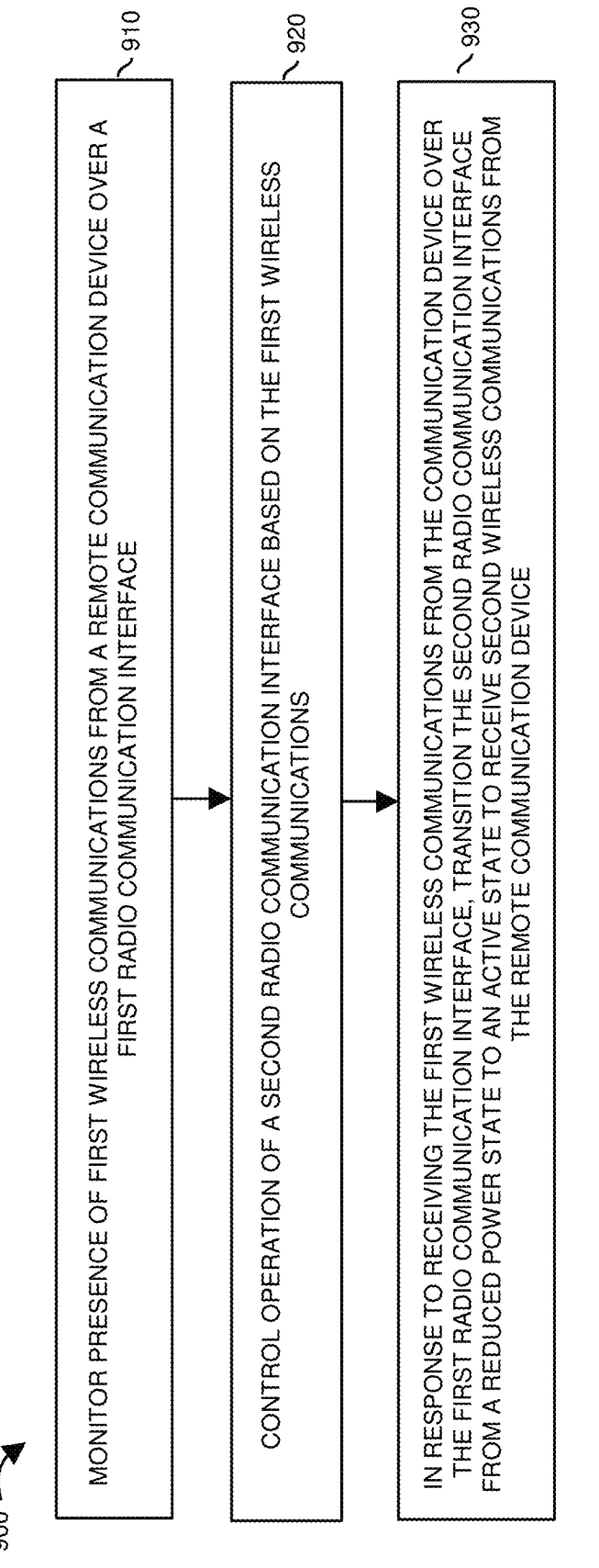
FIG. 9 is an example diagram illustrating a method of selectively powering one or more wireless communication interfaces in a network to support conveyance of data according to embodiments herein.

FIG. 9 is a flowchart 900 illustrating an example method according to embodiments herein. Note that there will be some overlap with respect to concepts as discussed above.

In processing operation 910, the manager resource 150 monitors presence of first wireless communications (such as received of message 752) from the remote communication device 160 over the master wireless communication interface 154 (such as a first radio communication interface of the manager resource 150).

In processing operation 920, the manager resource 150 controls operation of the wireless access point 151 (a second radio communication interface of the manager resource 150) based on receipt of the message 752.

In processing operation 930, in response to receiving the message 752 from the remote communication device 160 over the wireless communication link 127-1, the manager resource 150 transitions the wireless access point 151 from a reduced power state (such as an OFF state) to an active state (such as an ON state) to receive second wireless communications such as security data 869 from the wireless interface 162 of the remote communication device 160.

Figure 10:
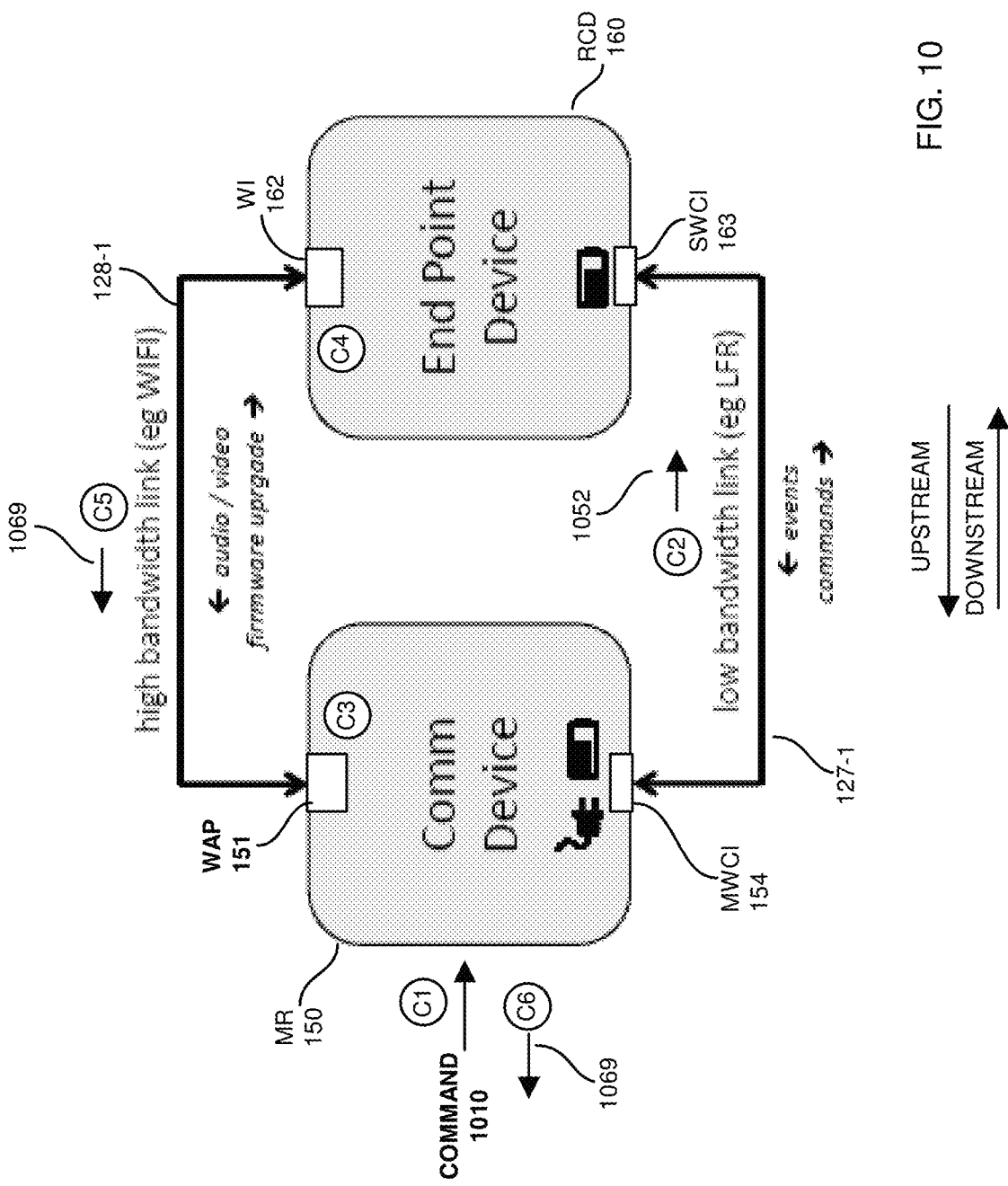
FIG. 10 is an example diagram illustrating connectivity of communication devices and signaling according to embodiments herein.

FIG. 10 is an example diagram illustrating connectivity of communication devices and signaling according to embodiments herein.

As shown, in processing operation C1, the communication device such as manager resource 150 receives a command 1010 (such as from the remote server 178) indicating to perform a function with respect to the remote communication device 160.

In processing operation C2, in response to detecting the command 1010, the manager resource 150 transmits the message 1052 in a downstream direction over the wireless communication link 127-1 to the endpoint device such as remote communication device 160. Assume that the message 1052 indicates to activate a security sensor device 161 of the remote communication device 160.

In processing operation C3, in response to receiving the command 1010 from a source such as a remote server 178 and/or communication device 120, the manager resource 150 powers up the wireless access point 151 in anticipation of receiving a subsequent data payload from the mobile communication device 160.

In processing operation C4, the remote communication device 160 activates a respective sensor device to monitor region 195-1. Additionally, the remote communication device 160 activates the wireless interface 162 to establish a respective wireless communication link 128-1 with the wireless access point 151.

In processing operation C5, subsequent to establishing the wireless communication link 128-1, the wireless interface 162 of remote communication device 160 negotiates with the wireless access point 151 to transmit a respective data payload to the manager resource 150 over the wireless communication link 128-1. In response to being granted bandwidth, the wireless interface 162 communicates the security data 1069 (data payload) over the wireless communication link 128-1 to the wireless access point 151 of manager resource 150.

In processing operation C6, the manager resource 150 transmits the security data 869 received over the wireless access point 151 in an upstream direction to a target recipient such as a remote server 178, communication device 120, etc.

Figure 11:
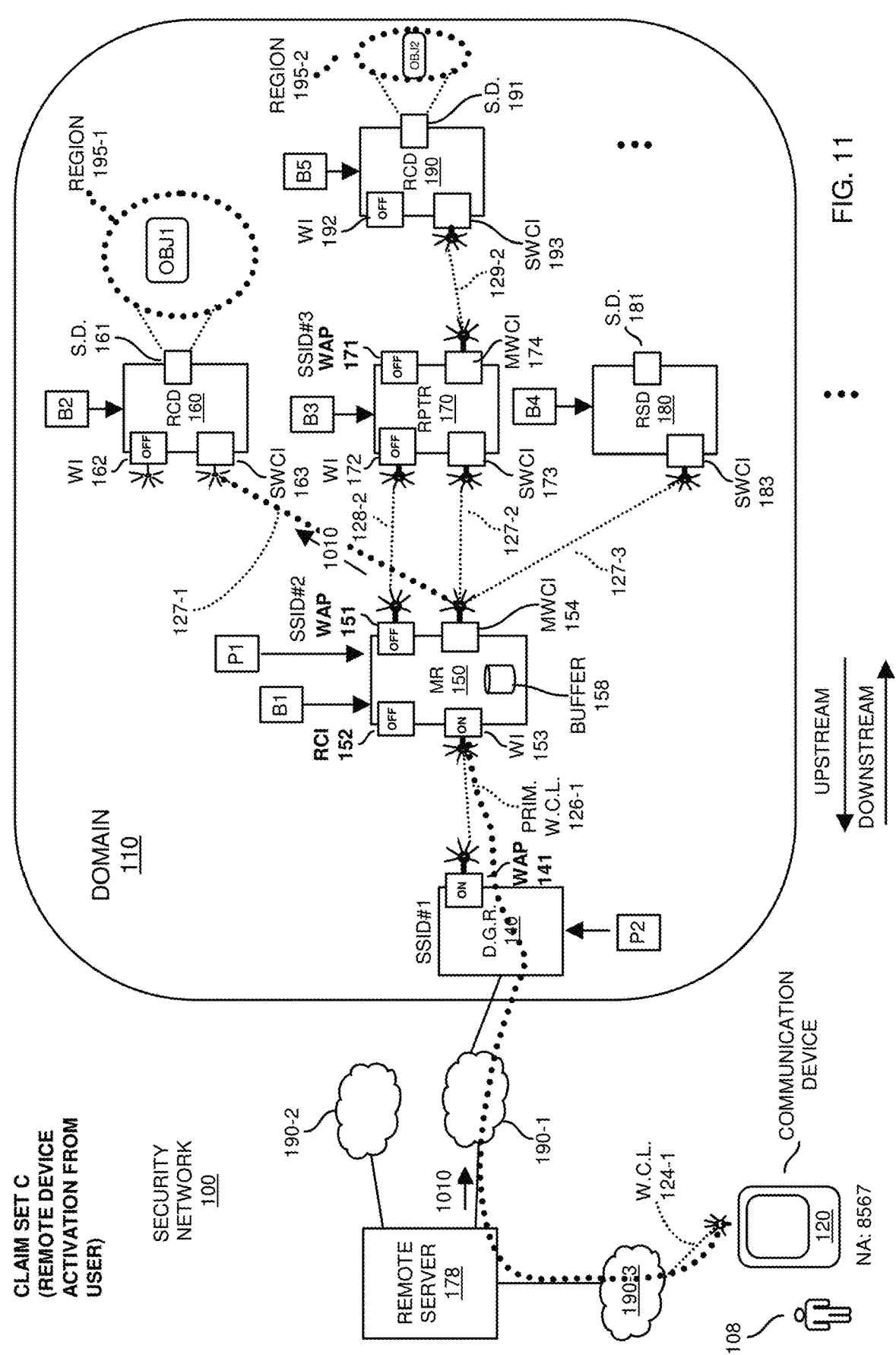
FIG. 11 is an example diagram illustrating receipt and conveyance of a command to activate a remote communication device according to embodiments herein.

FIG. 11 is an example diagram illustrating receipt and conveyance of a command to activate a remote communication device according to embodiments herein.

In this example embodiment, remote communication device 160 controls operation of sensor device 161, which monitors region 195-1 in domain 110. Initially, assuming that the remote communication device 160 has no data to transmit to the manager resource 150, the remote communication device controls the wireless interface 162 to an OFF state.

As previously discussed, at regular intervals or occasionally, during a synchronization process, slave wireless communication interface 163 receives wireless communications from manager resource 150 as transmitted over the master wireless communication interface 154. In a manner as previously discussed, during one or more timeslots of a respective persistent time-slotted channel, the manager resource 150 transmits (such as broadcasts) synchronization information over the master wireless communication interface 154 to the remote communication device, repeater 170, remote sensor device 180, etc.

The remote communication device 160 (as well as each of repeater 170 and remote sensor device 180 that receive the synchronization information from the master wireless communication interface 154) use the synchronization information to synchronize itself with respect to a persistent time-slotted communication channel over which the remote communication device 160 communicates in the reverse direction back to the manager resource 150. Each device is assigned a different one or more timeslots in which to communicate in a reverse direction back to the manager resource 150.

Further in this example embodiment, assume that the remote server 178 or communication device 120 generates a respective command 1010 to control the remote communication device 160 to an ON state. In such an instance, the remote server 178 forwards the command 1010 over network 190-1 to the domain gateway resource 140. The domain gateway resource 140 forwards the command 1010 downstream over the primary wireless communication link 126-1 (such as a persistent wireless communication link) to the manager resource 150.

In this example embodiment, the manager resource 150 detects that the received command 1010 applies to the remote communication device 160. In such an instance, the manager resource 150 forwards transmits the command 1010 (or derivative thereof) in an appropriate time slot of the master wireless communication interface 154 over wireless communication link 127-1 to the slave wireless communication interface 163 of remote communication device 160. Remote communication device 160 monitors for data in the time slot assigned to it. Thus, the remote communication device 160 receives the command 1010 in its assigned time slot over communication link 127-1.

In addition to transmitting and/or providing notification of the received command 1010 over the wireless communication link 127-1 to the remote communication device 160, the manager resource 150 anticipates (based on the command 1010) that the remote communication device 160 will need to send a data payload to the remote communication device in response to receiving and executing the command 1010.

In one embodiment, the command 1010 indicates to activate the sensor device 161 to monitor (produce images of) the region 195-1. Based on the monitoring, the remote communication device 160 generates security data 1069 (such as audio and/or video data from monitoring the region 195-1) for delivery to the manager resource 150.

In accordance with further embodiments, the master wireless communication interface 154 can be configured to communicate message 1012 in a respective time slot assigned to the manager resource 150 over the wireless communication link 128-2. The message 1012 indicates an identity of the wireless access point 151 and corresponding socket of the manager resource 150 that should be used to communicate a subsequent data payload to the manager resource 151. Accordingly, the message 1012 apprises the remote communication device 160 of an identity of the wireless access point 151 and path to be used to forward a data payload as opposed to the remote communication device 160 otherwise receiving a beacon from the wireless access point 151 indicating its availability after it is powered up.

Figure 12:
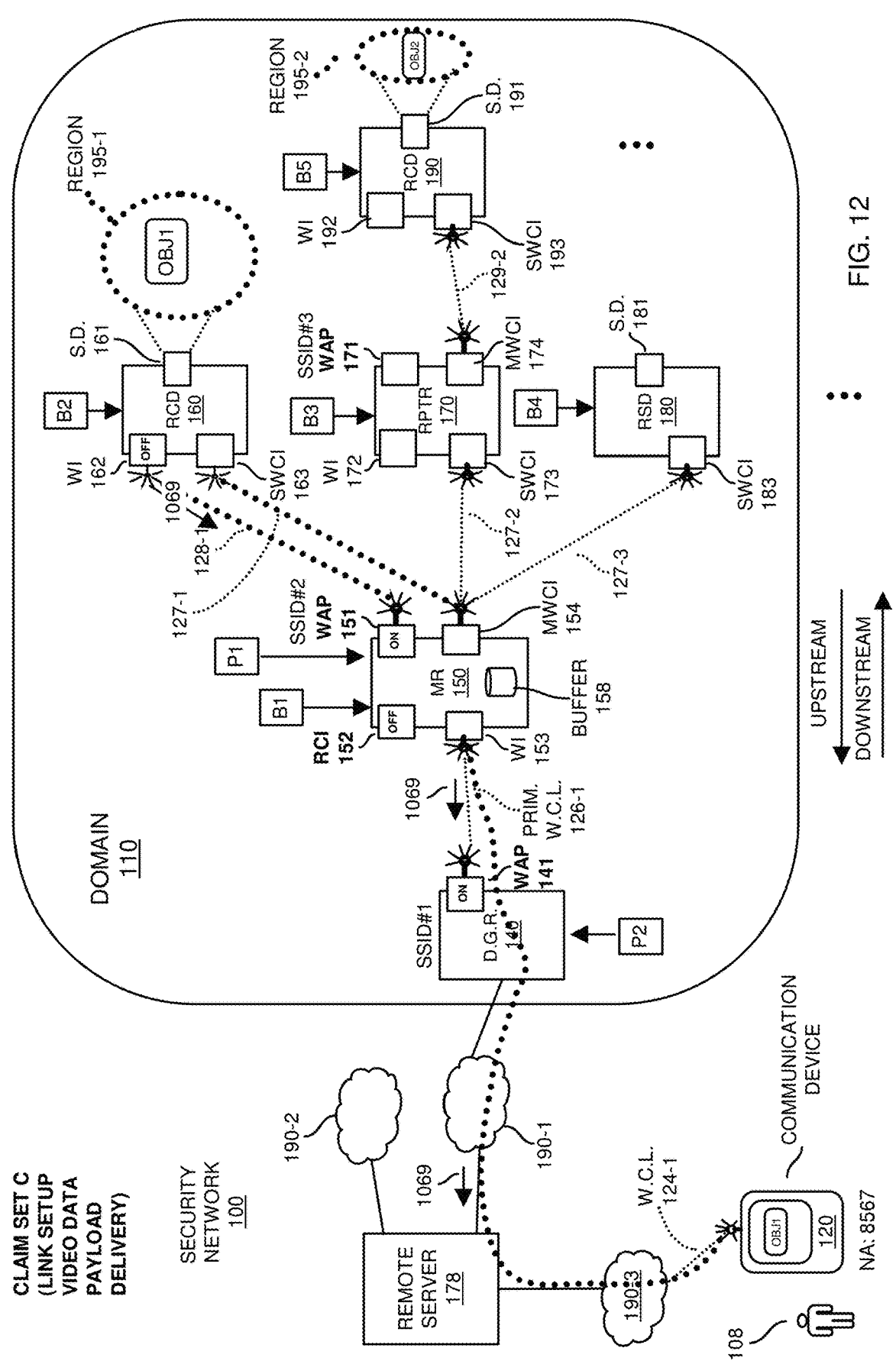
FIG. 12 is an example diagram illustrating establishment of a wireless communication path to convey a respective data payload to a target recipient according to embodiments herein.

In anticipation of receiving the security data 1069 from the remote communication device 160, the manager resource 150 activates the wireless access point 151 to an ON state as indicated in FIG. 12. More specifically, in response to receiving the command 1010 such as to activate the remote communication device 160, the manager resource 150 transitions the wireless access point 151 from a reduced power state (such as an OFF state) to an active state (such as an ON state in which the wireless access point 151 is able to transmit and receive wireless communications) to receive data collected in or produced by the remote communication device 160.

In one embodiment, the security data 1069 to be forwarded from the remote communication device 160 to the manager resource 150 includes data (such as video, audio, etc.) captured by a respective security sensor device 161 of the remote communication device 160.

As further shown in FIG. 12, subsequent to the manager resource 150 activating the wireless access point 151 to the ON state in response to receiving the command 1010, the remote communication device 160 communicates a request to establish a respective communication link 128-1 from the wireless interface 162 to the wireless access point 151. After appropriate handshaking (such as one or more communications or negotiations to set up wireless communication link 128-1) between the remote communication device 160 and the manager resource 150 to establish the respective wireless communication link 128-1 between the wireless interface 162 and the wireless access point 151, the remote communication device 160 negotiates with the wireless access point 151 for bandwidth to communicate the security data 1069 over the wireless communication link 128-1 to the wireless access point 151.

As needed, the manager resource 150 stores the security data 1069 received over the wireless communication link 128-1 in buffer 158. The manager resource 150 then selects which of multiple communication paths (such as the primary communication path 125-1 or bypass communication path 125-2) in which to transmit the received security data 1069 upstream from the manager resource 150 to the remote server 178 and/or communication device 120.

In this example embodiment, because the primary wireless communication link 126-1 is available and currently active, the manager resource 150 communicates the security data 1069 over the primary communication path 125-1 to the remote server 178. If it was not possible to transmit the security data 1069 upstream through the domain gateway resource 140 to the remote server 178 such as due to a failure condition, the manager resource 150 would optionally establish a respective wireless communication link 125-2 with the network 190-2 and then communicate the security data 1069 over the bypass wireless communication link 126-2 to the remote server 178.

Note that further embodiments can include conveying the security data 1069 from the remote server 178 to the communication device 120 for playback on the communication device 120. Accordingly, the user 108 operating the communication device 120 is able to request activation of remote communication device 160 in the domain 110 and then playback images and/or audio collected by the remote communication device 160 monitoring of the region 195-1 in the domain 110. In this example embodiment, the user 108 is able to play back respective images of the object OBJ1 on a respective display screen of the communication device 120.

As previously discussed, the wireless communication link 127 (such as a time slotted radio channel or low frequency channel with respect to higher carrier frequencies of the wireless access points) can be configured to operate at substantially one or more lower carrier frequencies than respective one or more carrier frequency of the wireless access point 151. The lower frequency allows for long range and lower power consumption to wirelessly communicate with other devices in domain 110.

As previously discussed, the manager resource 150 (such as circuit assembly including the wireless access point 151 and the master wireless communication interface 154) can be powered by any suitable resource. In one embodiment, the circuit assembly and/or the manager resource 150 is powered only via power received from a battery B1. Alternatively, the battery B1 can be backup power with respect to main grid power P1 (if available) provided to power the manager resource 150.

As previously discussed, the manager resource 150 therefore deactivates the wireless access point 151 at different times to reduce power consumption such as during times when no data is available for receipt from the remote communication device 160. That is, during conditions such as when no data is available for receipt, or generally when the wireless access point 151 is not being used, the manager resource 150 discontinues powering the wireless access point 151 (or places it in a low power consumption load) to save battery power associated with battery B1, increasing its useful life to power the manager resource 150. Selective activation of the wireless interface 162 of remote communication device 160 (such as when the respective user 108 would like to activate the remote communication device 160 to retrieve corresponding playback data of region 195-1) also saves battery power with respect to battery B2.

FIG. 13 is a flowchart 1300 illustrating an example method according to embodiments. Note that there will be some overlap with respect to concepts as discussed above.

In processing operation 1310, the manager resource 150 receives a command 1052 to control remote communication device 160.

In processing operation 1320, the manager resource 150 receives command 1050.

In processing operation 1330, in response to receiving the command 1052, the manager resource 150: i) wirelessly conveys the command 1052 through master wireless communication interface 154 (a first communication interface) to the remote communication device 160.

In processing operation 1340, in response to receiving the command 1052, the manager resource 150 supplies power to wireless access point 151 (a second communication interface) in anticipation of wirelessly receiving a data payload (such as security data 1069) over the wireless access point 151 from the remote communication device 160.

Figure 14:
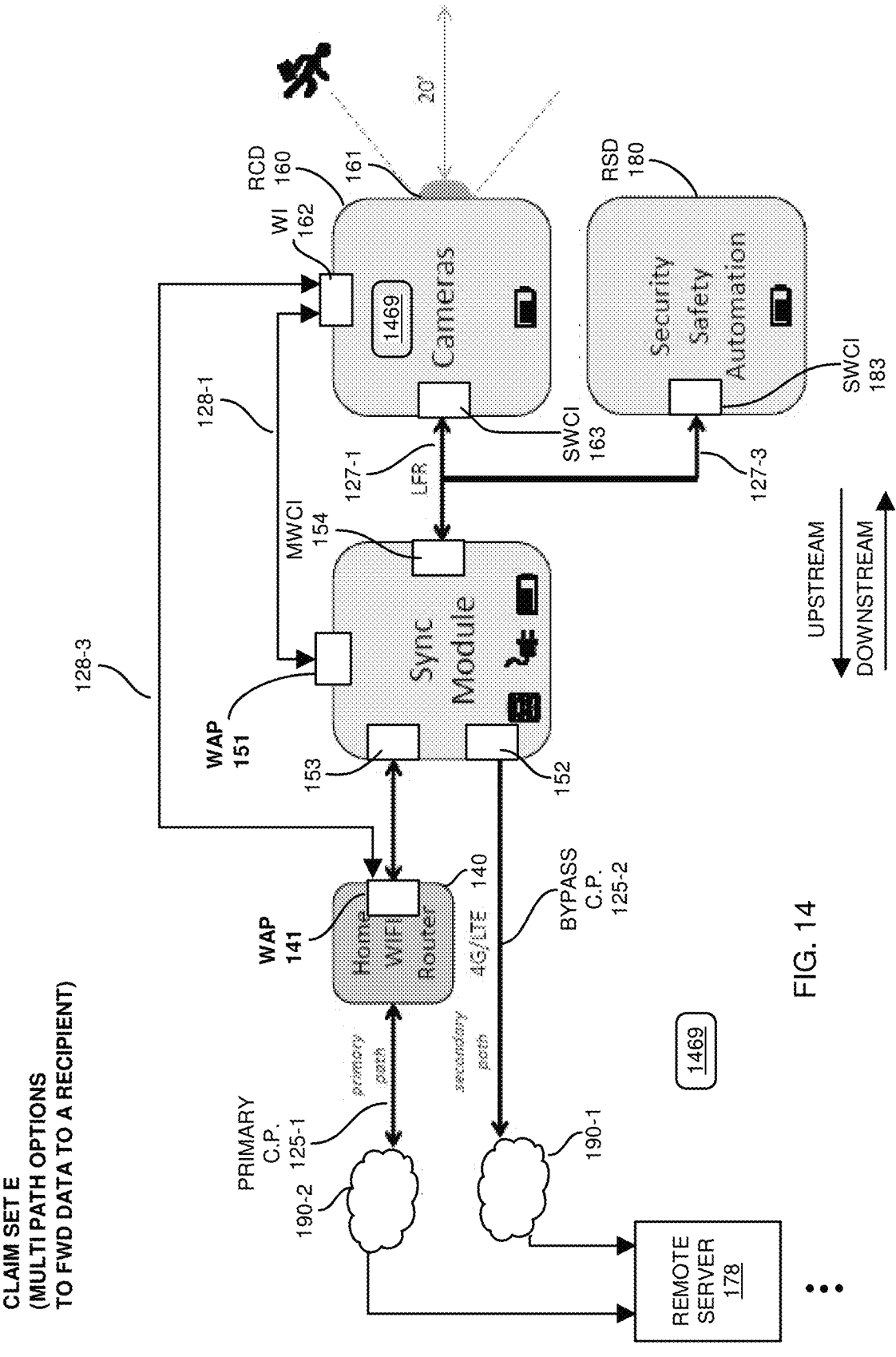
FIG. 14 is an example diagram illustrating selective use of multi-path options in which to forward data according to embodiments herein.

FIG. 14 is an example diagram illustrating multi-path options in which to forward data according to embodiments herein.

In this example embodiment, as previously discussed, each device such as the remote communication device 160 as well as remote security device 180 monitors the domain 110 for different types of events. For example, the remote communication device 160 can include a respective sensor device 161 such as a camera to monitor region 195-1 for movement of objects.

In response to detecting a trigger event such as movement of a respective object in region 195-1, the remote communication device 160 initiates forwarding of a message such as security data 1469 (capturing the trigger event) to the remote server 178.

As shown, there are a number of different ways to communicate respective security data 1469 from the remote communication device 160 to the remote server 178. For example, in one embodiment, the domain gateway resource 140 may be powered (such as via power received from the grid), in which case, the domain gateway resource 140 is able to communicate over the primary communication path 125-1 through network 190-1 to the remote server 178. In such an instance, the wireless access point 141 is available for receiving communications from any of the devices in domain 110 if they are within communication range.

In this example embodiment, the remote communication device 160 operates the wireless interface 162 to establish a respective wireless communication link 128-3 with the wireless access point 141 of the domain gateway resource 140. Assume that the remote communication device 160 is within wireless communication range and the domain gateway resource 140 and wireless access point 141 are properly powered; the remote communication device 160 establishes the wireless communication link 128-3 with the wireless access point 141. The remote communication device 160 then negotiates with the wireless access point 141 to be allocated bandwidth in which to transmit a respective data payload (security data 1469) to the domain gateway resource 140.

The domain gateway resource 140 forwards the security data 1469 over the primary communication path 125-1 to the remote server 178. In a manner as previously discussed, the remote server 178 can be configured to forward the security data 1469 to the communication device 120 for playback to user 108.

Assume further in this example that the domain gateway resource 140 experiences a respective failure such as a power outage in which case the domain gateway resource is unable to power the wireless access point 141. In this instance, the domain gateway resource 140 is unable to receive security data 1469 via the wireless access point 141. In response to detecting an inability to communicate the security data 1469 to the domain gateway resource 140, the remote communication device 160 generates a communication for transmission from the slave wireless communication interface 163 over the wireless communication link 127-1 to the master wireless communication interface 154 of the manager resource 150. The notification indicates that the remote communication device 160 has a respective data payload for transmission to the manager resource 150.

In response to receiving the notification of the availability of the data payload from remote communication device 160, the manager resource 150 supplies power to the wireless access point 151 in anticipation of receiving the data payload 1469. Subsequent to powering of the wireless access point 151 by the manager resource 150, the remote communication device 160 communicates with the wireless access point 151 to establish a respective wireless communication link 128-1. Subsequent to establishing the wireless communication link 128-1, the wireless interface 162 of the remote communication device 160 transmits the security data 1469 over the wireless communication link 128-1 to the wireless access point 151.

As previously discussed, the domain gateway resource 140 may be depowered or inoperable due to a respective failure. In such an instance, the manager resource 150 is unable to communicate with the remote server 170 through the domain gateway resource 140. Due to the interoperability, the manager resource 150 activates the wireless interface 153 to establish a respective bypass communication path through the network 190-2 to the remote source 170. Subsequent to establishing the respective bypass communication path 125-2, the manager resource 150 communicates the security data 1469 received from the remote communication device 160 over the bypass communication path 125-2 to the remote server 178.

Note that the manager resource 150 can make a decision over which of multiple possible communication path forward security data 1469. For example, the domain gateway resource 140 may be properly powered but inoperable to communicate with the remote server 178 over the primary communication path 125-1. Additionally, the manager resource 150 may be operable to communicate with either the domain gateway resource 140 or use the bypass communication path 125-2 to communicate with the remote server 178. In such an instance, the remote communication device 160 can be configured to select between forwarding the security data 1469 over the wireless communication link 128-3 to the domain gateway resource 140 or forwarding the security data 1469 over the wireless communication link 128-1 to the manager resource 150.

Manager resource 150 has the option of i) forwarding the security data 1469 through the domain gateway resource 140 or ii) forwarding the security data 1469 over the bypass communication path 125-2 to the remote server 178.

Accordingly, embodiments herein include selectively forwarding the security data 1469 over one of multiple communication paths to the remote server 178 or other suitable target recipient.

Figure 15:
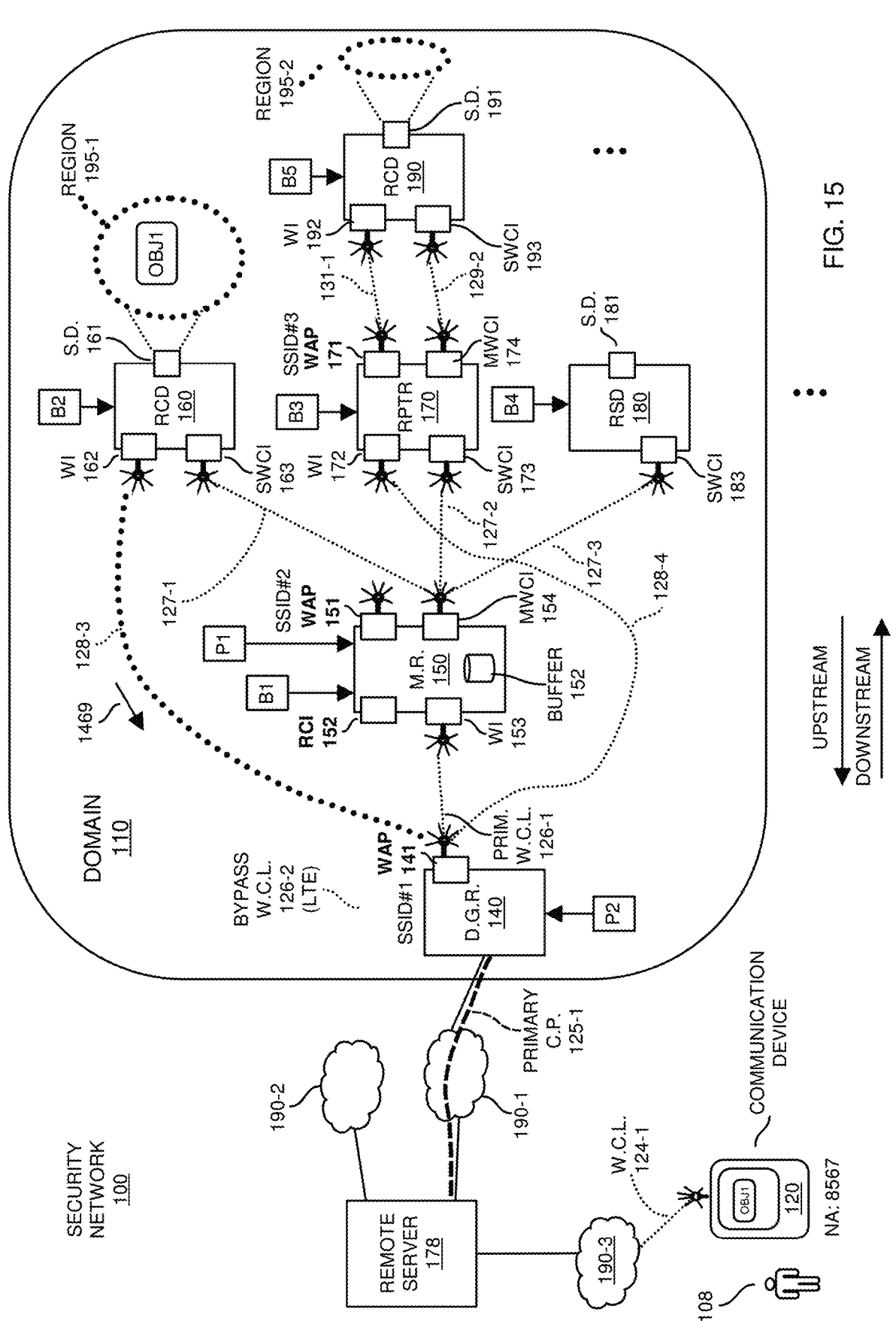
FIG. 15 is a more detailed diagram illustrating selection of a first communication path of multiple wireless communication paths to communicate a data payload to a target recipient according to embodiments herein.

FIG. 15 is a more detailed example diagram illustrating selection of a first communication path of multiple possible communication paths to communicate a data payload to a target recipient according to embodiments herein.

As shown in this example embodiment, the remote communication device 160 of the wireless security system in domain 110 monitors a location (region 195-1) for occurrence of a trigger event such as motion detection of an object (OBJ1), opening of a door, etc. In one embodiment, the trigger event is a measure of security with respect to the location being monitored.

Assume that the remote communication device 160 detects a trigger event (such as motion) occurring at the monitored location (region 195-1). In response to detecting the trigger event, the remote communication device 160 produces a message 1469 (such as a data payload) capturing the trigger event.

As a further response to detecting a trigger event such as movement of a respective object in region 195-1, the remote communication device 160 initiates forwarding of a message such as respective security data 1469 (capturing the trigger event) to the remote server 178.

As discussed herein, this can be achieved in a number of different ways. For example, in one embodiment as shown in FIG. 15, the domain gateway resource 140 may be powered (such as via power received from the grid), in which case, the domain gateway resource 140 is able to communicate over the primary communication path 125-1 through network 190-1 to the remote server 178. In such an instance, the wireless access point 141 of domain gateway resource 140 is available for receiving communications from any of the devices in domain 110 if they are within wireless communication range.

Assume in this example that the remote communication device 160 chooses the wireless access point 141 of domain gateway resource 140 to forward the security data 1469 after detecting that the wireless access point is available and within wireless communication range. In such an instance, the remote communication device 160 operates the wireless interface 162 to establish a respective wireless communication link 128-3 with the wireless access point 141 of the domain gateway resource 140. Since the remote communication device 160 is within wireless communication range and the domain gateway resource 140 and wireless access point 141 are properly powered, the remote communication device 160 establishes the wireless communication link 128-3 with the wireless access point 141. The remote communication device 160 then negotiates with the wireless access point 141 to be allocated bandwidth in which to transmit a respective data payload (security data 1469) to the domain gateway resource 140 over the wireless communication link 128-3.

Subsequent to receiving the security data 1469 over the wireless communication link 128-3 from the wireless interface 162, the domain gateway resource 140 forwards the security data 1469 over the primary communication path 125-1 to the remote server 178. In a manner as previously discussed, the remote server 178 can be configured to forward the security data 1469 to the communication device 120 for playback to user 108.

Figure 16:
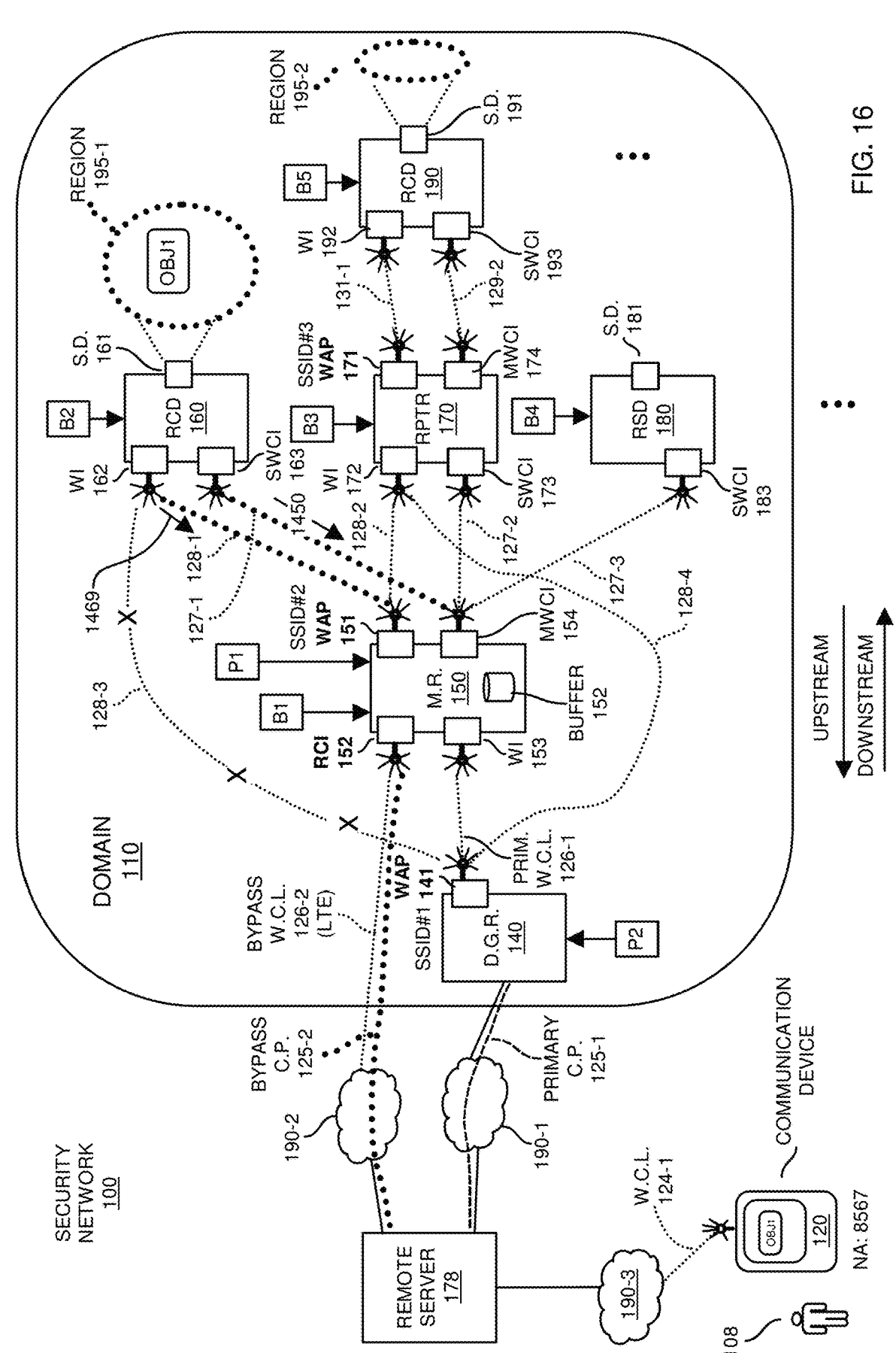
FIG. 16 is a more detailed example diagram illustrating selection of a second communication path of multiple wireless communication paths to communicate a data payload to a target recipient according to embodiments herein.

FIG. 16 is a more detailed example diagram illustrating selection of a second communication path of multiple communication paths to communicate a data payload to a target recipient according to embodiments herein.

Assume further in this example that the domain gateway resource 140 experiences a respective failure such as a power outage in which case the domain gateway resource 140 is unable to power the wireless access point 141. In this instance, the domain gateway resource 140 is unable to receive security data 1469 from the remote communication device 160 via the wireless access point 141.

In response to detecting an inability to communicate the security data 1469 to the domain gateway resource 140, the remote communication device 160 attempts to transmit the security data 1469 to the remote server 178 over a different communication path than as previously discussed in FIG. 15. For example, in such an instance, in FIG. 16, the remote communication device 160 generates a notification communication 1450 for transmission from the slave wireless communication interface 163 over the wireless communication link 127-1 to the master wireless communication interface 154 of the manager resource 150. As previously discussed, the wireless communication link 127-1 can be a shared, time-slotted communication channel in which the remote communication device is assigned one or more time slots in which to communicate upstream to the manager resource 150. The notification communication 1450 to the manager resource 150 indicates that the remote communication device 160 has a respective data payload (security data 1469) for transmission to the manager resource 150.

In response to receiving the notification message 1450 indicating availability of the data payload (security data 1469) from remote communication device 160, the manager resource 150 supplies power to the wireless access point 151 in anticipation of subsequently receiving the data payload.

Subsequent to powering of the wireless access point 151 by the manager resource 150, the remote communication device 160 communicates with the wireless access point 151 to establish respective wireless communication link 128-1. Subsequent to establishing the wireless communication link 128-1, the wireless interface 162 of the remote communication device 160 transmits the security data 1469 over the wireless communication link 128-1 to the wireless access point 151.

As previously discussed, the domain gateway resource 140 may be unpowered or inoperable due to a respective network failure (such as power failure, component failure, communication interface failure, etc.). In such an instance, the manager resource 150 is unable to communicate through the domain gateway resource 140 to the remote server 178. Due to this interoperability, the manager resource 150 activates the wireless interface 153 to establish a respective bypass communication path 125-2 through the network 190-2 to the remote source 178. Subsequent to establishing the respective bypass communication path 125-2, the manager resource 150 communicates the previously received security data 1469 from the remote communication device 160 over the bypass communication path 125-2 to the remote server 178.

In accordance with yet further embodiments, note that the manager resource 150 can make its own decision over which of multiple possible communication path forward security data 1469. For example, the domain gateway resource 140 may be properly powered and operable to communicate with the remote server 178 over the primary communication path 125-1. Additionally, the manager resource 150 may be operable to communicate with either the domain gateway resource 140 or use the bypass communication path 125-2 to communicate with the remote server 178.

In other words, the remote communication device 160 can be configured to select between i) forwarding the security data 1469 over the wireless communication link 128-3 to the domain gateway resource 140 (in which case the domain gateway resource 140 forwards the security data 1469 over the primary communication path 125-1 to the remote server 170) or ii) forwarding the security data 1469 over the wireless communication link 128-1 to the manager resource 150.

As previously discussed, the manager resource 150 has the option of i) forwarding the security data 1469 through the domain gateway resource 140 or ii) forwarding the security data 1469 over the bypass communication path 125-2 to the remote server 178.

Accordingly, embodiments herein include selectively forwarding the security data 1469 over one of multiple communication paths to the remote server 178 or other suitable target recipient.

Figure 17:
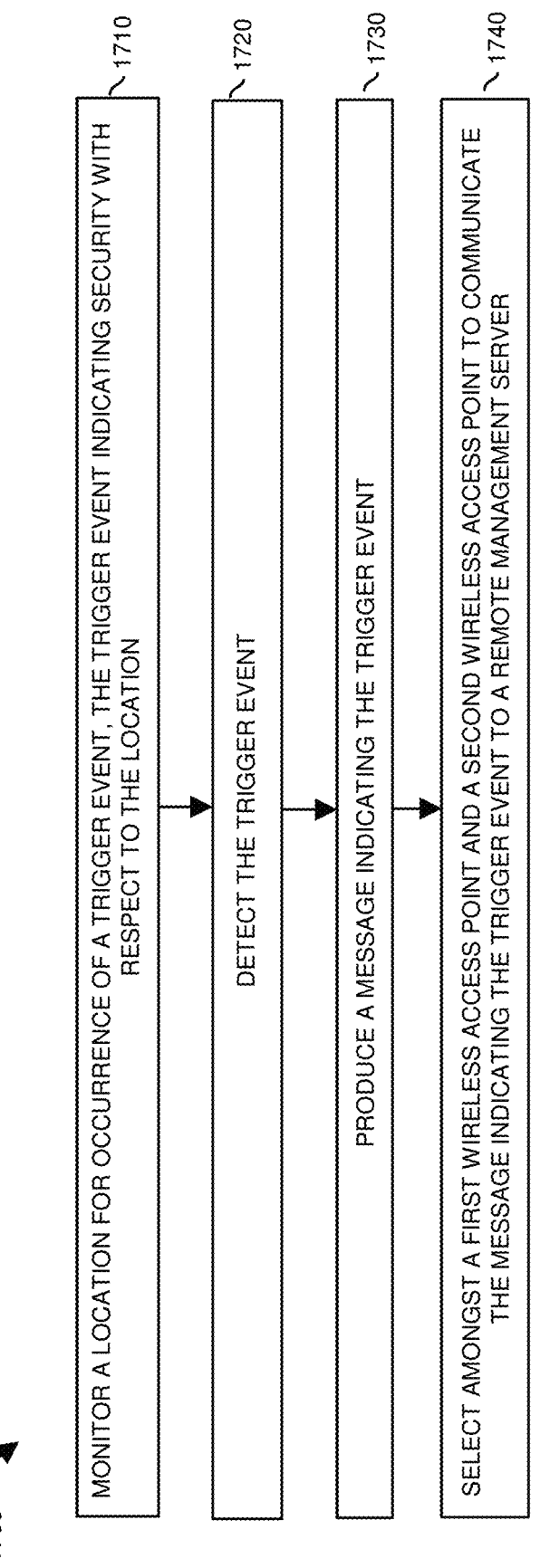
FIG. 17 is an example diagram illustrating a method of selectively communicating messages over multiple available wireless paths according to embodiments herein.

FIG. 17 is an example diagram illustrating a method of selectively communicating messages over multiple available wireless paths according to embodiments herein.

In processing operation 1710, the remote communication device 160 monitors a location (such as region 195-1) for occurrence of a security trigger event. In one embodiment, the event indicates whether the location is secure or not.

In processing operation 1720, the remote communication device 160 detects a trigger event such as movement of an object OBJ1 in monitored region 195-1.

In processing operation 1730, the remote communication device 160 produces a message (such as a data payload) indicating details of the trigger event.

In processing operation 1740, the remote communication device 160 selects amongst wireless access point 141 (such as a first wireless access point) and wireless access point 151 (such as a second wireless access point) to communicate the message indicating the trigger event to a remote server 178.

FIG. 18 is an example diagram illustrating attributes of a time slotted communication channel according to embodiments herein.

As previously discussed, in one embodiment, each of the wireless communication links 127, 129, etc., includes or represents a time-slotted communication channel supporting communications between upstream and downstream devices. For example, in one embodiment, wireless communication link 127 represents a first time-slotted communication channel 1850 as shown in FIG. 18. Wireless communication link 129 represents a second time-slotted communication channel 1950 as shown in FIG. 19.

Referring again to FIG. 18, communication cycle 1820-1 is an example of one of multiple repeating communication cycles in the time slotted communication channel 1850. In other words, in one embodiment, each cycle in time-slotted communication channel is the same. Each of multiple cycles of time-slotted communication channel 1850 is partitioned in a similar manner as cycle C1.

Note that the time slotted communication channel 1850 can be operated in any suitable frequency band. By way of non-limiting example embodiment, the time slotted communication channel 1850 can be operated in the ISM (Industrial, Scientific and Medical) radio band such as around 900 MHz.

In this example embodiment, the master wireless communication interface 154 produces and/or controls certain attributes of the time-slotted communication channel 1850. In one embodiment, the master wireless communication interface 154 is configured to frequency hop the time slotted communication channel 1850 amongst 64 different channels with 400 kHz spacing.

Further, note that any suitable modulation scheme can be used to convey bit information to target recipients in the time-slotted communication channel 1850. In one embodiment, the modulation scheme includes Gaussian Frequency Shift Keying (GFSK) type of modulation.

As a more specific example, as shown, the time-slotted communication channel 1850 includes first allocated time slot 1801 (such as one or more time slots) in which a respective master wireless communication interface (such as master wireless communication interface 154 of manager resource 150) is able to (if desired) communicate with one or more downstream devices (such as remote communication device 160, repeater 170, remote sensor device 180, etc.).

The time-slotted communication channel 1850 also includes a second set of allocated time slots in which each of the downstream devices (such as remote communication device 160, repeater 170, remote sensor device, etc.) is assigned or allocated one or more time slots in a respective communication cycle to communicate with an upstream device (such as manager resource 150). During the multiple time slots 1899, the master wireless communication interface 154 listens (monitors wireless communication link 127-1) for transmissions from downstream devices.

In this example, note that the time slot TS1 is assigned to the remote communication device 160; the time slot TS2 is assigned to the repeater 170; the time slot TS3 is assigned to the remote sensor device 180; etc.

Time slot 1802 is assigned to the manager resource 150 (or master wireless communication interface 154) to selectively broadcast beacon information 1855 to maintain a respective wireless communication link with multiple downstream devices.

In one embodiment, the time slotted communication channel 1850 is persistent. That is, although neither upstream nor downstream devices may use the time-slotted communication channel 1850 to communicate for one or more cycles, the devices maintain internal timing such that the time-slotted communication channel 1850 is always available to the communication devices to communicate with each other on an as-needed basis.

For example, the manager resource 150 can be configured to transmit the beacon information 1855 once every so often such as once every n cycles. In such an instance, if the repeating communication cycle 1820-1 is a duration of one second, the master wireless communication interface 154 transmits the beacon information 1855 once every n seconds or n cycles. Note that the value n and the corresponding rate of transmitting the beacon information 1855 can be adjusted to any suitable value. For example, the master wireless communication interface 154 can be configured to transmit the beacon information 1855 once every 10 seconds, once every 100 seconds, once every 1000 seconds, etc.

As further discussed below, the beacon information 1855 can include link maintenance information to persist the time slotted communication channel 1850 for weeks, months, or even years.

As previously discussed, note that if the manager resource 150 has no messages for any of the downstream communication devices, the manager resource 150 does not broadcast any communications downstream from the master wireless communication interface 154 in respective time slots 1801 or 1802. This helps to reduce depleting energy from battery B1 by the manager resource 150.

As a further example, note that subsequent to the downstream devices such as remote communication device 160, repeater 170, remote sensor device 180, etc., synchronizing themselves with the master wireless communication interface 154, any of the communication devices (such as remote communication device 160, repeater 170, remote sensor device 180, etc.) are able to communicate in an upstream direction at any time in a respective assigned timeslot to the manager resource 150.

In general, persistence of the time slotted communication channel 1850 (which requires little power consumption by the participating devices) helps to ensure that there are little or no delays to perform different functions supported by the wireless network. In other words, because the downstream devices remote communication device 160, repeater 170, remote sensor device 180, etc., are synchronized with respect to the time slotted communication channel 1850 via the occasionally received beacon information 1855, the time slotted communication channel 1850 is readily available to communicate messages in an upstream or downstream direction by any of the devices using the wireless communication link 127.

To communicate from the manager resource 150 to the downstream devices such as remote communication device 160, repeater 170, remote sensor device 180, etc., the manager resource 150 operates master wireless communication interface 154 to communicate a downstream communication 1851 in time slot 1801. As previously discussed, if the manager resource 150 has no data or messages to transmit downstream, then the manager resource 150 does not wirelessly transmit data over the master wireless communication interface 154. The master wireless communication interface 154 listens for transmissions from the downstream devices in multiple time slots 1899.

In this example embodiment, as further shown in FIG. 18, in the event that the manager resource 150 does have communications for transmission downstream, the manager resource 150 produces the downstream communication 1851 broadcasted to the downstream devices to include multiple message components including a synchronization pattern 1851-1, message field 1851-2, and bit field 1851-3.

The master wireless communication interface 154 transmits the synchronization pattern 1851-1 to enable the downstream recipient devices to frequency lock to the current carrier frequency of the time slotted communication channel 1850 over which the master wireless communication interface 154 communicates the pattern 1851-1. Locking to the current carrier frequency over which the time slotted communication channel 1850 is transmitted enables the respective recipient devices such as remote communication device 160, repeater 170, remote sensor device 180, etc., to better receive additional information (such as message field 1851-2, bit field 1851-3, beacon information 1855, etc.) subsequently transmitted by the master wireless communication interface 154.

The master wireless communication interface 154 transmits any message information (such as a command, event, status information, etc.) in the respective message field 1851-2 to the respective downstream devices.

The master wireless communication interface 154 transmits address information in the bit field 1851-3 to indicate which of one or more of the downstream communication devices to which the message or data in the message field 1851-2 pertains.

In accordance with further embodiments, the bit field 1851-3 can be partitioned into multiple sub timeslots, each of which is assigned to a respective downstream device. A respective setting of a bit in a respective sub timeslot of the bit field 1851-3 indicates whether or not the message in message field 1851-2 pertains to the corresponding downstream device to which the respective sub timeslot is assigned. In this manner, the manager resource 150 is able to communicate a single message in message field 1851-2 to one or more downstream recipient devices listening for wireless communications transmitted from the master wireless communication interface 154 over the wireless communication link 127.

Assume, further in this example, that timeslot TS1 is assigned to remote communication device 160 to communicate in an upstream direction from the slave wireless communication interface 163 over the time slotted communication channel 1850 (such as wireless communication link 127-1) to the master wireless communication interface 154; assume that timeslot TS2 of the time slotted communication channel 1850 is assigned to repeater 170 to communicate in an upstream direction from the slave wireless communication interface 173 over the time slotted communication channel 1850 (such as wireless communication link 127-2) to the master wireless communication interface 154; assume that timeslot TS3 of the time slotted communication channel 1850 is assigned to remote sensor device 180 to communicate in an upstream direction from the slave wireless communication interface 183 over the time slotted communication channel 1850 (wireless communication link 127-3) to the master wireless communication interface 154; and so on.

Accordingly, each of the slave wireless communication interfaces and corresponding communication devices is able to communicate upstream with the manager resource 150 via communications transmitted in a respective assigned timeslot.

The manager resource 150 keeps track of which timeslots are assigned to the different downstream devices. Accordingly, based upon a time or timeslot of receiving the message, the manager resource 150 knows which of the multiple downstream devices transmits the message.

Further in this example embodiment, as previously discussed, the master wireless communication interface 154 of the manager resource 150 is assigned use of timeslot 1802 in order to transmit (broadcast) beacon information 1855 to the downstream recipient devices including remote communication device 160, repeater 170, remote sensor device 180, etc. The beacon information 1855 can include any suitable information.

For example, in one embodiment, as previously discussed, the time slotted communication channel 1850 can be a frequency-hopped channel. The master wireless communication interface 154 controls frequency hopping of the time slotted communication channel 1850 from one channel to the next by transmitting frequency hop information in the beacon information 1855.

The frequency hop information enables a recipient to identify a particular frequency over which the time slotted communication channel 1850 is to operate in a subsequent one or more cycles. Accordingly, based on the beacon information 1855, the master wireless communication interface 154 is able to provide notification of which of multiple frequencies the time slotted communication channel 1851 operate on one or more following cycles.

Additionally, note that the beacon information 1855 can include timing information (or synchronization information) to synchronize a respective recipient device to the time slotted communication channel 1850. Synchronization of each of the communication devices such as remote communication device 160, repeater 170, remote sensor device 180, etc., ensures that such devices are able to communicate in their assigned timeslot without interfering with other devices' timeslots. Additionally, the synchronization of downstream devices and the manager resource 150 (to the time slotted communication channel 1850) also enables the downstream communication devices such as remote communication device 160, repeater 170, remote sensor device 180, etc., to receive communications from the master wireless communication interface 154 in the time slots 1801 and 1802.

FIG. 19 is an example diagram illustrating attributes of a second time slotted communication channel according to embodiments herein.

In this example, time-slotted communication channel 1950 is used in a similar manner as time-slotted communication channel 1850. However, the time-slotted communication channel 1950 is used to support communications (over wireless communication link 129) between the repeater 170 and the remote communication device 190.

Thus, in one embodiment, wireless communication link 129-2 represents a second time-slotted communication channel 1950 in which one or more timeslots (such as time slots 1901 and 1902) of the time-slotted communication channel 1950 are assigned for use by the repeater 170 to communicate with the remote communication device 190 through the master wireless communication interface 174.

The time slotted communication channel 1950 also includes assignment of one or more timeslots (time slot TS1) supporting communications from the remote communication device 190 in an upstream direction to the master wireless communication interface 174 of the repeater 170.

FIG. 20 is an example diagram illustrating multiple cycles of a time slotted communication channel according to embodiments As shown, and as previously discussed, the master wireless communication interface 154 broadcasts beacon information 1855-1 in cycle C1 of the time slotted communication channel 1850; the master wireless communication interface 154 broadcasts beacon information 1855-2 in cycle C11 of the time slotted communication channel 1850; and so on. Between cycles C2 and cycle C10, there are no other communications transmitted by master wireless communication interface 154 to the downstream devices (remote communication device 160, repeater 170, remote sensor device 180, etc.).

As previously discussed, any of the multiple downstream communication devices is able to communicate in an upstream direction over the time slotted communication channel 1850 in an upstream direction to the master wireless communication interface 154 in its respective assigned timeslot.

As shown in the timing diagram 2000 in FIG. 20, none of the downstream communication devices transmits in a respective time slot between cycles C1 and C6 as well as between cycles C8 and C16. However, remote communication device 160 does communicate upstream in time slot TS1 of cycle C7.

Assume in this example, that the remote communication device 160 detects a trigger event such as motion of an object in region 195-1 during cycle C6 at around time Tdet. In response to detecting the trigger event at the remote communication device 160, the remote communication device 160 transmits a respective notification in its next available assigned timeslot TS1 to communicate the event to the manager resource 150. In this example, the next available assigned time slot in which the remote communication device is able to communicate upstream from the slave wireless communication interface 163 to the master wireless communication interface 154 is TS1 in cycle C7. In this instance, the remote communication device 160 operates the slave wireless communication interface 163 to communicate over the wireless communication link 129-2 (time slotted communication channel 1950) in time slot TS1 upstream to the master wireless communication interface 154 to notify the manager resource 150 of the occurrence of the trigger event.

In one embodiment, the slave wireless communication interface 163 modulates a respective current carrier frequency of the time slotted communication channel 1850 in order to communicate from the remote communication device 160 to the manager resource 150 in time slot TS1.

As previously discussed, providing notification of the trigger event via upstream communications from the remote communication device 160 to the manager resource over wireless communication link 127-1 (time-slotted communication channel 1850), causes the manager resource 150 to power up the respective wireless access point 151 to receive subsequent communications (such as a data payload) from the wireless interface 162 over a respective newly established wireless communication link 128-1 from the remote communication device 190.

FIG. 21 is an example diagram illustrating use of a persistent wireless communication channel to communicate messages from a remote communication device to a manager resource according to embodiments herein.

As shown, the security network 100 can include a respective manager resource 150, repeater 170, and remote communication device 190 as previously discussed.

In this example embodiment, the wireless communication link 127-2 (time slotted communication channel 1850) is a persistently available communication link established by a manager resource 150 to support: i) first communications initiated by the manager resource 150 downstream over wireless communication link 127-2 to the repeater 170, and ii) second communications initiated by the repeater 170 upstream over the wireless communication link 127-2 to the manager resource 150.

Further in this example embodiment, the wireless communication link 129-2 (time slotted communication channel 1950) is a persistently available communication link established by repeater 170 to support: i) communications initiated by the repeater 170 downstream over wireless communication link 129-2 to the remote communication device 190, and ii) communications initiated by the remote communication device 190 upstream to the repeater 170.

Via a chain of wireless communication links including wireless communication link 127-2 (time-slotted communication channel 1850) and the wireless communication link 129-2 (time-slotted communication channel 1950), the manager resource 150 is able to quickly communicate messages (such as a low bandwidth messages) downstream through the repeater 170 to the remote communication device 190.

In the upstream direction, the chain of wireless communication links (wireless communication link 131-1 and wireless communication link 128-2) supports communications (such as high bandwidth messages) from the remote communication device 190 through the repeater 170 to the manager resource 150. If desired, in a reverse direction, the manager resource 150 communicates a respective data payload from the manager resource 150 over wireless access point 151 and wireless communication link 128-2 to the repeater 170; the repeater 170 communicates the received data payload over the wireless access point 171 and wireless communication link 131-1 to the remote communication device 190.

As previously discussed, the security network 100 further includes wireless communication link 128-2 and wireless communication link 131-1. In one embodiment, in a manner as previously discussed, the manager resource 150 selectively powers the wireless access point 151 to receive a data payload from the repeater 170 over the wireless communication link 128-2. In a similar manner as previously discussed, the repeater 170 selectively powers the wireless access point 171 to receive a data payload from the remote communication device 190 over the wireless communication link 131-1.

Figure 22:
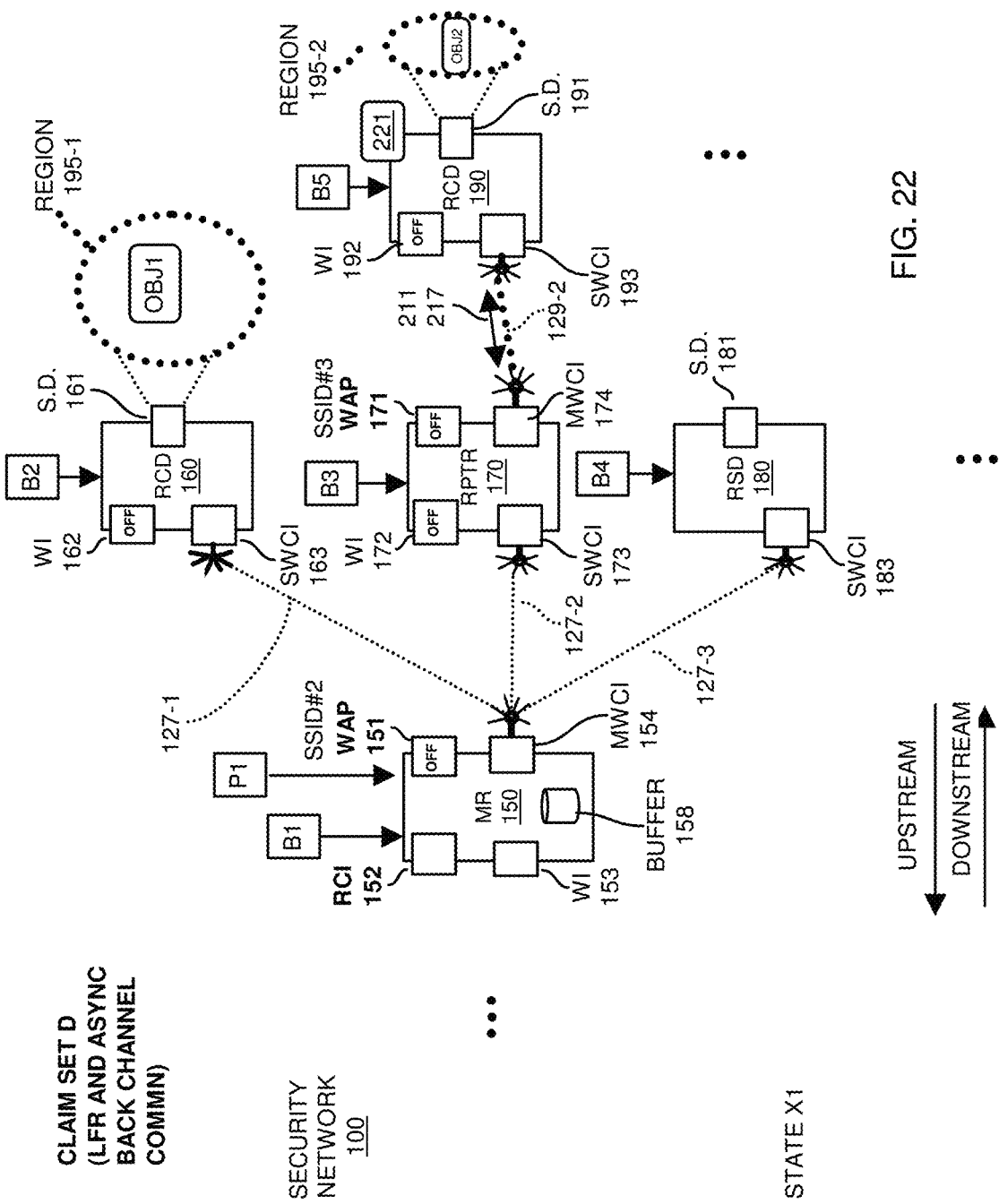
FIGS. 22-24 are example diagrams illustrating selective activation of wireless access points to support upstream and downstream communications in a chain of communication devices according to embodiments herein.

FIG. 22 is a detailed example diagram illustrating use of a first persistent time slotted wireless communication channel to communicate messages from a remote communication device to an upstream device (such as a repeater) according to embodiments herein.

In this example embodiment, assume that the remote communication device 190 detects a trigger event such as motion of an object OBJ2 in region 195-2.

In response to detecting the trigger event, the remote communication device 190 operates the slave wireless communication interface 193 to communicate notification 211 over the wireless communication link 129-2 (time slotted communication channel 1950) in its respective assigned timeslot TS1 to communicate with the master wireless communication interface 174 of the repeater 170.

In this example, the communication transmitted in the respective time slot assigned to the remote communication device 190 notifies the repeater 170 (such as via transmission of notification 211 in its assigned time slot) that the remote communication device 190 detected the trigger event and has (or will have) a data payload 221 to transmit to the repeater 170.

In one embodiment, in furtherance of providing an upstream communication path from the remote communication device 190 to the repeater 170, the master wireless communication interface 174 can be configured to communicate message 217 in a respective time slot assigned to the repeater 170 over the wireless communication link 129-2. The message 217 indicates an identity of the wireless access point 171 and corresponding socket of the repeater 170 that should be used to communicate a subsequent data payload to the manager resource 151. Accordingly, the message 217 apprises the remote communication device 160 of an identity (such as an SSID #3 assigned to the wireless access point 171, network address assigned to the repeater 170, etc.) of the wireless access point 171 to be used to forward a data payload as opposed to the remote communication device 190 otherwise receiving a beacon from the wireless access point 171 indicating its identity and availability after it is powered up.

As shown, and as previously discussed, the wireless access point 171 and wireless interface 192 are controlled to OFF states (to reduce energy consumption from battery B5 and B3) prior to a time of detecting the trigger event.

Figure 23:
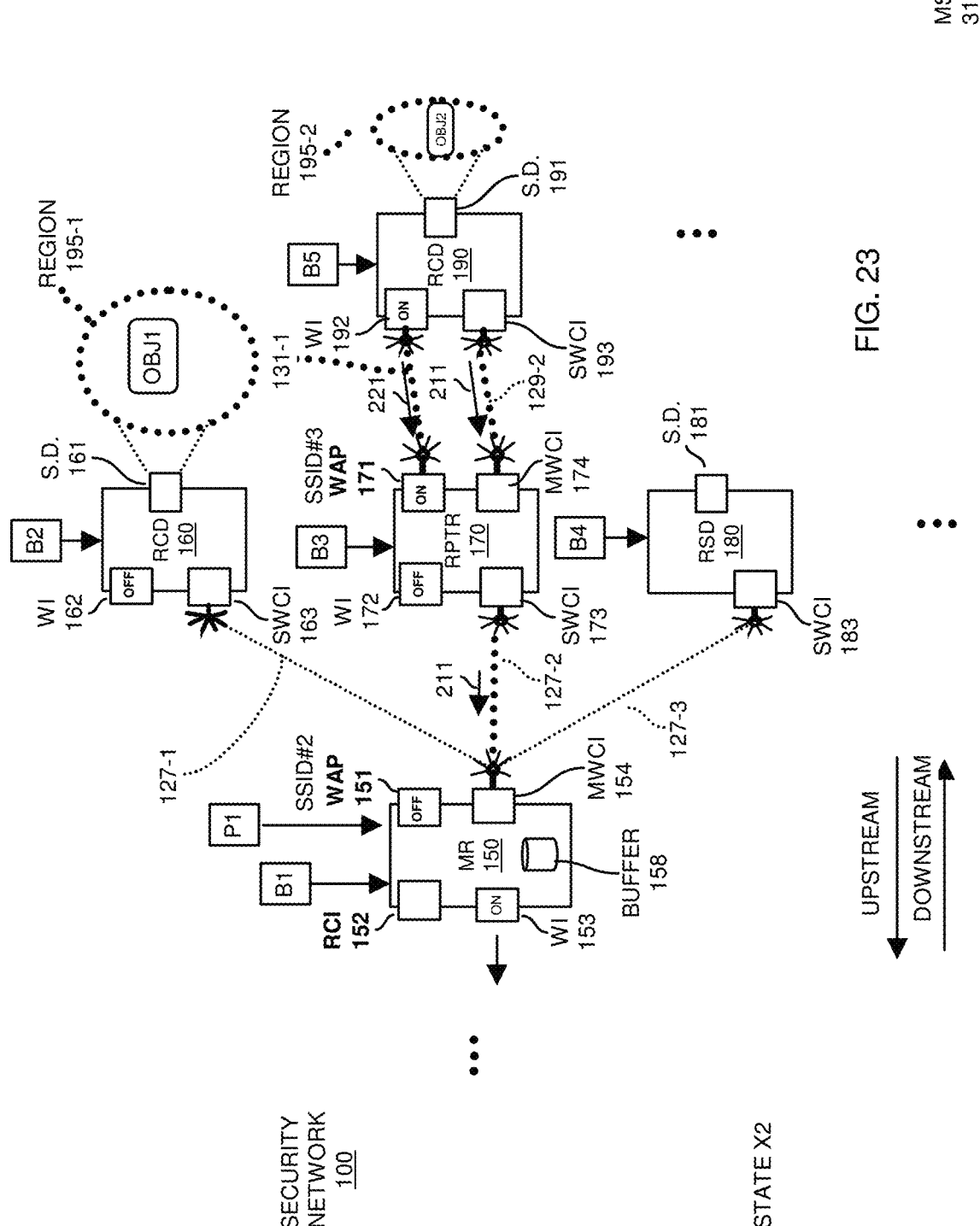

FIG. 23 is a detailed example diagram illustrating use of a second persistent time slotted wireless communication channel to communicate messages from a repeater communication device to an upstream device such as a manager resource according to embodiments herein.

The master wireless communication interface 174 monitors the time slotted communication channel 1950 (wireless communication link 129-2) to receive the notification 211 in the time slot assigned to the remote communication device 190. In response to receiving the notification 211 over the master wireless communication interface 174 in the time slot TS1 assigned to the remote communication device 190, the repeater 170 is informed of the detected trigger event.

As further shown, in response to receiving notification of the trigger event via message 211, the repeater 170 powers up the wireless access point 171 to an ON state to receive data payload 221 from the wireless interface 192 of remote communication device 190. Additionally, the repeater 170 forwards the notification 211 of the detected trigger event over its respective assigned time slot (TS2) to master wireless communication interface 154 of the manager resource 150.

As previously discussed, the manager resource 150 operates the master wireless communication interface 154 to monitor the communications from the downstream communication devices including repeater 170. The manager resource 150 therefore receives notification 211 from the repeater 170.

Figure 24:
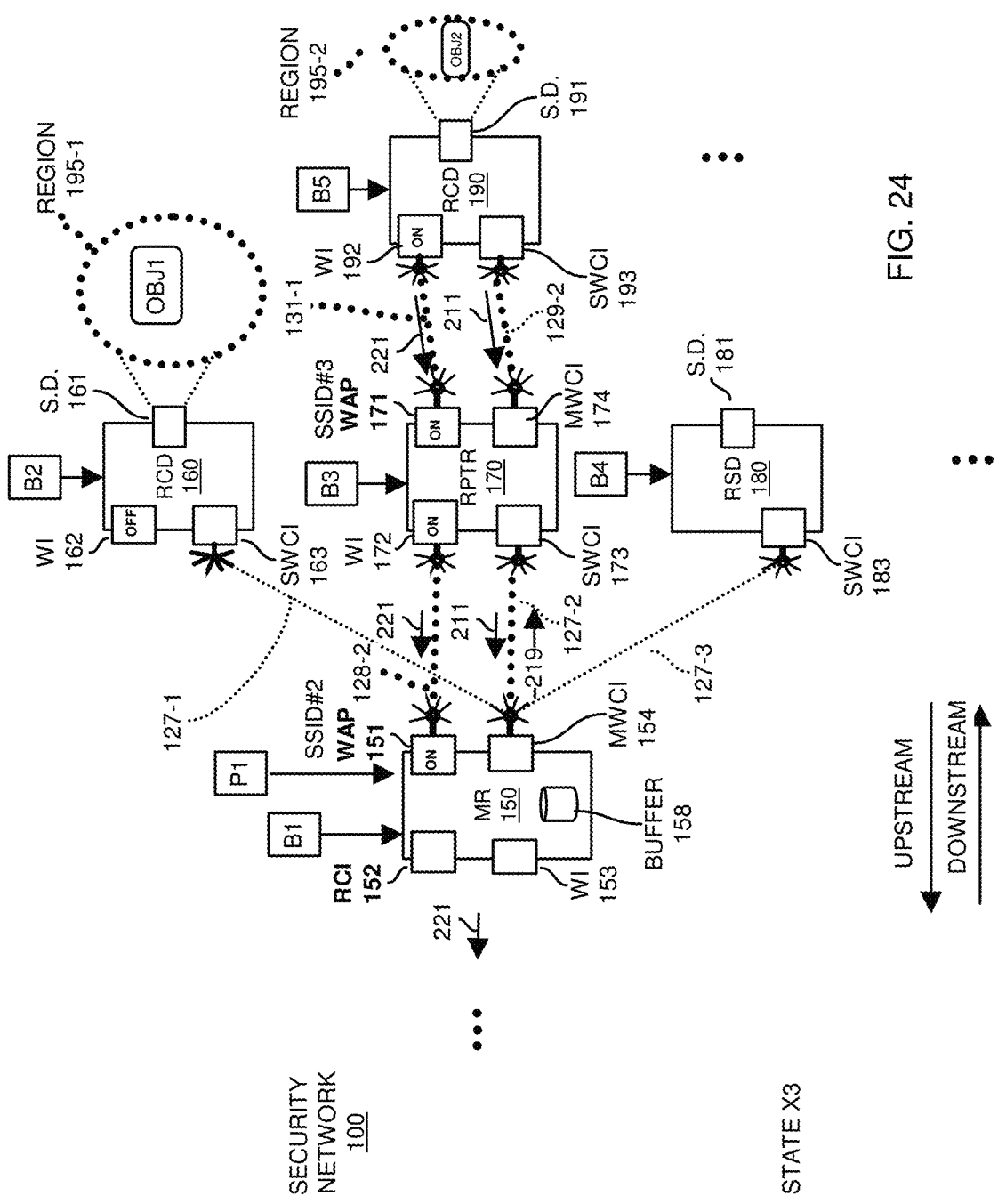

FIG. 24 is a detailed example diagram illustrating use of a newly activated chain of wireless access points to communicate a data payload from a remote communication device through one or more repeater communication devices to a manager resource according to embodiments herein.

In response to receiving notification 211 over the time slotted communication channel 1850 (wireless communication link 127-2), the manager resource 150 transitions the wireless access point 151 to a power ON state in order to receive the data payload 221 from the repeater 170.

In response to receiving the notification 211, in accordance with further embodiments, the master wireless communication interface 154 can be configured to communicate message 219 in a respective time slot assigned to the manager resource 150 over the wireless communication link 127-2. The message 219 indicates an identity of the wireless access point 151 and socket of the manager resource 150 that should be used to communicate a subsequent data payload to the manager resource 150. Accordingly, the message 219 apprises the remote communication device 160 of an identity of the wireless access point 151 to be used to forward a data payload as opposed to the repeater 170 otherwise receiving a beacon from the wireless access point 151 indicating its availability after it is powered up.

As previously discussed, the wireless access point 151 may support WiFi™ communications. In such an instance, the wireless interface 172 of repeater 170 communicates with the newly powered wireless access point 151 to establish a respective wireless communication link 128-2 on which to transmit the data payload 221 to the manager resource 150.

As previously discussed, subsequent to receiving the data payload 221 over wireless communication link 128-2, the manager resource 150 then communicates over one of: i) the radio communication interfaces 152 or ii) wireless interface 153 to communicate the data payload 221 (such as security data, video of region 195-2, etc.) to the remote server 178 and or the communication device 120 operated by the user 108.

Accordingly, embodiments herein include using multiple persistent time slotted communication channels 1850, 1950, etc., to activate a chain of wireless access points 171 and 151. The chain of wireless access points conveys a respective data payload 221 in an upstream direction to a target recipient.

In accordance with further embodiments, note that the communication device 120 and/or remote server 178 can communicate a respective signal to the manager resource 150 indicating to terminate an operation of capturing of image data by the remote sensor device 191 at the remote communication device 190. In such an instance, the manager resource 150 communicates over the wireless communication link 128-2 or the wireless communication link 127-2 to notify the repeater 170 of the termination command.

Additionally, in response to receiving notice of the termination command, the manager resource 150 discontinues powering the wireless access point 151. The repeater 170 communicates the termination command downstream to the remote communication device over the wireless communication link 131-1 and/or wireless communication link 129-2. Thereafter, the repeater 170 discontinues powering the wireless access point 171 in response to receiving the termination command.

Accordingly, embodiments herein can include activating and deactivating a chain of wireless access points.

FIG. 25 is an example diagram of a method of communicating messages over a low bandwidth wireless communication channel according to embodiments herein.

In processing operation 2510 of flowchart 2500, an entity such as the remote communication device 190 receives first wireless communications (such as first beacon information, second beacon information, etc., including link maintenance information) from the repeater 170 (such as communication management hardware) over a wireless communication link 129-2 (time-slotted communication channel 1950).

In processing operation 2520, the remote communication device 190 utilizes the first wireless communications (such as first beacon information in cycle C1, second beacon information in cycle C10, etc., of time-slotted communication channel 1950) to synchronize the remote communication device 190 to communicate over the wireless communication link 129-2 to the repeater 170.

In processing operation 2530, the remote communication device 190 communicates second wireless communications (such as notification 211) over the wireless communication link 129-2 to the repeater 170 in response to detecting a trigger event such as motion of object OBJ2 in the monitored region 195-2.

Figure 26:
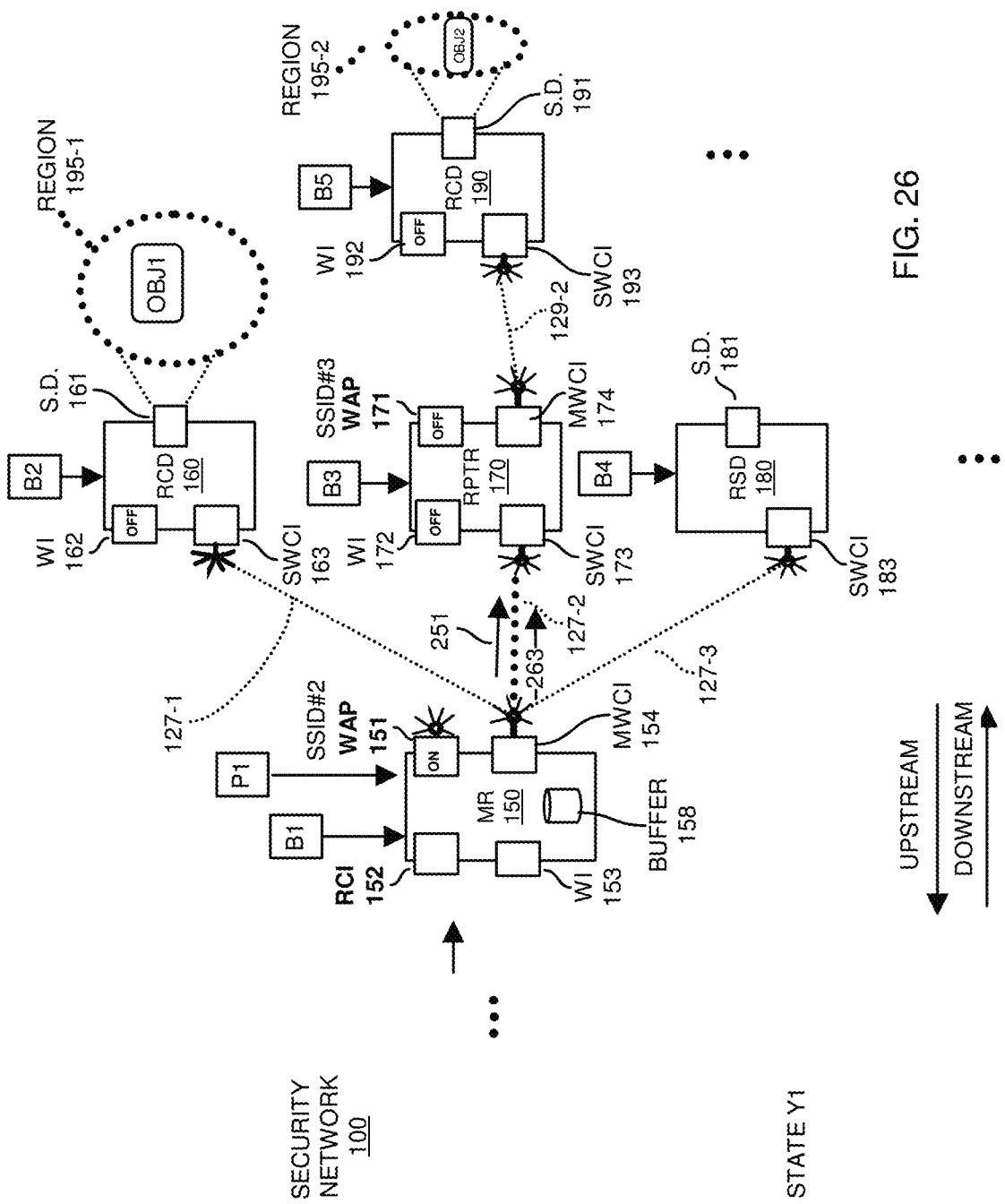
FIGS. 26-28 are example diagrams illustrating selective activation of wireless access points to support upstream and downstream communications in a chain of communication devices according to embodiments herein.

FIG. 26 is a detailed example diagram illustrating use of a first persistent time slotted wireless communication channel to communicate messages from a manager resource to a downstream device such as a repeater according to embodiments herein.

Assume in this example that manager resource 150 receives notification from a source such as the communication device 120 and/or remote server 178 to activate the remote communication device 190 to retrieve video images associated with the region 195-2. In such an instance, in response to receiving the control input, the manager resource 150 communicates a corresponding message 251 in message field 1851-2 of time slot 1801 of time slotted communication channel 1850 over the wireless communication link 127-2 to the slave wireless communication interface 173. The message 251 indicates to activate remote communication device 190 to monitor region 195-2 and generate a respective data payload of images and/or audio.

As previously discussed, the repeater 170 operates the slave wireless communication interface 173 to detect communications (such as message 251) transmitted in the time slot 1801. Accordingly, the slave wireless communication interface 173 receives the message 251 transmitted by the manager resource 150.

In addition to transmitting the message 251 downstream to the repeater 170 over the wireless communication link 127-2, the manager resource 150 powers the wireless access point 151 to an ON state in anticipation of subsequently receiving a data payload from the repeater 170.

In accordance with further embodiments, the master wireless communication interface 154 can be configured to communicate message 263 in one or more respective time slots assigned to the manager resource 150 over (one or more cycles of the time-slotted communication channel 1850 associated with) the wireless communication link 127-2. The message 263 can include any suitable information such as an identity of the wireless access point 151 and respective socket of the manager resource 150 that should be used to communicate a subsequent data payload to the manager resource 150. Additional information in message 263 conveyed over a respective wireless communication link 127-2 from a master wireless communication interface 154 to establish a wireless communication link in the reverse direction from the repeater 170 to the manager resource 150 can include an IP (Internet Protocol) network address assigned to the manager resource 150, channel or carrier frequency on which the recipient device such as repeater 170 is to communicate with the newly established wireless access point 151 of the manager resource 150, MAC address (Media Access Control address) assigned to the wireless access point 151, etc.

Accordingly, the message 263 apprises the remote communication device 160 of an identity (such as an SSID #2 assigned to the wireless access point 151, network address assigned to the manager resource 150, etc.) of the wireless access point 151 to be used to forward a data payload as opposed to the repeater 170 otherwise receiving a beacon from the wireless access point 151 indicating its identity and availability after it is powered up.

As further discussed below, the repeater 170 uses the information in message 263 to establish the wireless communication link 128-2 in following FIG. 27. For example, the repeater 170 communicates a link request message (over a carrier frequency or channel identified in message 263) from the wireless interface 172 to the MAC address received in message 263 (the wireless access point 151). Using information in message 263 enables the repeater 170 to more quickly establish a respective wireless communication link 131-1 with the repeater 170 as compared to the repeater 170 discovering the wireless access point 151 in a conventional manner such as via a presence beacon or discovery response transmitted by the wireless access point 151.

Figure 27:
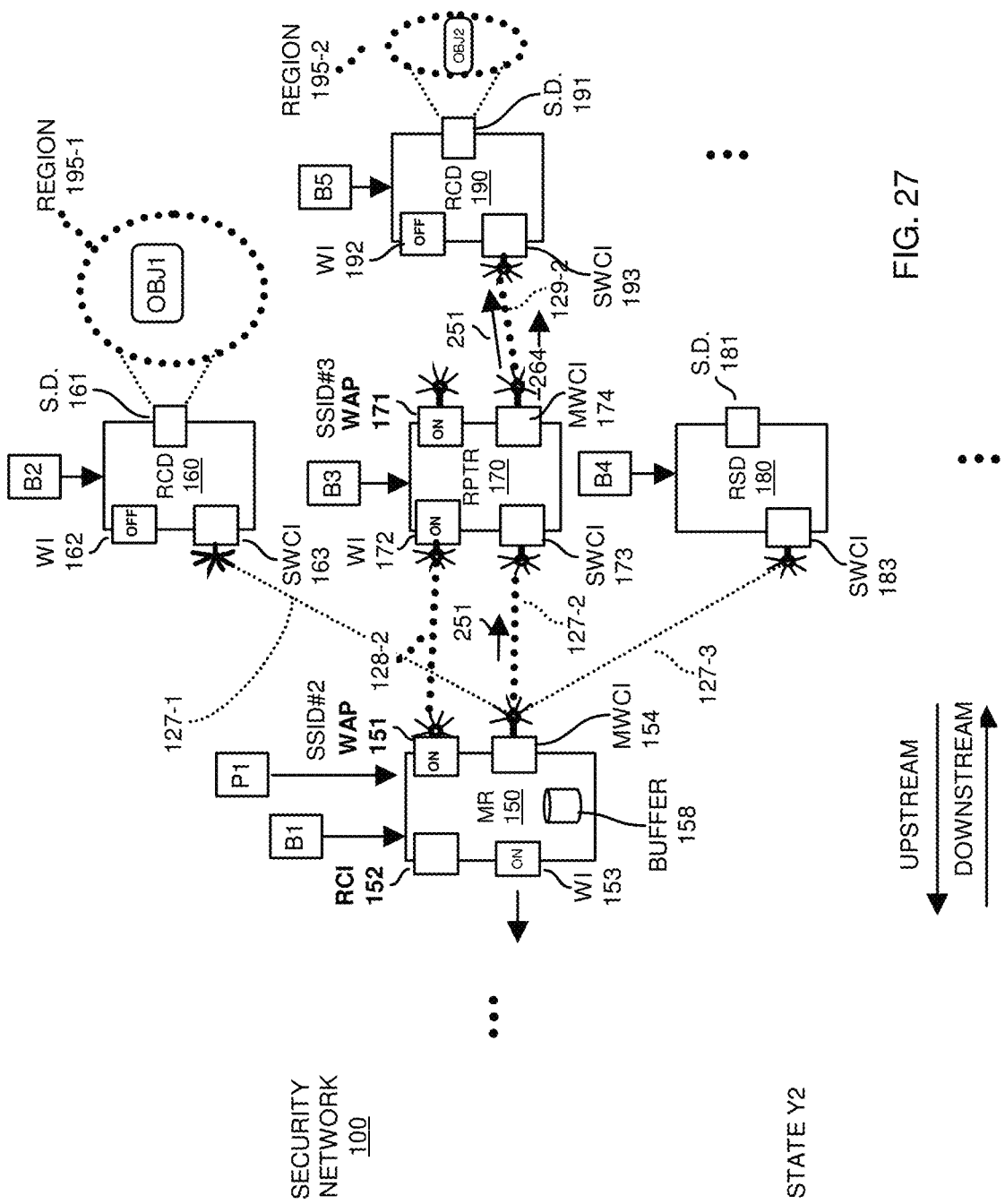

FIG. 27 is a detailed example diagram illustrating use of a second persistent time slotted wireless communication channel to communicate messages from a repeater communication device to a downstream device such as a remote communication device according to embodiments herein.

In response to receiving the notification 251 over the wireless communication link 127-2 (time slotted communication channel 1850), the repeater 170 communicates the message 251 (such as a command to activate remote communication device 190) downstream from the master wireless communication interface 174 of repeater 170 over the wireless communication link 129-2 (time slotted communication channel 1950) to the slave wireless communication interface 193. Similar to operations as previously discussed, the repeater 170 operates the master wireless communication interface 174 to transmit the message 251 in a respective time slot TS1 of time-slotted communication channel 1950 assigned to the remote communication device 190.

Accordingly, via the received message 251 over the wireless communication link 129-2 (time slotted communication channel 1950), the remote communication device 190 is notified to activate the sensor device 191 to monitor region 195-2.

In addition to forwarding the message 251 to the remote communication device 190, the repeater 170 operates the wireless interface 172 to establish a respective wireless communication link 128-2 with the wireless access point 151 in anticipation of subsequently forwarding a respective data payload from the repeater 170 over the wireless communication link 128-2 to the manager resource 150.

In accordance with further embodiments, via message 264, the master wireless communication interface 174 conveys additional information over respective wireless communication link 129-2 in one or more assigned time slots to establish a wireless communication link 131-1 in a reverse direction from the remote communication device 190 to the repeater 170. The message 264 can include an IP (Internet Protocol) network address assigned to the repeater 170, channel or carrier frequency on which the recipient device such as remote communication device 190 is to communicate with the newly established wireless access point 171 of the repeater 170, MAC address (Media Accewss Control address) assigned to the wireless access point 171, etc.

As further discussed below, the remote communication device 190 uses the information in message 264 to establish the wireless communication link 131-1 in following FIG. 28. For example, the remote communication device 190 communicates a link request message (over a carrier frequency or channel identified in message 264) from the wireless interface 192 to the MAC address received in message 264 (such as to wireless access point 171). Using information in message 264 enables the remote communication device 190 to more quickly establish a respective wireless communication link 131-1 with the repeater 170 as compared to the remote communication device 190 otherwise discovering the wireless access point 171 in a conventional manner such as via a presence beacon or discovery response transmitted by the wireless access point 171.

Figure 28:
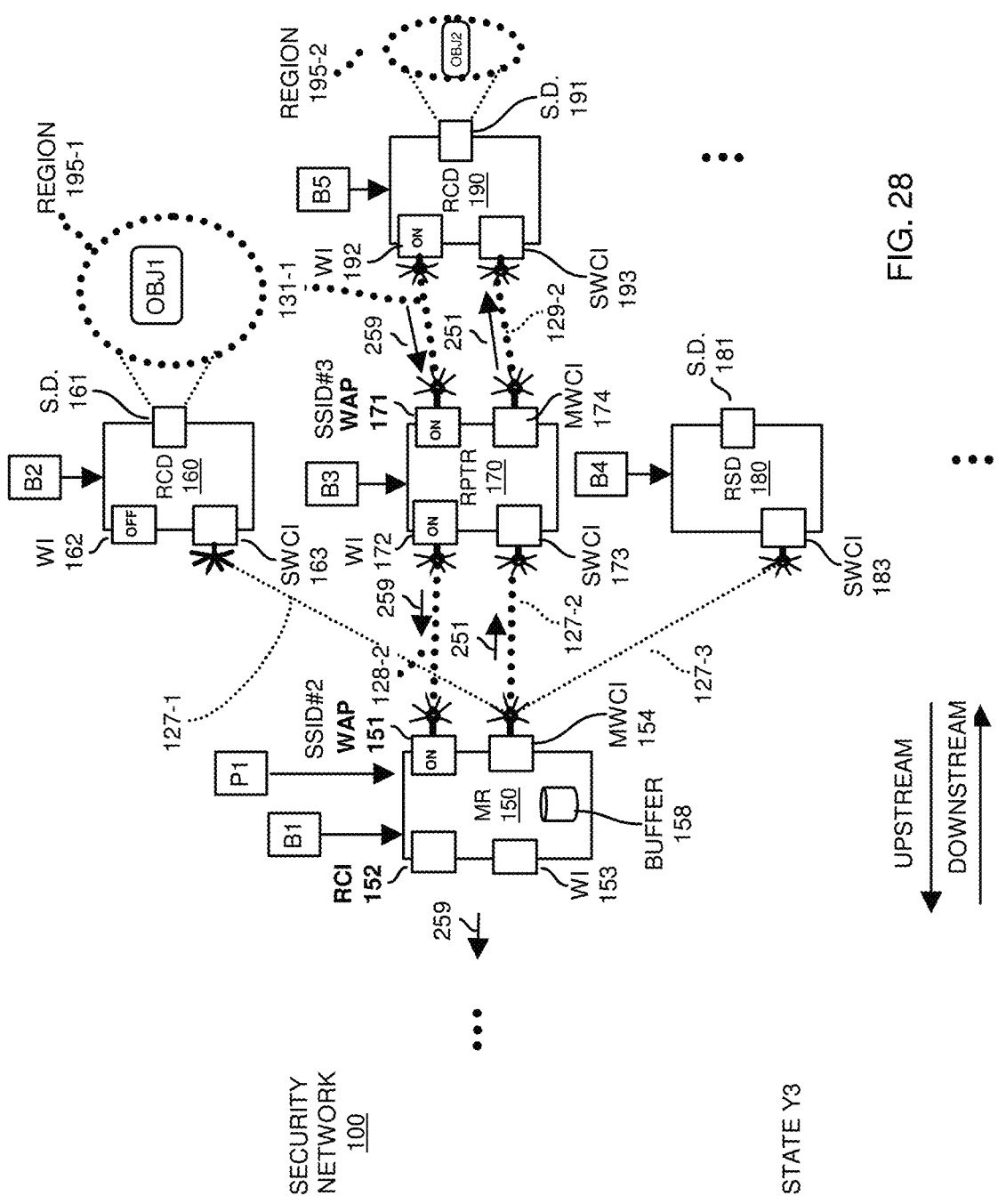

FIG. 28 is a detailed example diagram illustrating use of a newly activated chain wireless access points to communicate a data payload from a remote communication device through one or more repeater communication devices to a manager resource according to embodiments herein.

In response to receiving the message 251 at the remote communication device 190, the remote communication device 190 activates the sensor device 191 and captures images and/or audio of region 195-2 including object OBJ2. The remote communication device 190 produces data payload 259 (security data such as audio or video of the monitored region 195-2).

Further in response to receiving the message 251, the remote communication device 190 establishes a respective wireless communication link 131-1 between the wireless interface 192 and the wireless access point 171. As previously discussed, establishing the wireless communication link 131-1 can include the wireless interface 192 negotiating with the wireless access point 171 to establish the wireless communication link 131-1.

The wireless interface 192 negotiates with the wireless access point 171 for bandwidth over wireless communication link 131-1. Subsequent to being allocated appropriate bandwidth over the wireless communication link 131-1 as allocated by the wireless access point 171, the wireless interface 192 of the remote communication device 190 communicates the data payload 259 over the wireless communication link 131-1 to the wireless access point 171 of repeater 170. Repeater 170 buffers the data payload 259 as needed.

As previously discussed, the repeater 170 operates the wireless interface 172 to establish the respective wireless communication link 128-2 with the wireless access point 151. In response to receiving the data payload 259 from the remote communication device 190, the repeater 170 transmits the data payload 259 through the wireless interface 172 over the wireless communication link 128-2 to the wireless access point 151 of manager resource 150.

Accordingly, the manager resource 150 receives the data payload 259 through the chain of newly powered wireless access points including wireless access point 171 and wireless access point 151.

The manager resource 150 communicates the data payload 259 over primary communication path 125-1 or bypass communication path 125-2 to the remote server 178 and/or communication device 120.

In accordance with further embodiments, the communication device 120 and/or remote server 178 can communicate a respective signal to the manager resource 150 indicating to terminate the capturing of data by the remote communication device 190. In such an instance, the manager resource 150 communicates over the wireless communication link 128-2 or the wireless communication link 127-2 to notify the repeater 170 of the termination command. In response to receiving notice of the termination command, the manager resource 150 (immediately or at a specified time) discontinues powering the wireless access point 151. The repeater 170 communicates the termination command downstream to the remote communication device over the wireless communication link 131-1 and/or wireless communication link 129-2. The repeater 170 (immediately or at a specified time) discontinues powering the wireless access point 171 in response to receiving the termination command.

Figure 29:
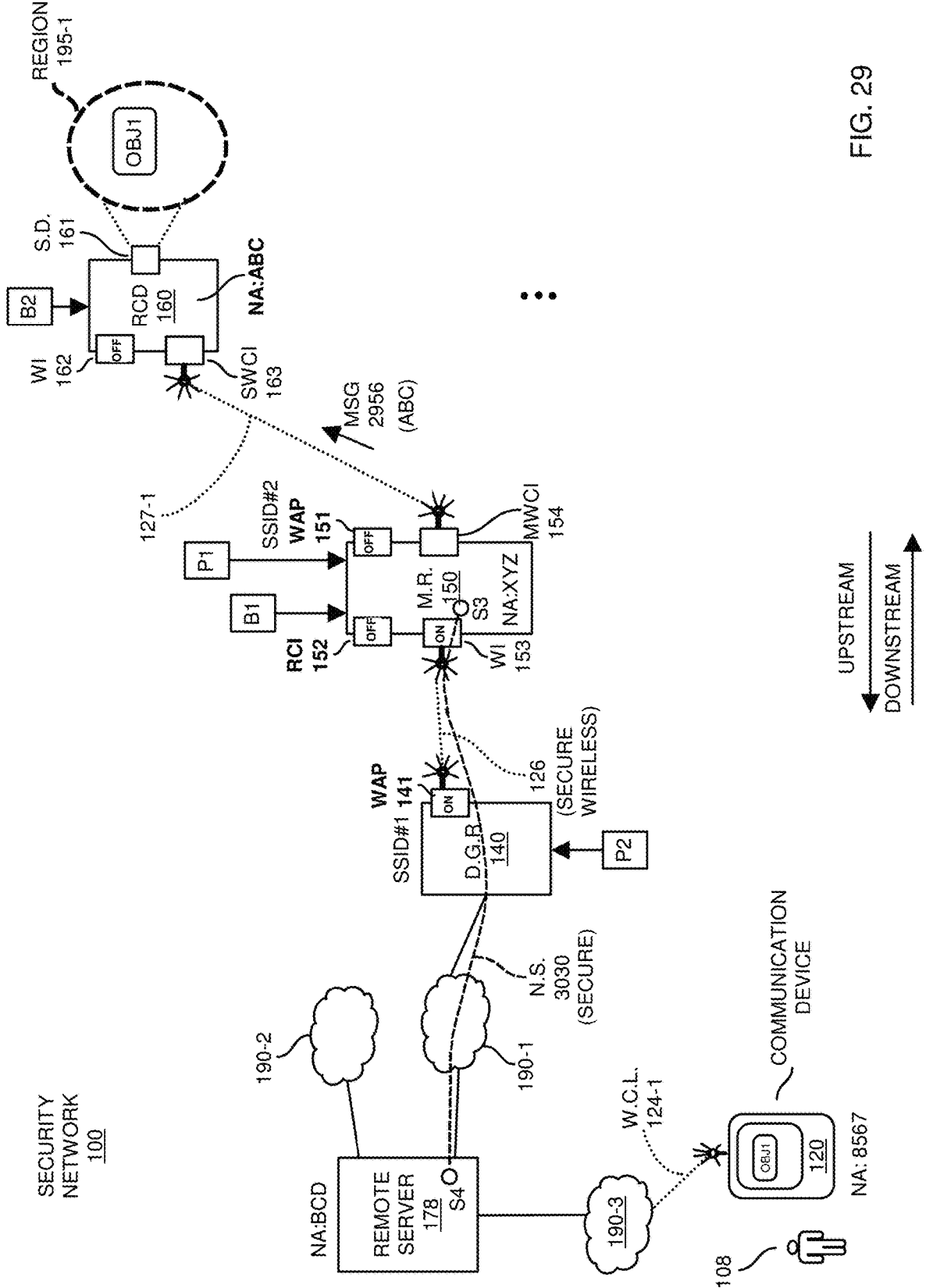
FIGS. 29-32 are example diagrams illustrating a method of quickly establishing a connection to convey communications to a target recipient according to embodiments herein.

FIG. 29 is an example diagram illustrating operation of a security network to provide a quick connection and conveyance of data according to embodiments herein.

As shown, in one embodiment, the manager resource 150 establishes a respective wireless communication link through the wireless interface 153 to the wireless access point 141 of the domain gateway resource 140. In one embodiment, the wireless access point supports security at the radio frequency level (physical layer and/or link layer) in which communications over the wireless communication link 126 are encrypted. This prevents eavesdropping by unauthorized parties.

Subsequent to establishing the secured wireless communication link 126, the manager resource 150 establishes a respective network session (such as a session layer) between the manager resource 150 through the domain gateway resource 140 over network 190-1 to the remote server 178. In one embodiment, the network session 3030 is a secured network session established in accordance with the HTTPS (HyperText Transfer Protocol Secure), RTSP, TLS, or other suitable protocol.

Further in this example embodiment, sockets S3 and S4 define endpoints of network session 3030. The manager resource 150 creates socket S3; the remote server 178 creates socket S4. Accordingly, the network session spans between network address XYZ (manager resource 150) to the network address BCD (remote server 178).

In accordance with further embodiments, the network session 3030 is persistent. In such an instance, the manager resource 150 and/or the remote server 178 communicate heartbeat communications over the network session 3030 in order to keep the network session 3030 open to communicate subsequent data payloads in either direction on an as needed basis.

More specifically, keeping the network session 3030 in an OPEN or ON state reduces delays of communicating a respective data upstream from the socket S3 in manager resource 150 through the domain gateway resource 140 and network 190-1 to the socket S4 of remote server 178. Similarly, because the network session 3030 is persistent, the remote server 178 is able to communicate messages with little or no delay over the network session 3030 to the manager resource 150.

Note that because the domain gateway resource 140 is powered by grid power P2, and that the manager resource 150 is powered by grid power P1, it is possible to continuously power both the domain gateway resource 140 and the manager resource 150 (assuming that grid power is available).

As previously discussed, the remote communication device 160 is powered from battery power B2. Embodiments herein include reducing a respective amount of energy consumed by the remote communication device 160, while enabling the remote communication device 160 to receive and transmit communications as needed.

To support communications between the manager resource 150 and the remote communication device 160, the manager resource 150 communicates with the domain gateway resource 140 or other suitable resource to obtain a respective network address assigned to the remote communication device 160. Assume in this example, that the domain gateway resource 140 assigns the network address ABC (such as a DHCP leased address) to the remote communication device 160.

The manager resource 150 communicates the message 2956 (including the network address ABC) from the master wireless communication interface 154 over the wireless communication link 127-1 (such as a persistent wireless communication link or time slotted communication channel) to the slave wireless communication interface 163 of remote communication device 160.

In one embodiment, the message 2956 includes network address ABC (such as a Dynamic Host Control Protocol leased address) assigned to the remote communication device 160. During operation, the remote communication device 160 uses the network address ABC as its source address.

Note that the network address ABC can be available for use by the remote communication device 160 for any suitable amount of time.

This operation of assigning the network address ABC for an appropriate amount of time to the remote communication device 160 prevents delays from otherwise occurring if the remote communication device 160 had to obtain a respective network address at a time when the remote communication device 160 has a data payload for transmission to a remote target.

Figure 30:
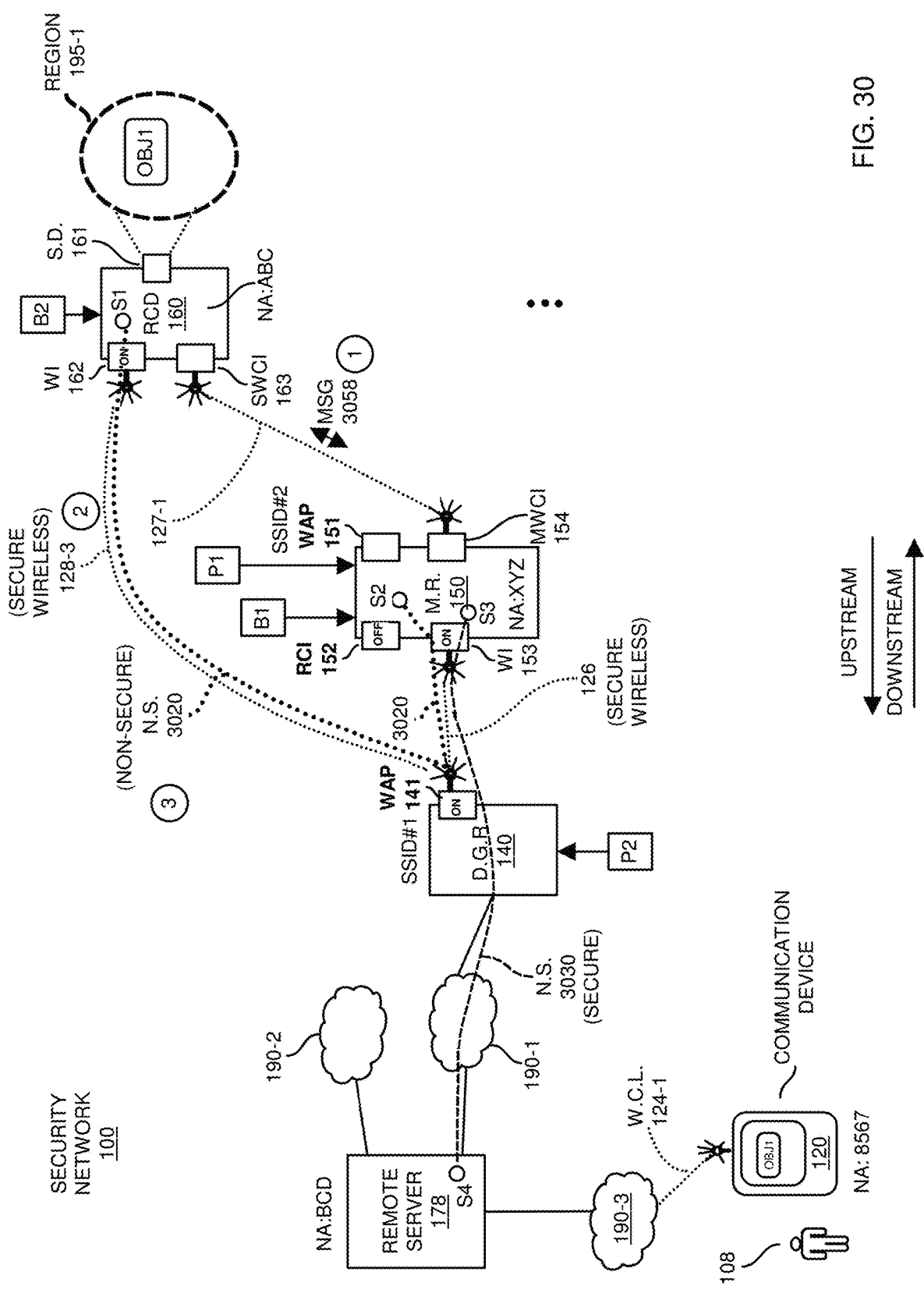

FIG. 30 is an example diagram illustrating operations of establishing a wireless communication link to convey communications according to embodiments herein.

As shown, and as previously discussed, the manager resource 150 and the remote communication device 160 are able to communicate with each other over the wireless communication link 127-1 (persistent, low-power communication link).

For example, if the remote communication device 160 detects a trigger event, the remote communication device 160 communicates occurrence of the trigger event over communication link 127-1 via messages 3058 to the manager resource 150. In the opposite direction, as previously discussed, the manager resource 150 communicates messages 3058 (such as commands) over wireless communication link 127-1 to control (such as activate or power up) remote communication device 160.

In this example, assume that the remote communication device 160 either detects motion in region 195-1 and/or the remote communication device 160 receives a command in which to activate the sensor device 161 to monitor the region 195-1. In such an instance, the manager resource 150 is made aware or is aware that the remote communication device 160 has or will have a data payload for transmission to the manager resource 150.

In one embodiment, the manager resource 150 provides notification over the wireless communication link 126-1 to the remote communication device 160. The notification indicates an identity of a respective wireless access point 141 and socket of the manager resource 150 that is to receive a subsequent data payload.

In furtherance of (quickly) communicating a respective data payload from the remote communication device 160 to the manager resource 150, the remote communication device 160 activates the wireless interface 162 to an ON state to establish a respective secure wireless communication link 128-3 with the wireless access point 141 of the domain gateway resource 140.

Subsequent to establishing the respective secure wireless communication link 128-3, the remote communication device 160 further provides appropriate information through the domain gateway resource 140 to establish a network session 3020 (such as a non secure session layer) between the remote communication device 160 and the manager resource 150. In such an instance, the domain gateway resource 140 establishes a secure wireless communication link 126 between the wireless access point 141 and the wireless interface 153 of manager resource 150.

Accordingly, a combination of the wireless communication link 128-3 and the wireless communication link 126 provide a secured wireless communication path (at the physical layer or data link layer) in which to communicate between the remote communication device 160 through the domain gateway resource 140 and the manager resource 150. Socket S1 and socket S2 define endpoints of the network session 3020 (at the session layer) established between the remote communication device 160 and the manager resource 150.

In one embodiment, the network session 3020 is established in accordance with any suitable non-secure or secure network communication protocol such as HTTP, RTSP (Real Time Streaming Protocol), TCP (Transmission Control Protocol), UDP (User Datagram Protocol), etc. The communication can be TLS-based (Transport Layer Security). Even though the data transmitted over the network session 3020 may not be encrypted because it is a non-secure session layer implementing a non-secure communication protocol, the wireless communication link 128-3 and wireless communication link 126 provide security for respective communications because of encryption (such as via WPA or WiFi™ Protected Access) at the radio layer (WiFi™ layer, physical layer, and/or link layer).

Use of the non-secured network session 3020 (as opposed to establishing a secured session layer) enables the remote communication device 160 to more quickly establish a respective communication connection with the manager resource 150.

Figure 31:
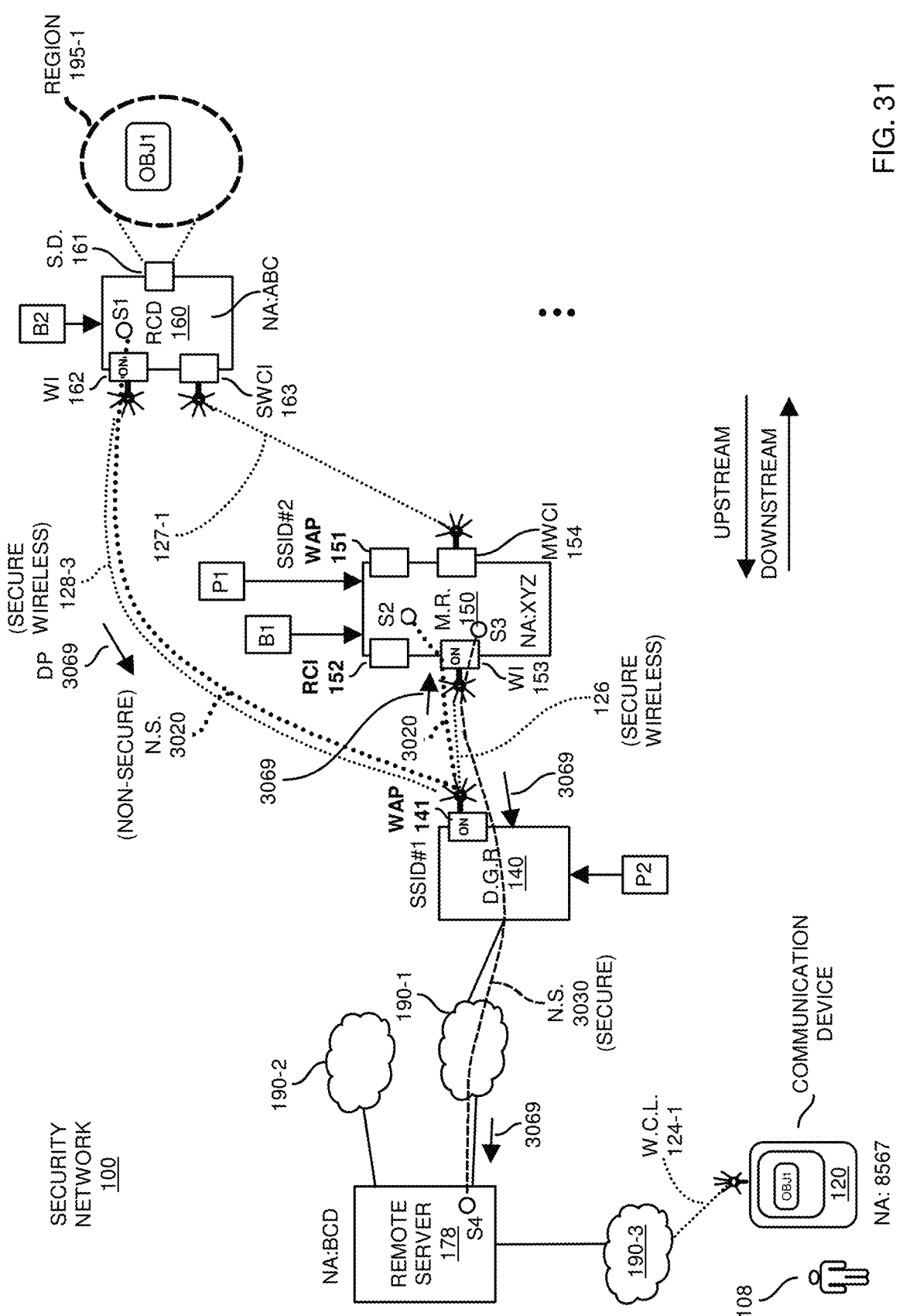

FIG. 31 is an example diagram illustrating transmission of a respective data payload according to embodiments herein.

As previously discussed, the remote communication device 160 operates the sensor device 161 to collect audio and/or video of objects monitored in region 195-1 to produce a respective data payload 3069 including a target network address of XYZ.

Subsequent to establishing the wireless communication links 128-3 and 126 as previously discussed, and establishing the network session 3020, the remote communication device 160 communicates a respective message including the data payload 3069 and destination network address XYZ from the wireless interface 162 over the network session 3020 to the domain gateway resource 140.

The domain gateway resource 140 identifies that the data payload 3069 is destined for delivery to the manager resource 150 based upon inspection of the network address XYZ received with the data payload 3069 from the remote communication device 160. In accordance with the destination network address of XYZ assigned to the data payload 3069, the domain gateway resource 140 forwards the data payload 3069 over wireless communication link 126 to the manager resource 150. The manager resource 150 detects that a message including the data payload 3069 includes the particular network address XYZ, indicating that the manager resource 150 is an intended recipient of the data payload 3069.

Accordingly, the remote communication device 160 communicates the data payload 3069 from the socket S1 over the network session 3020 to the socket S2 at the manager resource 150. In accordance with further embodiments, the manager resource 150 communicates the data payload over persistent network session 3030 from socket S3 (network address XYZ of manager resource 150) to socket S4 (network address BCD) of remote server 178.

In such an instance, the manager resource 150 operates as a proxy for the remote communication device 160. In other words, the remote server 178 is not necessarily aware that the remote communication device 160 is a separate physical device from the manager resource 150 because the communications (such as data payload 3069) received at socket S4 of the remote server 178 are received from the socket S3 of manager resource 150.

Note that the wireless communication link 128-3 and wireless communication link 126 can be configured to support a bandwidth that is substantially greater than a bandwidth in which data must be transmitted from the remote communication device 160 to the manager resource 150. For example, the remote communication device 160 may produce a respective data stream at a rate of 2 MBS (Mega Bits per Second); the wireless communication links 128-3 and 126 may support a bandwidth of 100 MBS. Assume that the remote communication device 160 generates a respective video stream of data (as data payload 3069)

for transmission to the remote server 178 for a duration of 20 seconds. Rather than continuously transmit data over the wireless interface 160 using full bandwidth of 100 MBS to for the full 20 seconds, the remote communication device 160 controls a duty cycle of transmitting the generated data stream (data payload 3069) to reduce power consumption by the remote communication device 160 because it is powered from battery B2.

As an example, the remote communication device 160 may buffer a video of region 195-1 including images capturing object OBJ1 for a duration of 1 second in a first window of time and then activate the wireless interface 162 to an ON state for approximately 20 milliseconds to convey the one second of generated video data in the first window of time to the remote server 178; the remote communication device 160 may buffer a video of region 195-1 including images capturing object OBJ1 for a duration of 1 second in a second window of time and then activate the wireless interface 162 to an ON state for approximately 20 milliseconds to convey the one second of generated video data in the first window of time to the remote server 178; and so on. In such an instance, the remote communication device 160 only needs to activate the wireless interface 162 for a duty cycle of 2% as opposed to being ON using full 100 MBS for 100% of the time.

Accordingly, the manager resource 150 receives a first portion (first 1 second window) of the data payload in a first 20 millisecond communication window of time; the manager resource 150 receives a second portion (second one second window) of the data payload in a second 20 millisecond communication window of time. In one embodiment, the second 20 millisecond communication window of time is delayed by approximately 980 milliseconds, which is greater than each of the 20 millisecond communication windows.

Figure 32:
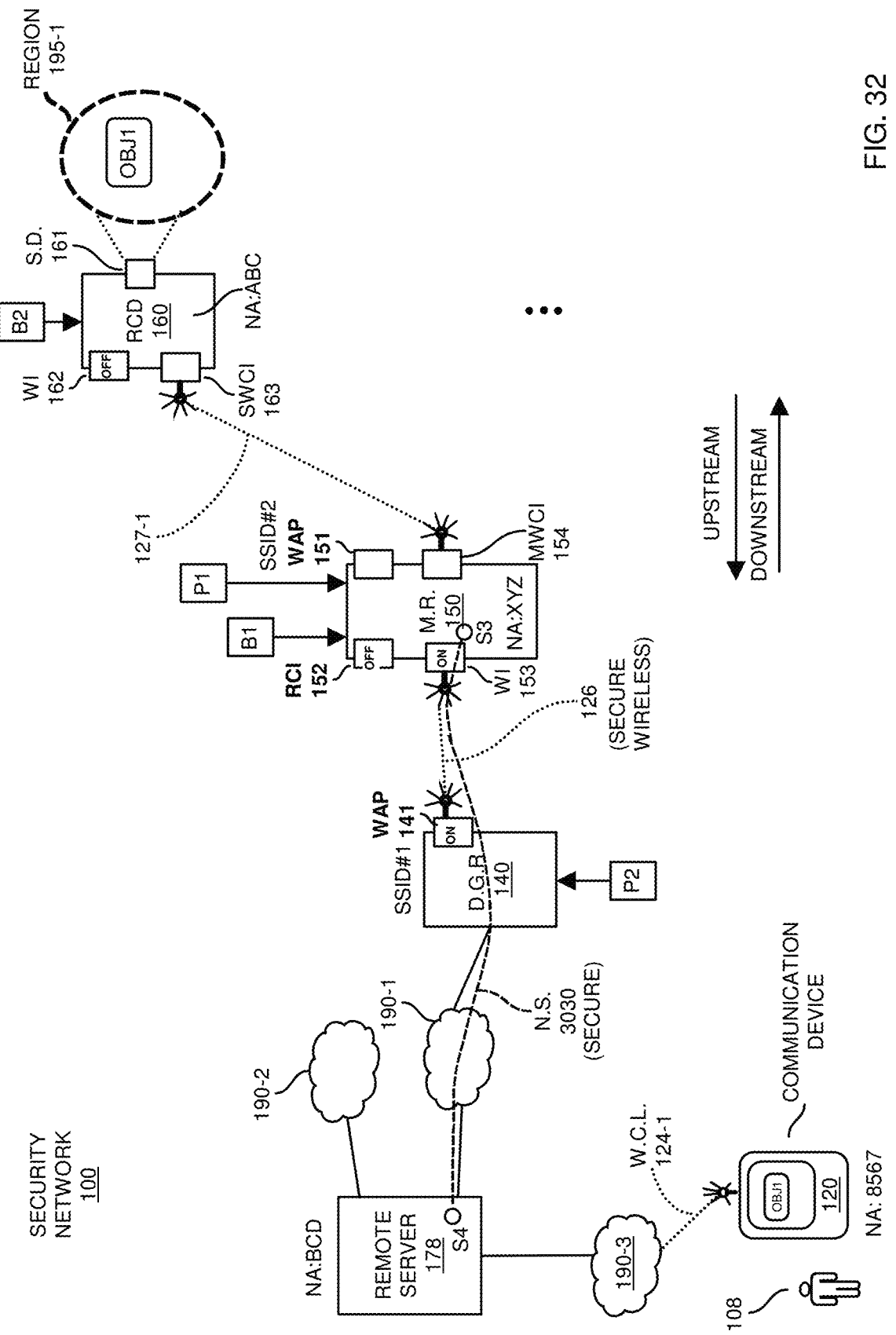

FIG. 32 is an example diagram illustrating termination of a respective network session according to embodiments herein.

As shown, subsequent to transmitting the data payload 3069 in a manner as previously discussed, embodiments herein can include terminating the network session 3020 in which the wireless interface 162 is no longer powered. Additionally, the remote communication device 160 terminates socket S1; manager resource 150 terminates socket S2. The remote communication device 160 terminates wireless communication link 128-3 and 126.

FIG. 33 is an example diagram of a method according to embodiments herein.

In processing operation 3310 of flowchart 3300, a resource such as domain gateway resource 140 assigns a first network address XYZ to manager resource 150 (first communication device). The resource such as domain gateway resource 140 assigns second network address ABC to remote communication device 160 (a second communication device).

In processing operation 3320, via master wireless communication interface 154 (such as a first wireless communication interface of the first communication device), the master wireless communication interface 154 communicates the first network address XYZ over the wireless communication link 127-1 to the remote communication device 160. As further discussed below, the remote communication device 160 uses the first network address (XYZ) as a target destination address in which to transmit data payload 3069.

In processing operation 3330, via the wireless interface 153 (a second wireless communication interface of the first communication device), the manager resource 150 establishes a second wireless communication link 126 with domain gateway resource 140. Using the wireless communication link 126, the manager resource 150 establishes the network session 3030 through the domain gateway resource 140 to the remote server 178.

In processing operation 3340, the remote communication device 160 establishes the wireless communication link 128-3 between the remote communication device 160 and the domain gateway resource 140.

In processing operation 3350, the remote communication device 160 establishes a non-secure network session 3020 from the remote communication device 160 through the domain gateway resource 140 to the manager resource 150 over a combination of the wireless communication link 128-3 and wireless communication link 126.

In processing operation 3360, via the wireless interface 153, the manager resource 150 receives a data payload 3069 over the non-secure network session 3020.

In processing operation 3370, the manager resource 150 transmits the data payload 3069 over the network session 3030 (persistent link between socket S3 and socket S4) from the manager resource 150 to the remote server 178. As previously discussed, the remote server 178 optionally forwards the respective data payload 3069 over network 190-3 to the communication device 120 for playback on a respective display screen of the communication device 120 to user 108. Accordingly, embodiments herein enable the respective user 108 to view images and/or audio captured by the sensor device 161 of the monitored region 195-1 at a remote location.

Figure 34:
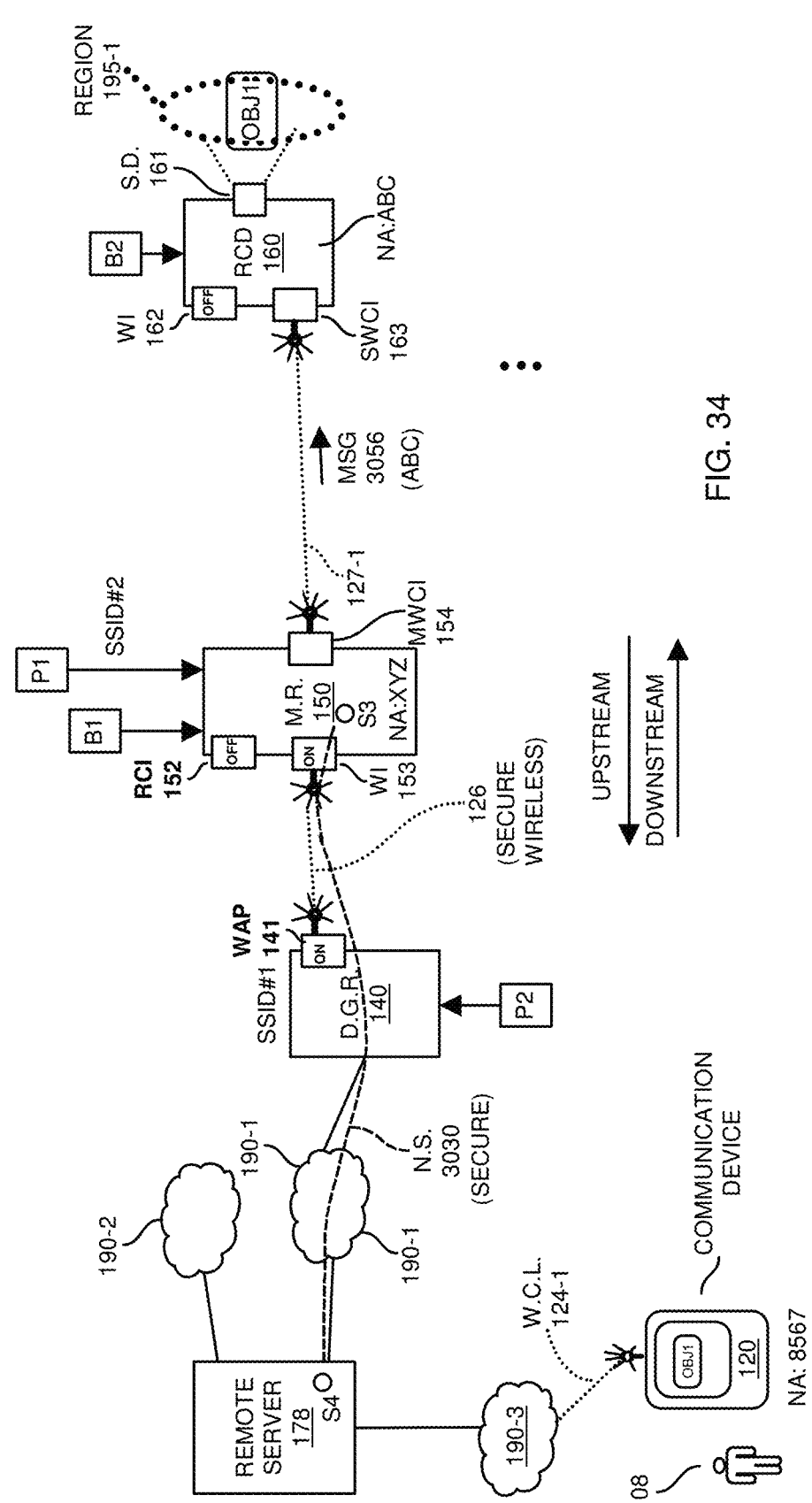
FIGS. 34-37 are example diagrams illustrating a method of quickly establishing a connection to convey communications to a target recipient according to embodiments herein.

FIG. 34 is an example diagram illustrating operation of a security network to provide a quick connection and conveyance of data according to embodiments herein.

As shown, in one embodiment, the manager resource 150 establishes a respective wireless communication link 126 (such as a secured wireless communication link) through the wireless interface 153 to the wireless access point 141 of the domain gateway resource 140. In one embodiment, the wireless access point 141 supports security at the radio frequency level (physical layer, link layer) in which communications over the wireless communication link 126 are encrypted. This prevents eavesdropping or tampering by unauthorized parties.

Subsequent to establishing the secured wireless communication link 126, the manager resource 150 establishes a respective persistent network session 3030 between the manager resource 150 through the domain gateway resource 140 over network 190-1 to the remote server 178. In one embodiment, the established network session 3030 is a secured network session established in accordance with the HTTPS (HyperText Transfer Protocol Secure) or other suitable protocol.

Further in this example embodiment, as previously discussed, note that sockets S3 and S4 define endpoints of network session 3030. The manager resource 150 receives and transmits communications over socket S3 to the remote server 178; the remote server 178 receives and transmits communications over socket S4 to the manager resource 150. Accordingly, the network session 3030 spans between network address XYZ of the manager resource 150 to the network address BCD assigned to the remote server 178.

In accordance with further embodiments, the network session 3030 is secure and persistent. In such an instance, the manager resource 150 and/or the remote server 178 can be configured to communicate heartbeat communications over the network session 3030 at an appropriate rate in order to keep the network session 3030 open to communicate data payloads in either direction on an as needed basis.

Keeping the network session 3030 alive reduces delays of transmitting respective data upstream from the socket S3 in manager resource 150 through the domain gateway resource 140 and network 190-1 to the socket S4 of remote server 178. Similarly, because the network session 3030 is immediately available, the remote server 178 is able to communicate messages with little or no delay over the network session 3030 to the manager resource 150.

Note that because the domain gateway resource 140 is powered by grid power P2, and that the manager resource 150 is powered by grid power P1, it is possible to continuously power both the domain gateway resource 140 and the manager resource 150 as long as corresponding grid power is available.

As previously discussed, the remote communication device 160 receives power from battery B2. Embodiments herein include reducing a respective amount of power consumed by the remote communication device 160, while enabling the remote communication device 160 to, with little or no delay, receive and transmit communications as needed.

To support communications between the manager resource 150 and the remote communication device 160, the manager resource 150 communicates with the domain gateway resource 140 or other suitable resource to obtain a respective network address assigned to the remote communication device 160. Assume in this example, that the domain gateway resource 140 assigns the network address ABC to the remote communication device 160.

The manager resource 150 communicates the message 3056 (including the network address ABC) from the master wireless communication interface 154 over the wireless communication link 127-1 (such as a persistent wireless communication link or time slotted communication channel as previously discussed) to the slave wireless communication interface 163 of remote communication device 160.

In one embodiment, as mentioned, the message 3056 includes network address ABC (such as a Dynamic Host Control Protocol lease) assigned to the remote communication device 160. During operation, the remote communication device 160 uses the network address ABC as its source address.

Note that the network address ABC can be available for use by the remote communication device 160 for any suitable amount of time.

As discussed herein, the operation of assigning the network address ABC for an appropriate amount of time to the remote communication device 160 prevents delays from otherwise occurring if the remote communication device 160 had to obtain a respective network address ABC at a time when the remote communication device 160 has a data payload to transmit to a remote target.

Figure 35:
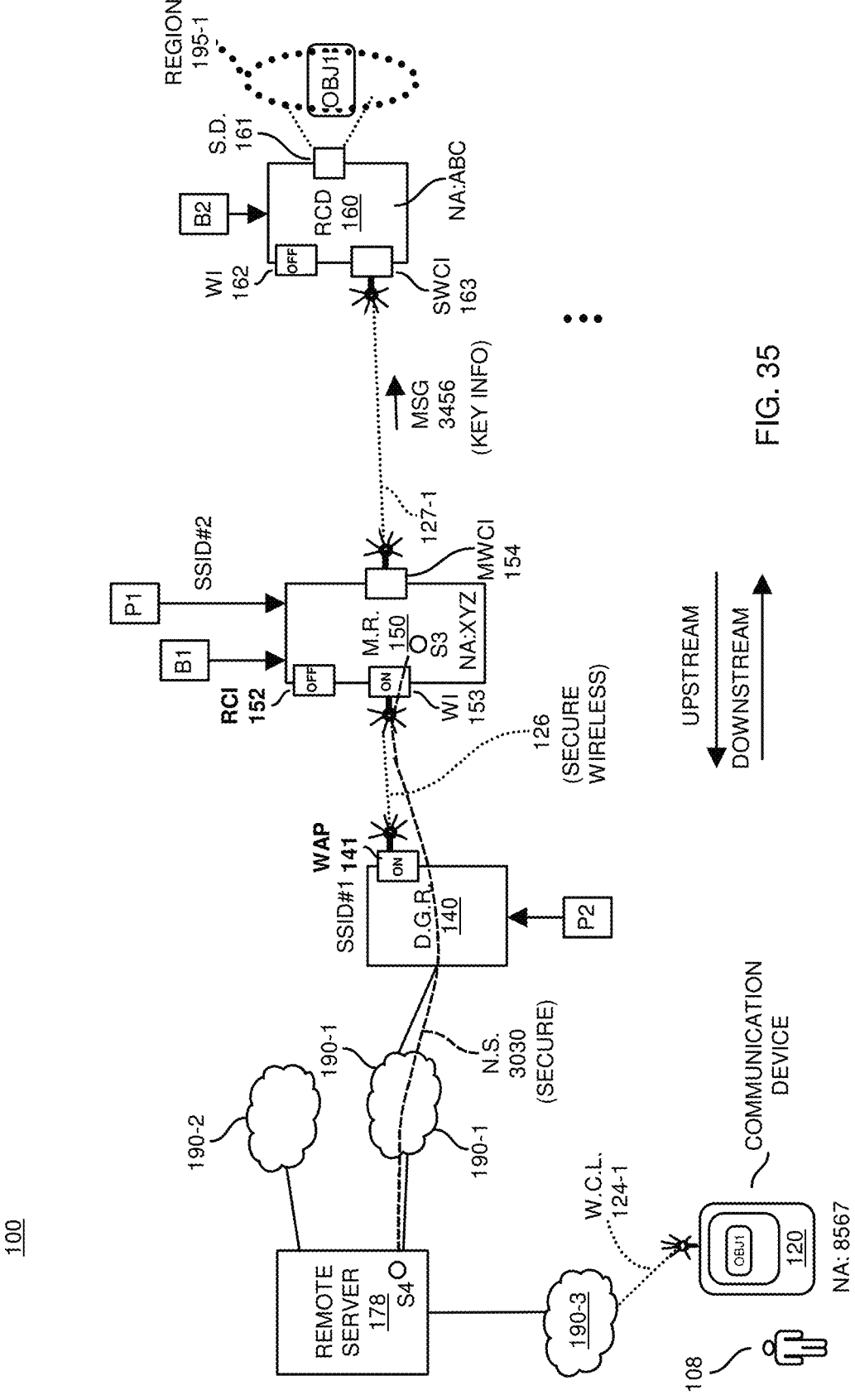

FIG. 35 is an example diagram illustrating communication of encryption key information according to embodiments herein.

As shown, the manager resource 150 can be configured to forward message 3456 from the master wireless communication interface 154 over the wireless communication link 127-1 to the slave wireless communication interface 163 of remote communication device 160.

In one embodiment, the manager resource 150 produces the message 3456 to include encryption key information (such as one or more encryption keys) that is to be used by the remote communication device 160 to encrypt communications (such as data payloads, messages, etc.) transmitted from the remote communication device 160 to the manager resource 150.

Figure 36:
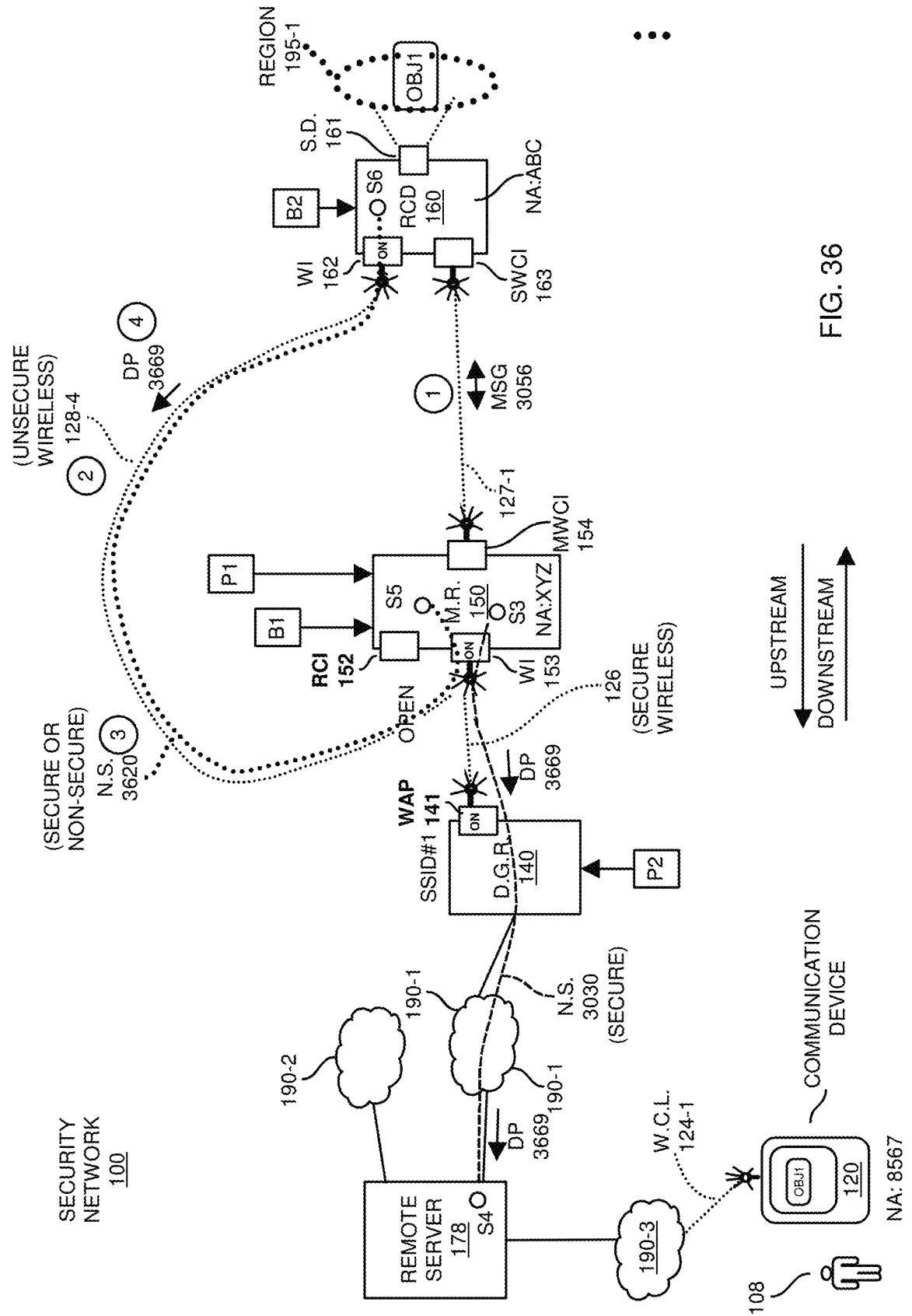

FIG. 36 is an example diagram illustrating establishing a connection and conveying data over the connection according to embodiments herein.

As shown, via one or more messages 3056, the manager resource 150 and the remote communication device 160 are able to communicate with each other over the wireless communication link 127-1. As previously discussed, the wireless communication link 127-1 is a time slotted channel in which the manager resource 150 is assigned one or more timeslots to communicate in a forward direction from the master wireless communication interface 154 to the slave wireless communication interface 163 of the remote communication device 160.

Accordingly, the manager resource 150 is able to communicate messages 3056 downstream over the wireless communication link 127-1 to activate the sensor device 161 of the remote communication device 160 to monitor region 195-1. Additionally, the remote communication device 160 is able to communicate messages 3056 in an upstream direction to the manager resource 150 to notify the manager resource 150 of a trigger event such as detection of motion in the region 195-1.

In this example, assume that the remote communication device 160 either detects motion in region 195-1 and/or receives a command in which to activate the sensor device [160] 161 to monitor the region 195-1. In such an instance, the manager resource 150 is made aware that the remote communication device 160 has or will have a data payload for transmission to the manager resource 150.

In one embodiment, the manager resource 150 provides notification over the wireless communication link 127-1 to the remote communication device 160. The notification indicates an identity of a respective wireless interface 153 (such as a wireless access point) and a socket (S5) of the manager resource 150 that is to receive the subsequent data payload.

In furtherance of (quickly) communicating a respective data payload from the remote communication device 160 to the manager resource 150, the remote communication device 160 activates the wireless interface 162 to an ON state to establish a respective secure wireless communication link 128-4 with the wireless interface 153 of the domain gateway resource 140.

In one embodiment, the wireless interface 153 is a WiFi™ access point or base station in which the wireless interface 162 negotiates with the manager resource 150 to establish a respective wireless communication link 128-4.

In one embodiment, the wireless interface 153 supports open WiFi™ connectivity. In such an instance, there is no need to provide authentication information to establish the wireless communication link 128-4.

In addition to establishing the wireless communication link 128-4, the remote communication device communicates with the manager resource 150 to establish the network session 3620. The network session can be a secure network session (such as a network session supporting HTTPS, TLS, sRSTP, etc., type of communications) or non-secure network session (such as a network session supporting HTTP, RTSP, TCP, UDP, etc., type communications).

As further shown, the network session 3620 established between the remote communication device 160 assigned network address ABC and the manager resource 150 assigned network address XYZ is defined by socket S6 and socket S5. That is, socket S6 enables the remote communication device 160 to transmit and receive communications over the network session 3620; socket S5 enables the manager resource 150 to transmit and receive communications over the network session 3620.

As previously discussed, the remote communication device 160 generates a respective data stream (such as audio and/or video data stream) from monitoring the region 195-1 with sensor device 161. To ensure that the data (data payload) being transmitted from the remote communication device 160 over the wireless communication link 128-4 is secured from eavesdropping and tampering, the remote communication device encrypts the respective data stream (such as data payload 3669) using the previously received encryption key information in message 3456. The remote communication device 160 transmits the data stream produced by the sensor device 161 and corresponding processing circuitry as an encrypted data payload 3669 from the wireless interface 162 over the wireless communication link 128-4.

Thus, the network session 3620 (because it is non-secure) itself may not provide protection with respect to the eavesdroppers are hackers. However, encryption of the data payload 3669 provides appropriate security preventing unauthorized playback or use.

In one embodiment, establishing the network session 3620 as a non-secured network session (as opposed to establishing a secured network session) enables the remote communication device 160 to more quickly establish a respective communication connection with the manager resource 150 to transmit the respective data payload 3669 to the manager resource 150.

As further shown, the manager resource 150 receives the encrypted data payload 3669 and forwards the data payload 3669 from wireless interface 153 over the wireless communication link 126 to the wireless access point 141. The domain gateway resource 140 further forwards the data payload 3669 over the network session 3030 (through network 190-1 to the remote server 178) to socket S4 for receipt by the remote server 178.

Note that the encryption key information can be distributed to any suitable node in the security network 100 such that the node is able to decrypt the corresponding data payload 3669. For example, if desired, the manager resource 150 can be configured to decrypt the encrypted data payload 3669 prior to its transmission over the network session 3030 to the remote server 178. Alternatively, the remote server 178 can be configured to apply appropriate decryption keys to a received encrypted data payload 3669 to obtain the original data stream generated by the remote communication device 160 monitoring the region 195-1.

Figure 37:
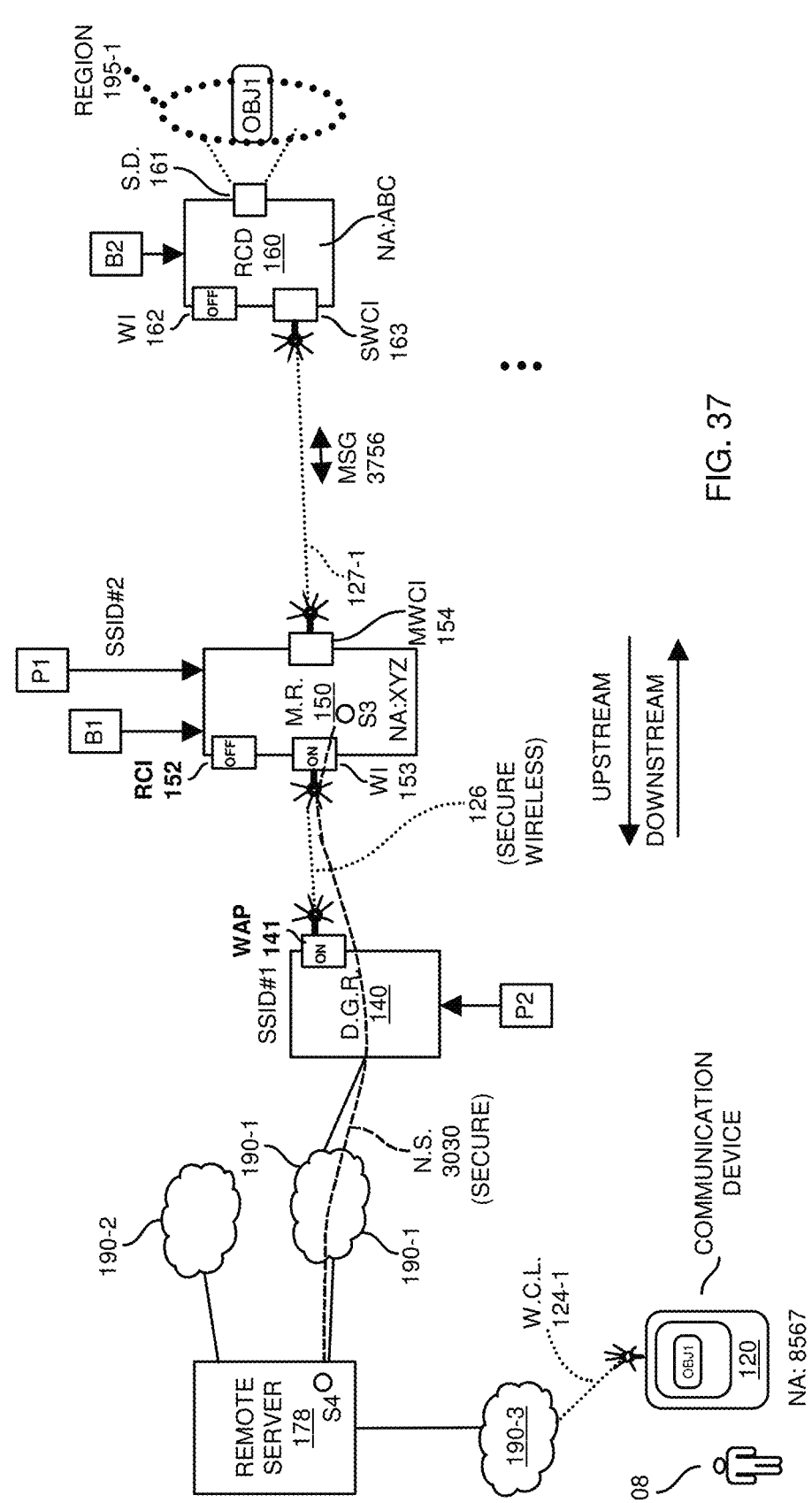

FIG. 37 is an example diagram illustrating termination of a respective network session according to embodiments herein.

As shown, subsequent to transmitting the data payload 3669 in a manner as previously discussed, embodiments herein can include terminating the network session 3620 in which the wireless interface 162 is no longer powered. Additionally, the remote communication device 160 terminates use of socket S6; manager resource 150 terminates use of socket S5 to convey communications.

FIG. 38 is an example diagram of a method according to embodiments herein.

In processing operation 3810 of flowchart 3800, a resource such as the domain gateway resource 140 assigns network address XYZ to the manager resource 150. The resource further assigns network address ABC to the remote communication device 160. As previously discussed, the generated network addresses can be communicated to the manager resource 150 and the remote communication device 160 in any suitable manner.

In processing operation 3820, via the master wireless communication interface 154, the manager resource 150 communicates the network address ABC to the remote communication device 160. In one embodiment, the manager resource 150 forwards the network address ABC to notify the remote communication device 160 of a respective network address to forward a data payload.

In processing operation 3830, via the master wireless communication interface 154, the manager resource 150 communicates encryption key information over the wireless communication link 127-1 to the remote communication device 160. As previously discussed, the remote communication device 160 uses the encryption key information to encrypt the data payload 3669 transmitted to the manager resource 150.

In processing operation 3840, via the wireless interface 153, the manager resource 150 establishes a wireless communication link 128-4 (such as a non-secure WiFi™ link established via open WiFi™) with the remote communication device 160.

In processing operation 3850, the remote communication device 160 and the manager resource 150 establish a non-secure network session 3620 over the wireless communication link 128-4.

In processing operation 3860, the manager resource 150 receives the encrypted data payload 3669 over the network session 3620 (and wireless communication link 128-4) from the remote communication device 160. As previously discussed, the remote communication device 160 transmits the encrypted data payload 3669 to a previously identified target recipient assigned network address XYZ.

In processing operation 3870, the manager resource 150 transmits the data payload 3669 (encrypted or unencrypted) over the persistent communication path (network session 3030) to remote server 178.

Note again that techniques herein are well suited to improve wireless security networks. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, etc., that would be known by one of ordinary skill have not been described in detail so as not to obscure claimed subject matter. Some portions of the detailed description have been presented in terms of algorithms or symbolic representations of operations on data bits or binary digital signals stored within a computing apparatus memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A communication system comprising:
a first wireless access point communicatively coupled to a management server over a network;
a second wireless access point device communicatively coupled to the management server, the second wireless access point device comprising a first communications interface and a second communications interface; and
a communication device, the communication device storing instructions that, when executed by computer processor hardware of the communication device, cause the communication device to:
monitor a location for occurrence of a trigger event;
determine failure to wirelessly communicate a message to the first wireless access point, the message indicating the trigger event;
based on determining the failure, wirelessly communicate a command to the second wireless access point device via the first communications interface to switch the second communications interface from a power saving sleep mode to a powered mode; and
wirelessly communicate the message to the second wireless access point device via the second communications interface.

2. The communication system as in claim 1, wherein the communication device stores further instructions that, when executed by the computer processor hardware of the communication device, further cause the communication device to determine a failure to establish a wireless communication link to the first wireless access point.

3. The communication system as in claim 1, further comprising:
a gateway resource communicatively coupled to the management server via a hard-wired network, wherein the gateway resource includes the first wireless access point; and
communication management hardware communicatively coupled to the management server via i) a primary wireless communication link to the first wireless access point, and ii) a bypass wireless communication link to the management server.

4. The communication system as in claim 3, wherein the bypass wireless communication link is a wireless mobile phone link providing access to a public switched telephone network, the public switched telephone network communicatively coupled to the management server.

5. The communication system as in claim 1, wherein the communication device stores further instructions that, when executed by the communication device, further cause the communication device to establish a wireless communication link with the second wireless access point device subsequent to the second communications interface of the second wireless access point device being switched from the power saving sleep mode to the powered mode in response to the command.

6. The communication system as in claim 5, wherein the wireless communication link is a time slotted communication channel in which the communication device is assigned a time slot to communicate the command to communication management hardware, the communication management hardware comprising the first wireless access point and the second wireless access point device.

7. The communication system as in claim 1, wherein the second wireless access point device is powered by a battery.

8. The communication system as in claim 1, wherein the second wireless access point device is communicatively coupled to the first wireless access point, and wherein the first wireless access point is communicatively coupled to the management server.

9. The communication system as in claim 1, further comprising:
communication management hardware storing second instructions that, when executed by the communication management hardware, cause the communication management hardware to send a second message to the communication device, the second message instructing the communication device to communicate with the management server through at least one of the first wireless access point or the second wireless access point device.

10. The communication system as in claim 1, wherein:
the first wireless access point, the second wireless access point device, and the communication device are located in a home; and
the management server is located outside of the home.

11. A method comprising:
monitoring a location for occurrence of a trigger event;
detecting the trigger event;
generating a message indicating the trigger event;
determining failure to wirelessly communicate the message to a first wireless access point;
based on the determining of the failure, wirelessly communicating a command to a first communications interface of a second wireless access point device to switch a second communications interface of the second wireless access point device from a power saving mode to a powered mode; and
wirelessly communicating the message to the second communications interface of the second wireless access point device.

12. The method as in claim 11 further comprising:
determining an inability to establish a wireless communication link to the first wireless access point due to failure of power delivery to the first wireless access point.

13. The method as in claim 11 further comprising:
communicatively coupling the first wireless access point to a management server over a wired network;

communicatively coupling the second wireless access point device to the management server via a primary wireless communication link to the first wireless access point; and communicatively coupling the second wireless access point device to the management server via a bypass wireless communication link.

14. The method as in claim 11 further comprising:

monitoring the location for occurrence of the trigger event comprising motion detection.

15. Non-transitory computer-readable storage hardware having instructions stored thereon, the instructions, when executed by computer processor hardware, cause the computer processor hardware to:

monitor a location for occurrence of a trigger event indicating security with respect to the location;

detect the trigger event;

generate a message indicating the trigger event;

determine failure to wirelessly communicate the message to a first wireless access point;

based on determining the failure, wirelessly communicate a command to a first communications interface of a second wireless access point device to switch a second communications interface of the second wireless access point device from a power saving mode to a powered mode; and wirelessly communicate the message to the second communications interface of the second wireless access point device.

\* \* \* \* \*